(12) United States Patent
Bristol

(10) Patent No.: US 6,690,274 B1
(45) Date of Patent: Feb. 10, 2004

(54) ALARM ANALYSIS TOOLS METHOD AND APPARATUS

(75) Inventor: Edgar H. Bristol, Foxboro, MA (US)

(73) Assignee: Invensys Systems, Inc., Foxboro, MA (US)

(*) Notice: Subject to any disclaimer, the term of this patent is extended or adjusted under 35 U.S.C. 154(b) by 0 days.

(21) Appl. No.: 09/303,519

(22) Filed: Apr. 30, 1999

Related U.S. Application Data

(60) Provisional application No. 60/123,215, filed on Mar. 8, 1999, provisional application No. 60/119,523, filed on Feb. 8, 1999, and provisional application No. 60/083,903, filed on May 1, 1998.

(51) Int. Cl.[7] .............................................. G08B 29/00
(52) U.S. Cl. ....................... 340/506; 340/521; 340/523; 340/526
(58) Field of Search ................................. 340/506, 507, 340/511, 517, 521, 523, 522, 526, 3.1

(56) References Cited

U.S. PATENT DOCUMENTS

| | | | |
|---|---|---|---|
| 4,908,746 A | 3/1990 | Vaughn | 364/147 |
| 5,226,118 A | 7/1993 | Baker et al. | 395/161 |
| 5,400,246 A | * 3/1995 | Wilson et al. | 340/835.06 X |
| 5,557,549 A | 9/1996 | Chang | 364/551 |
| 5,617,311 A | 4/1997 | Easter et al. | 364/185 |

FOREIGN PATENT DOCUMENTS

| | | |
|---|---|---|
| EP | 0 592 921 A1 | 10/1993 |
| EP | 0 694 825 A2 | 1/1996 |
| EP | 0 810 557 A2 | 12/1997 |
| GB | 2 275 813 A | 9/1994 |
| WO | WO 97/49099 | 12/1997 |

OTHER PUBLICATIONS

Bristol, E. et al., "Alarm Analysis can Diagnose System Faults", *Control Engineering*, Feb. 1975.

Bristol, E., "Alarm Sequence Analysis", Report No. 12672–T155, The Foxboro Company, Dec. 7, 1971.

* cited by examiner

*Primary Examiner*—Daryl Pope
(74) *Attorney, Agent, or Firm*—Hamilton, Brook, Smith & Reynolds, P.C.

(57) ABSTRACT

The disclosed alarm analysis tools cope with insufficiently understood process characteristics. The configuration of the alarms and their associated displays are governed by generalized display policies applicable to groups of alarms rather than by detailed configuration of individual alarm action. To aid an operation in the configuration process, another aspect of the invention concerns an alarm selection method and apparatus operating on a computer, which comprises an application window displaying a main alarm list, a selection means to select the alarm indications displayed in the alarm list, and an operations means producing a main alarm list subset having characteristics of the selected alarm indications.

82 Claims, 58 Drawing Sheets

STYRENE PLANT GRAPHIC

FIG. 20

Access Map: Categories (Normal), Categorizations (Bold), Patterns (in Italics)

STYRENE PLANT GRAPHIC

Default (non Graphic) Display (for Fire Hazard Pattern)

FIG. 28

History Log (advanced to the 34th sample time)

Battle Ribbon Trend display (letter coded instead of color coded) with Mask/Filter carried over from log.

FIG. 31 Battle Ribbon Trend (Mask/Filter removed)

STYRENE PLANT GRAPHIC showing Summary, OWS and Priority Summary

Fire Hazard Default Alarm Display with Alarms, Predictions, and Check Boxes displayed. Shows Mask Filter Toggles Same Fire Hazard Display with Pattern Suppression Active What If Display with RSR and RX2SV selected in Low Low State (RX2SV also shows Prediction in the Check Boxes)

What If Display with the actual Alarm States selected.

ALARM ANALYSIS TOOLS METHOD AND APPARATUS

RELATED APPLICATIONS

This application claims the benefit of provisional application Ser. No. 60/083,903, filed on May 1, 1998; Ser. No. 60/119,523, filed Feb. 8, 1999; and Ser. No. 60/123,215, filed Mar. 8, 1999, the entire teachings of each are incorporated herein by reference.

BACKGROUND OF THE INVENTION

Process control alarm systems are used in the area of factory automation. Specifically, process automation uses many process control alarms to inform operators that a process is within or has exceeded process control tolerance limits. A typical application in which a process control alarm system is employed is a styrene manufacturing plant. Within a styrene manufacturing plant, various manufacturing processes require machines and equipment, such as a feed tankage system, a furnace, a heat recovery system, one or more reactors, and a separator. The number of process control alarms constantly monitoring these machines in a styrene manufacturing plant ranges in the tens of thousands. Each process control alarm generally has at least one associated process control alarm variable.

In the past, alarm displays have been large boards with lights and labels, where an illuminated light or LED indicates which process control alarm has sensed a problem in the machine, or which machine in the factory is experiencing a problem. Today, a software interface to aid operators in understanding what is happening with one or many machines is used rather than the alarm board. Increasingly, a GUI (Graphical User Interface) is used as the human-to-machine interface because of its inherent ease of use and intuitive qualities. Through a GUI interface, process control alarm monitor variables are often capable of being set and monitored. These process control alarm monitor variables are linked one or more the feedback systems used in a process control system to make pseudo real-time analysis possible.

Two methods for configuring an alarm monitor system are off-line data file entry and on-line alarm selection. The off-line data file entry method requires an engineer or operator to manually determine alarms having relevance to a particular process control system. Once such relevant alarms are determined, associated alarm names (or respective alarm variable names) are typically typed into a text tile. Inherent in the off-line data file entry method is (i) a step of hand processing lists of possible relevant alarm names (or respective alarm variable names); and (ii) manually entering those names into the text file. The step of hand processing includes scanning and removing redundant alarms.

The on-line alarm selection method is more graphically oriented. However, a typical on-line alarm selection system requires a process control system to be operating during configuration, has limited dedicated alarm selection tools, and requires the same level of understanding of a process control system as the off-line method. Furthermore, in process control systems undergoing evolutionary changes, incorporating ne alarms mandates alarm monitor system reconfiguration, thereby causing either of the above methods to be repeated.

In yet another aspect of alarm systems, a typical alarm system supports a set of standard (absolute and deviation) alarm conditions associated with several control block types. These control block types cause a corresponding indication in associated loop and process displays whenever an alarm condition occurs. In some alarm monitor systems, log displays augment the process displays and list a history of all alarms that have occurred in some interval of time, subject to a selection filter.

Alarms are a main automation system vehicle for dealing with operations too abnormal for automated accommodations. A large fraction of the abnormalities are effectively unfamiliar to an operations and applications group. Some abnormalities are very mild, others are catastrophic. There are applications with thousands of potential alarms defined having hundreds of alarms active at any point in time, sometimes within a single causal shower.

A typical alarm system that provides alarm priority handling capabilities is inherently inadequate to support an operator in recognizing and coping with resulting abnormal or crisis situations. This is true under the best human factors support and applications design. An interest in operating with fewer operators places that much more of a load on the reduced number of operators, exacerbating the problem.

SUMMARY OF THE INVENTION

Configuring input for an alarm monitor system of a small process control system is relatively easy. However, for a process control system having up to 200,000 alarms with 50,000 alarm variables, the configuration alarm selection process is overwhelming. Off-line, manual, alarm configuration entry is ill-suited for large systems, and on-line alarm configuration entry typically takes an alarm system off-line during a reconfiguration. Reconfiguring an alarm system is time consuming and requires well-trained personnel.

The present invention provides an off-line visual configuration method and apparatus for an alarm monitor system. Operators perform high-level alarm selection functions on an off-line basis. A complete listing of alarms is presented to the operator, and several sophisticated, yet intuitive, graphically driven functions allow the operator to select a desired subset of alarms. The selected subset is stored as a configuration listing for an alarm monitor system.

Accordingly, one aspect of the invention concerns an alarm monitor visual configuration selection apparatus operating on a computer, which comprises an application window selection means and operation means. The application window has an alarm list for displaying a plurality of alarm indications. The selection means enables an operator to select desired properties of the alarm indications (e.g., character substrings). The operation means produces an alarm list subset having characteristics of the selected properties of the alarm indications. In a preferred embodiment, the application window has a first subwindow, a second subwindow, and a third subwindow. The first subwindow comprises the entire alarm list, the second subwindow comprises a temporary subset of the alarm list, and the third subwindow comprises a final subset of the alarm list. Furthermore, the alarm selection system comprises an input file having the entire alarm list, and an output file into which the final subset of the alarm list is stored. In the preferred embodiment, the input file and output file are text files, and the lists in each of the subwindows are arranged in alphabetical order.

The visual configuration provides a GUI (graphical user interface). The computer comprises a user input/output device, preferably a computer mouse, that is capable of being used to select portions of alarm indications displayed in at least one subwindow alarm list. The selected portions of alarm indications are highlighted in a GUI manner.

The invention further comprises several alarm list operation buttons in the application window. Selection of an operation button causes an underlying processor routine to operate on a subwindow alarm indication list, associated with the selected operation button, as a function of a user's selection, if applicable, that are used to operate on a user's selection. Boolean logic capabilities are incorporated into the underlying processor routines. The alarm list operation buttons include move, load, delete, keep, clear, and save alarm list operations. Each subwindow has at least one associated alarm list operation button.

In the preferred embodiment, the software used to accomplish workings of the system is a compiled, high level, programming language, such as "C".

According to another aspect, the invention also features an alarm monitor visual configuration selection method operating on a computer. The selection method comprises the steps of (i) displaying an alarm list in an application window, (ii) receiving an input selection criteria, (iii) operating on the alarm list in response to the input selection criteria, and (iv) producing an alarm list subset having characteristics of the input selection criteria resulting from operating on the alarm list.

Also in the preferred embodiment, an application window that comprises three subwindows, which are arranged from left to right in the application window. The first (leftmost) subwindow comprises an alarm list. The second (middle) subwindow comprises a temporary subset of the alarm list. The third (rightmost) subwindow comprises a final subset of the alarm list. In the preferred embodiment, the step of displaying the alarm list includes arranging the alarm indications in each alarm list in a sensibly grouped order, preferably alphabetically. The selection method further comprises the steps of loading the alarm list from an input file and storing the final alarm list subset to an output file. The alarm lists are arranged in a sensibly grouped order in each subwindow, preferably in alphabetical order.

Furthermore, the selection method enables an operator to select alarm list text portions from the beginning, intermediate, or ending of alarm names (i.e., indications) in the alarm list. From a user's selection, operation buttons associated with each respective subwindow operate on the entire alarm list, where wildcards are used in the operation. Multiple move operations from the first subwindow to the second subwindow, or the second subwindow to the third subwindow, result in an aggregate alarm subset list in the resulting subwindow. In an alternate embodiment of the present invention, the alarm lists include icons, also representing alarms.

Another aspect of the present invention concerns another problem in the prior art. In previous alarm system analysis tools, each alarm is assigned a respective priority, independent of other alarms. Such non-relational single alarm priorities inadequately support an operator in analyzing an alarm shower to isolate or determine a causal event.

This aspect of the present invention provides alarm analysis tools that focus on improving both analysis and presentation of alarm information. The alarm analysis tools extend existing alarm log and filter philosophies to better support an operator in abnormal situations. Excepting a few alarms with well defined (but not automated) operating responses, most alarm activity occurs due to deficiencies in process automation and operator understanding. The alarm analysis tools overcome these deficiencies.

The alarm analysis tools cope with insufficiently understood process characteristics, requiring sensitivity to unusual behavior and rapid exploration and diagnosis. Accordingly, the alarm analysis tools are not overloaded with operating features. In particular, the tools do not address complex, configured, alarms-specific responses more appropriate for well-understood, systematic, plant automation. The configuration of the alarms and their associated displays are governed by generalized display policies applied to groups of alarms rather than individual alarms. This display policy approach supports quick, easy, transparent, operator action.

The alarm analysis tools support an operator at an operator console. They permit seeing alarms in a wider operational perspective, which minimizes tunnel vision. Hierarchical alarm summaries help in this regard. Based on automatically computed summary descriptions, higher level summaries are linked to lower level summaries. Grouping individual alarms significantly enhances alarm information value. Furthermore, the alarm analysis tools give the operator complete control over the level of alarm display detail while making his display choices and the consequences of any dynamic category selection for alarm filtering continuously apparent; the alarm analysis tools permit the operator to manage the alarms with less display noise overload. Therefore, the alarm analysis tools permit the operator to manage the alarms with less display noise overload.

Thus, another aspect of the present invention is a method for providing alarm information in a computer linked to an alarm system having electronic alarm messages. The method includes the steps of: (i) associating alarm indications with alarms, each alarm indication being a representation of an alarm message; (ii) providing a set of alarm categories having a hierarchy of subcategories, where each category includes a subset of logically related alarm indications; (iii) for the set of categories, providing a set of categorizations, where each categorization includes a subset of logically related alarm categories; (iv) receiving alarm messages from the alarm system and mapping each received alarm message to an alarm indication; (v) updating the categories and categorizations by a metric, as a function of the received alarm messages; and, (vi) displaying a subset of the categorizations in an organized and meaningful manner, thereby providing alarm information effectively to an operator.

A subset of alarm categories include patterns, where a pattern is defined as a sequence of alarm indications. Such a category is referred to as a pattern or pattern category. A subset of categories have associated policies, which are utilized by processor routines in analyzing and displaying alarm information. Furthermore, a subset of categories have associated priorities with respect to other categories, which are used by the processor routines for displaying the categorizations in an organized and meaningful manner.

The step of updating the categories and categorizations by a metric includes the steps of providing an alarm criteria for each alarm indication, providing each category and categorization with an alarm counter, and adjusting each alarm counter in response to a comparison operation. The comparison operation includes comparing an alarm message with its respective alarm criteria, where a subcategory directly including an alarm indication adjusts its alarm counter in response to the comparison operation. A hierarchically superior category adjusts its alarm counter on a per subcategory and per immediately included alarm indication basis.

The present invention comprises a step of determining a one word summary. Determining a one word summary includes the steps of: (i) determining a list of indicator categories, where an indicator category is a hierarchically highest level category in a display; (ii) scanning all subcategories of the indicator category; and, (iii) for each subcategory of each indication category, determining which subcategory alarm counter (i) equals the count of the indicator category, and (ii) whose overall counts has the smallest number of alarm indications. The one word summaries are preferably a subcategory descriptor or an alarm indication descriptor displayed near the indicator category. For a subset of the indicator categories, a highest level priority one word summary is also displayed near the indicator category.

In one embodiment, the step of updating further includes (i) providing a mask/filter selection referencing a subset of alarm indications, (ii) screening the received alarm messages according to the mask/filter selection, and (iii) applying the step of screening to the steps of both determining a one word summary and displaying a subset of the categorizations. In the preferred embodiment, a dynamic mask/filter criteria is used to provide dynamic analysis and display changes as a function of alarm conditions. Furthermore, for a set of operating range-type alarms, a set of ranges are dynamically adjusted in accordance with an alarm limit adaptation table.

In sets of displays and logs, the present invention also includes displaying alarm information in an organized and meaningful manner. A display is selected from a group including logs, battle ribbon alarm/event trends, alarm summary indicator matrices, and predictions/diagnostic displays. Side log displays further provide display capability of specific alarm information.

The present invention also enables a set of consoles to operate together. In one embodiment, each console has a specific mask/filter selection, but also includes specific mask/filter selections for each other console in the set. Enabling multiple mask/filter selections on a first console allows an operator, monitoring a second console whose mask/filter is enabled on the first console, to take a break while having his or her duties covered. In an alternate embodiment, each console has a specific mask/filter selection and shares the specific mask/filter selection with each other console in the alarm analysis tools console set through a console-to-console transfer. In yet another embodiment, a console specific mask/filter selection is transmitted to the alarm system to inhibit alarm messages from being transmitted, thereby sharing the console specific mask/filter with the plurality of operator consoles.

According to another aspect of the present invention, in a computer linked to an alarm system having electronic alarm messages, apparatus for providing alarm information includes: (i) a set of alarm indications associated with the alarm messages; (ii) a set of categories into which a subset of the alarm indications are grouped; (iii) a set of categorizations into which a subset of categories are grouped; and (iv) an interface, which receives the electronic alarm messages from the alarm system. The apparatus further includes a set of metrics associated with the categories and categorizations. A processor routine adjusts the set of metrics in response to the received alarm messages. Finally, there is a console display that displays a subset of the categorizations in an organized and meaningful manner, thereby providing alarm information to the operator.

The categories include a set of patterns, where each pattern defines a sequence of alarm indications. Also, categories include corresponding policies that affect alarm information analysis and display. The apparatus also includes a prioritizing processor routine that receives a set of priority rules from the policies and adjusts the set of priority metrics associated with the categorizations and categories. The processor routine presents a subset of categorizations as a function of the associated priority metrics in the display.

The apparatus further comprises a set of alarm criteria; a plurality of alarm counters, where each category and categorizations has an associated alarm counter; and a comparison routine. The comparison routine adjusts the alarm counters in response to comparing the associated alarm indications with the respective alarm criteria.

The console display facilitates displaying a set of one word summary subdisplays. A one word summary is preferably a subcategory descriptor or alarm indication descriptor for which a subcategory alarm counter (i) equals the count of the co-located category and (ii) whose overall counts has the smallest number of alarm indications. In the preferred embodiment, the apparatus further includes a set of one word summary priority subdisplays co-located with the categories, wherein a one word summary of a highest level priority is displayed.

The apparatus also includes a mask/filter selection. The comparison routine receives the mask/filter selection as an input parameter and applies the mask/filter selection when adjusting each alarm counter. In the preferred embodiment, the apparatus further includes a dynamic mask/filter criteria having a relevant association with the mask/filter selection. The comparison routine further receives the dynamic mask/filter criteria as an input parameter and applies the dynamic mask/filter criteria when adjusting each alarm counter. Also, the dynamic mask/filter criteria includes a dynamic alarm limit table. The comparison routine receives the dynamic alarm limit as an input parameter and applies the dynamic alarm limit table to adjust a set of ranges for a set of operating range-type alarms when determining whether to adjust each alarm counter.

The apparatus also includes an alphabetizing processor routine that receives a subset of alarm indications and outputs the subsets in alphabetical order. Alphabetizing the subset of alarm indications presents them in an organized and meaningful manner to the operator. The apparatus also includes a reference indicator for a subset of categorizations and categories, indicating a total number of associated received alarm messages and total number of filtered alarm messages. In one embodiment, masked/filtered categorizations, categories, and alarm indications are displayed in different desired shadings, colors, fonts, and type styles.

The apparatus further includes a computer input/output device coupled to the console display. The input/output device is the means through which an operator interacts with the alarm information. The display is in any one of several display formats, including logs, battle ribbon alarm/event trends, alarm summary indicator matrices, and predictions/diagnostic displays. Side log displays are used to display specific alarm information.

In an alternate embodiment, there is a set of consoles, wherein a mask/filter selection is specific for each console. In one embodiment, the consoles are in communication via their respective interfaces, thereby allowing alarm monitoring mask/filter selections to be shared among the set of consoles. In an alternate embodiment, the console interface communicates in bidirectional manner, allowing a console to transmit a console-specific mask/filter to the alarm system to inhibit the alarm system from transmitting alarm messages, thereby sharing the console-specific mask/filter with the plurality of operator consoles.

In the preferred embodiment of the present invention, the apparatus interface receives a plurality of alarm messages in an alarm message frame. The alarm messages are parsed and mapped into the alarm indications by either the interface or a parsing routine. The alarm analysis tools further include an external configuration file having a plurality of initialization values for variables used.

The above and other features of the invention, including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principals and features of this invention may be employed in various and numerous embodiments without departing from the scope of the invention.

BRIEF DESCRIPTION OF THE DRAWINGS

In the drawings, like reference characters refer to the same parts throughout the different views. The drawings are not necessarily to scale, emphasis instead being placed upon illustrating principles of the invention.

FIG. 6I is flow diagram of an underlying process for an output window purge operation;

FIG. 20 is a bit matrix of a simple category and one word summary for determining a one word summary intersection for the display of FIG. 13;

FIGS. 24–40 are typical graphical user interface windows for an example application for which the alarm analysis tools application of FIG. 1 has been configured to monitor alarms for a styrene plant.

DETAILED DESCRIPTION OF THE PREFERRED EMBODIMENTS

Figure 1:
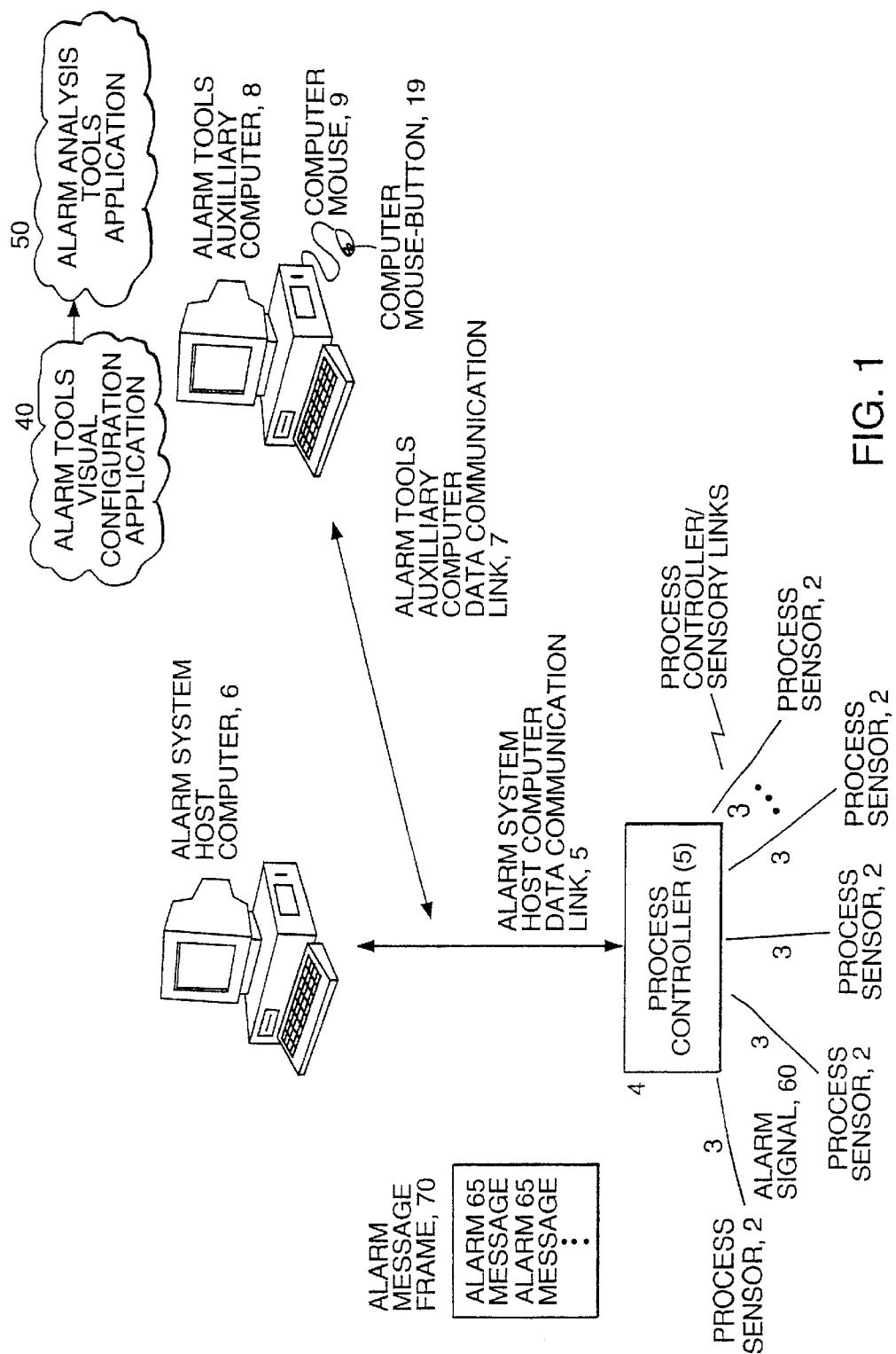
FIG. 1 is a schematic overview of an alarm system host computer data-linked to a process controller, where an alarm analysis tools visual configuration application of the present invention provides an input configuration file to an alarm analysis tools application.

FIG. 1 is an illustration of a computer network environment in which the present invention is deployed. Briefly, an alarm system host computer 6 communicates to a set of process controllers 4 via an alarm system host computer data communication link 5. An alarm analysis tools auxiliary computer 8 taps into the alarm system host computer data communication link 5 via an alarm analysis tools auxiliary computer data communication link 7. In the preferred embodiment of the present invention, the alarm analysis tools auxiliary computer 8 has I/O (input/output) accessories, such as a computer mouse 9 comprising a computer mouse button 19. Other cursor control devices and input means (e.g. keyboards and the like) are suitable.

An alarm message frame 70, issued by the process controllers 4 to the alarm system host computer 6 via the alarm system host computer data communication link 5, is received by the alarm system host computer 6. The alarm analysis tools auxiliary computer 8 simultaneously receives the alarm message frame 70 via the alarm analysis tools auxiliary computer data communication link 7. The received alarm message frame 70 is processed by an alarm analysis tools application 50 which resides on the alarm analysis tools auxiliary computer 8. The alarm analysis tools application 50 is preconfigured and displays a set of alarm messages 65 in accord with received information from the present invention (i.e., alarm analysis tools visual configuration application 40).

The alarm message frame 70 is generated by the process controllers 4 in response to receiving alarm signals 60 from process sensors 2 via process controller/sensor links 3. Alarm signals 60 may be issued from a process sensor 2 due to an out-of-range detection, a failure detection, or a malfunction of a process sensor 2.

In the preferred embodiment, the possible alarm messages 65 that are transferred in the alarm message frame 70 in response to a process controller 4 having received an alarm signal 60 are known by the alarm analysis tools visual configuration application 40. In some instances, the alarm messages 65 are determined, organized, and categorized prior to an alarm system installation; other times, the alarm messages 65 are created in an evolutionary fashion, along with their associated process control systems (i.e. process controllers 4, links 3 and processor sensors 2).

Figure 2A:
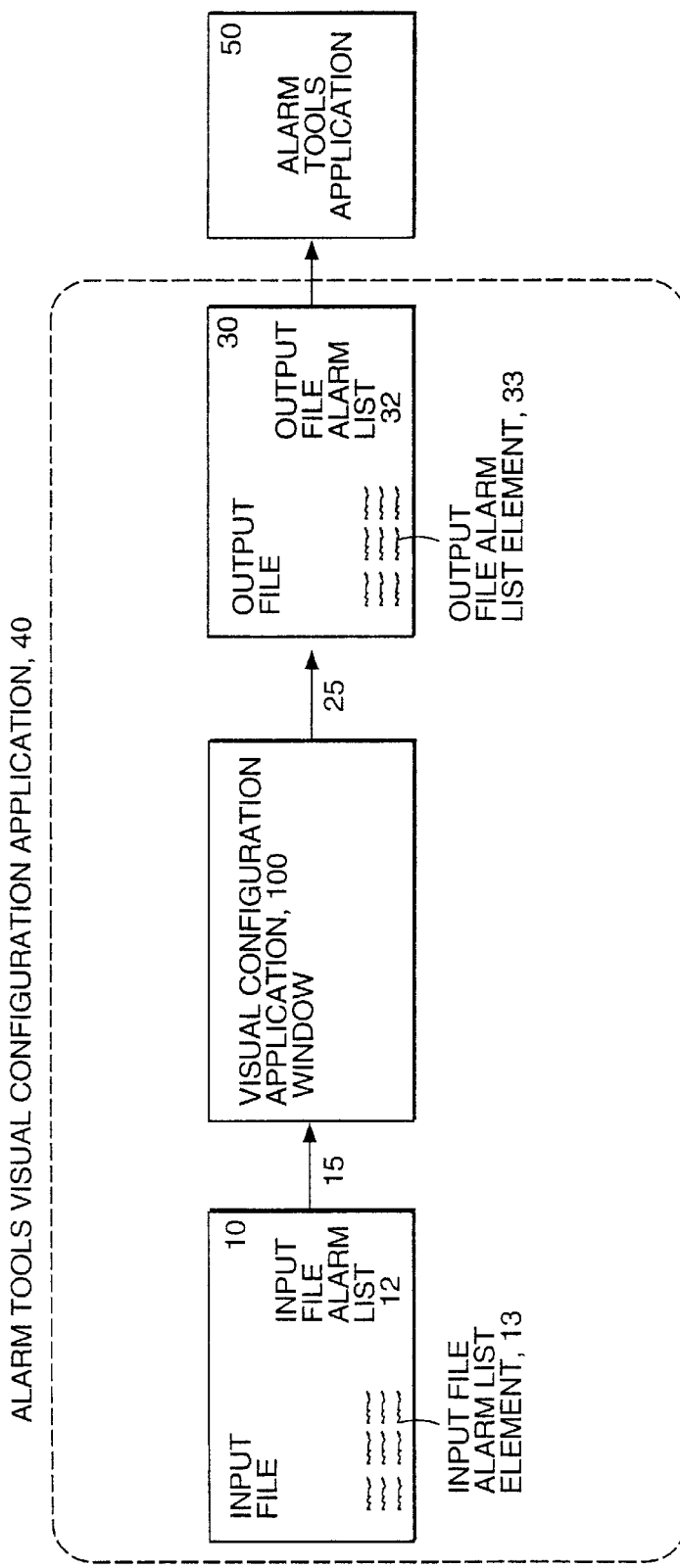
FIG. 2A is a block diagram of an embodiment of the present invention showing the alarm analysis tools visual configuration having an input file, a visual configuration application window, and an output file, which is used by the alarm analysis tools application as an input configuration file.

FIG. 2A shows a block diagram of the alarm analysis tools visual configuration application 40 that has been constructed according to the principles of the present invention. In the preferred embodiment of apparatus 40, a visual configuration application window 100 has a GUI (Graphical User Interface), and the steps for interacting with the visual configuration application window 100 are performed in a GUI fashion. The present invention is implemented in a compiled, high level, programming language, preferably "C". Other programming languages are suitable, such as Basic, Fortran, Pascal, Visual Basic, Visual "C", etc.

An input file 10 is in text file format in the preferred embodiment of the present invention. In another embodiment, the input file 10 is a binary file or other file format to save disk space. A read input file link 15 retrieves from the input file 10 an input file alarm list 12 having a set of input file alarm list indications 13.

The visual configuration application window 100 includes a user interface and a set of software routines to process an alarm list. The visual configuration application window 100 receives the input file alarm list 12 from the read input file link 15 and transmits a processed alarm list across a write output file link 25 to an output file 30.

The output file 30 having an output file alarm list 32 is in a text file format in the preferred embodiment. In another embodiment, the output file 30 is in binary or other file format to save disk space. The output file alarm list 32 is formed of output file alarm list indications 33.

The alarm analysis tools application 50 reads the output file alarm list 32 from the output file 30 of the alarm analysis tools visual configuration application 40. The alarm analysis tools application 50 uses the output file alarm list 32 to configure itself for operation.

Figure 2B:
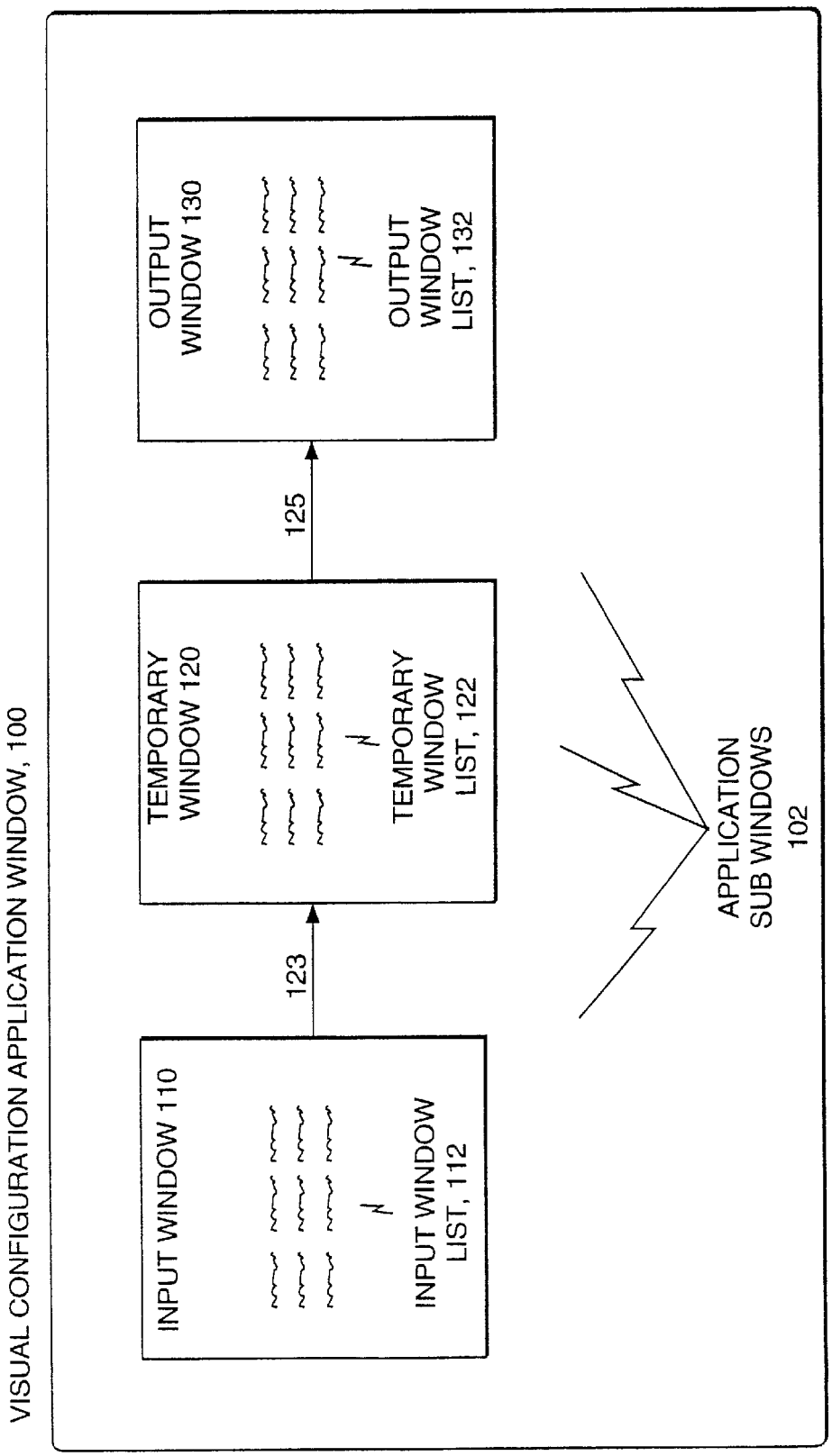
FIG. 2B is a block diagram of the visual configuration application window of FIG. 2A.

FIG. 2B shows an embodiment of data flow in the visual configuration application window 100 of the invention alarm analysis tools visual configuration application 40. The visual configuration application window 100 comprises an input window 110, a temporary window 120, and an output window 130. These windows 110, 120, 130 are collectively referred to as application subwindows 102. In the preferred embodiment of the present invention, the application subwindows 102 have GUI interfaces.

The input window 110 is used to display an input window list 112. In the preferred embodiment, the input window list 112 is the input file alarm list 12 received from the input file 10 (FIG. 2A). In an alternate embodiment, the user is queried at run-time to enter an input window list 112.

The temporary window 120 displays a temporary window list 122, which is a subset of the input window list 112. The temporary window list 122 is received from the input window 110 via an input window to temporary window transfer 123.

The output window 130 displays a subset of the temporary window list 122 as an output window list 132. The output window 130 receives the subset (an hence output window list 132) from the temporary window 120 via a temporary window to output window transfer 125.

Figure 3:
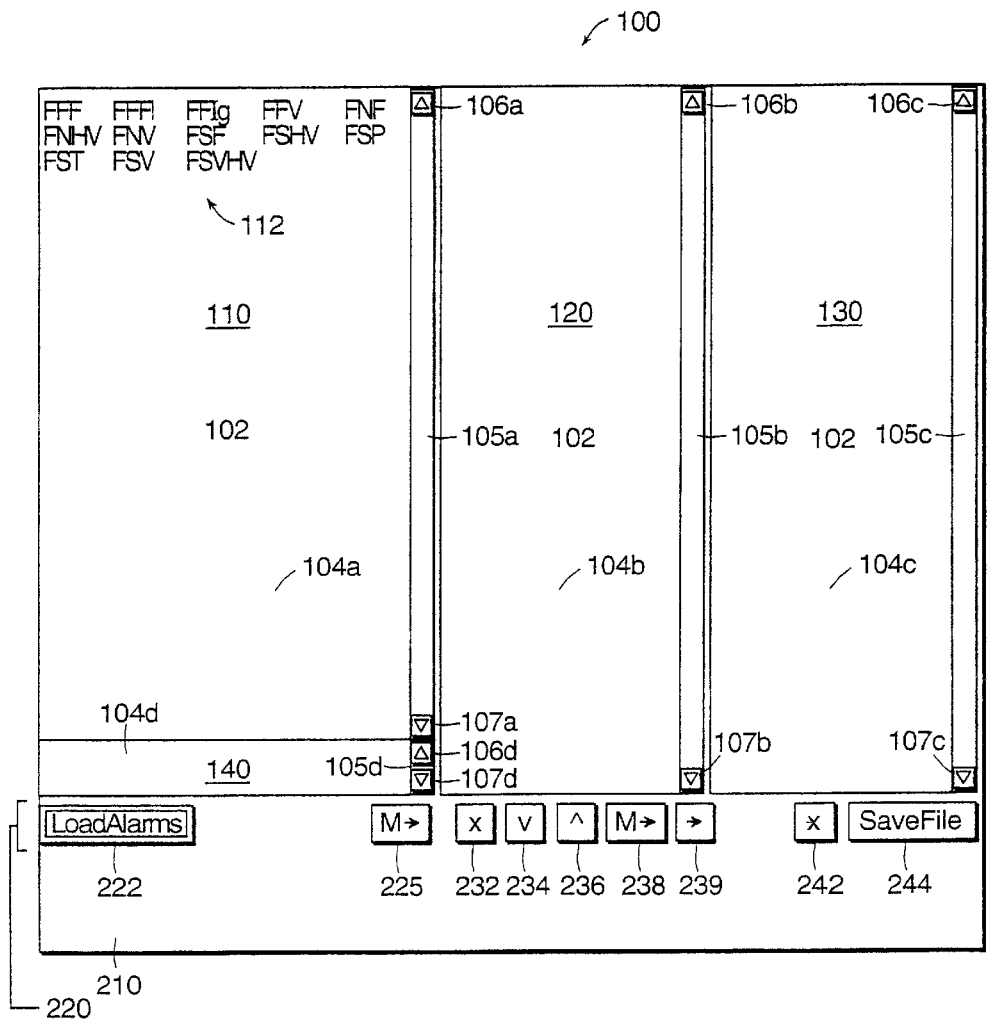
FIG. 3 is a screen display of the application window of FIG. 2A illustrating a small input file alarm list.

FIG. 3 is an example of an end user (operator) screen view of a visual configuration application window 100. In the preferred embodiment of the present invention apparatus, the screen view of the visual configuration application window 100 has an upper portion comprising a set of application subwindows 102, and a lower portion comprising a command button area 210. The command button area 210 is formed of a plurality of command buttons 220 or other suitable means for effectuating corresponding operations. The application subwindows 102 display the alarm list indications on which the underlying operations corresponding to command buttons 220 act.

In an embodiment of the present invention, the application subwindows 102 are vertical columns in the visual configuration application window 100. In the preferred embodiment, the input window 110, temporary window 120, and output window 130 are arranged from left to right, respectively, each of these application subwindows 102 include text representing the alarm list indications, where the alarm lists 112, 122, 132 (FIG. 2B) are preferably a list of alarm codes in acronym format. Other formats which allow large numbers of alarm entries (i.e. indications of alarms) to be simultaneously displayed are suitable. For example, in another embodiment, icons representing the alarm list indications are displayed in the application subwindows 102 (i.e. windows 110, 120, 130.)

The input window 110 comprises standard GUI window features. There is a scroll bar 105a comprising a scroll bar up arrow 106a and a scroll bar down arrow 107a. The input window list 112 is displayed in a GUI window contents region 104a controlled by the scroll bar 105a.

Likewise, the temporary window 120 includes standard GUI window features. There is a scroll bar 105b comprising a scroll bar up arrow 106b and a scroll bar down arrow 107b. As seen in later figures, a temporary window list 122 is displayed in a GUI window contents region 104bcontrolled by the scroll bar 105b.

Also, the output window 130 comprises standard GUI window features. There is a scroll bar 105c comprising a scroll bar up arrow 106c and a scroll bar down arrow 107c. As seen in later figures, an output window list 132 is displayed in a GUI window contents region 104c controlled by the scroll bar 105c.

The input window selection portion 140 comprises standard GUI window features. The input window selection portion 140 is located at the bottom of the input window 110. There is a scroll bar 105d comprising a scroll bar up arrow 106d and a scroll bar down arrow 107d. The contents of the input window selection portion 140 input window list entries 112 currently selected and selection window criteria, as further explained later.

The command button area 210 is the shaded portion located at the bottom of the visual configuration application window 100. In the command button area 210, there are command buttons 220. Each command button 220 is positioned beneath the respective subwindow 102 on which the command button 220 operates. In the preferred embodiment, the command buttons 220 have icons graphically indicating their respective functions.

The following list includes the command buttons 220 of the preferred embodiment of the present invention:

LoadAlarms button 222:
  loads the input file list 12 from a selected input file 10.
M→button 225:
  (show below and to the left of the temporary window 120) causes selected alarm indications from the input window 110 to be cumulatively transferred to the temporary window 120.
x button 232:
  clears the corresponding temporary window 120.
v button 234:
  causes the selected alarm indications in the temporary window 120 to be deleted.
^ button 236:
  causes only the selected alarm indications to be kept in the temporary window 120.
M→button 238:
  transfers selected alarm indications from the temporary window 120 to output window 130.
→button 239:
  causes all alarm indications to be transferred from the temporary window 120 to the output window 130.
x button 242:
  clears the corresponding output window 130.
SaveFile button 244:
  saves the output window 130 to a selected, named output file 30.

Figure 4:
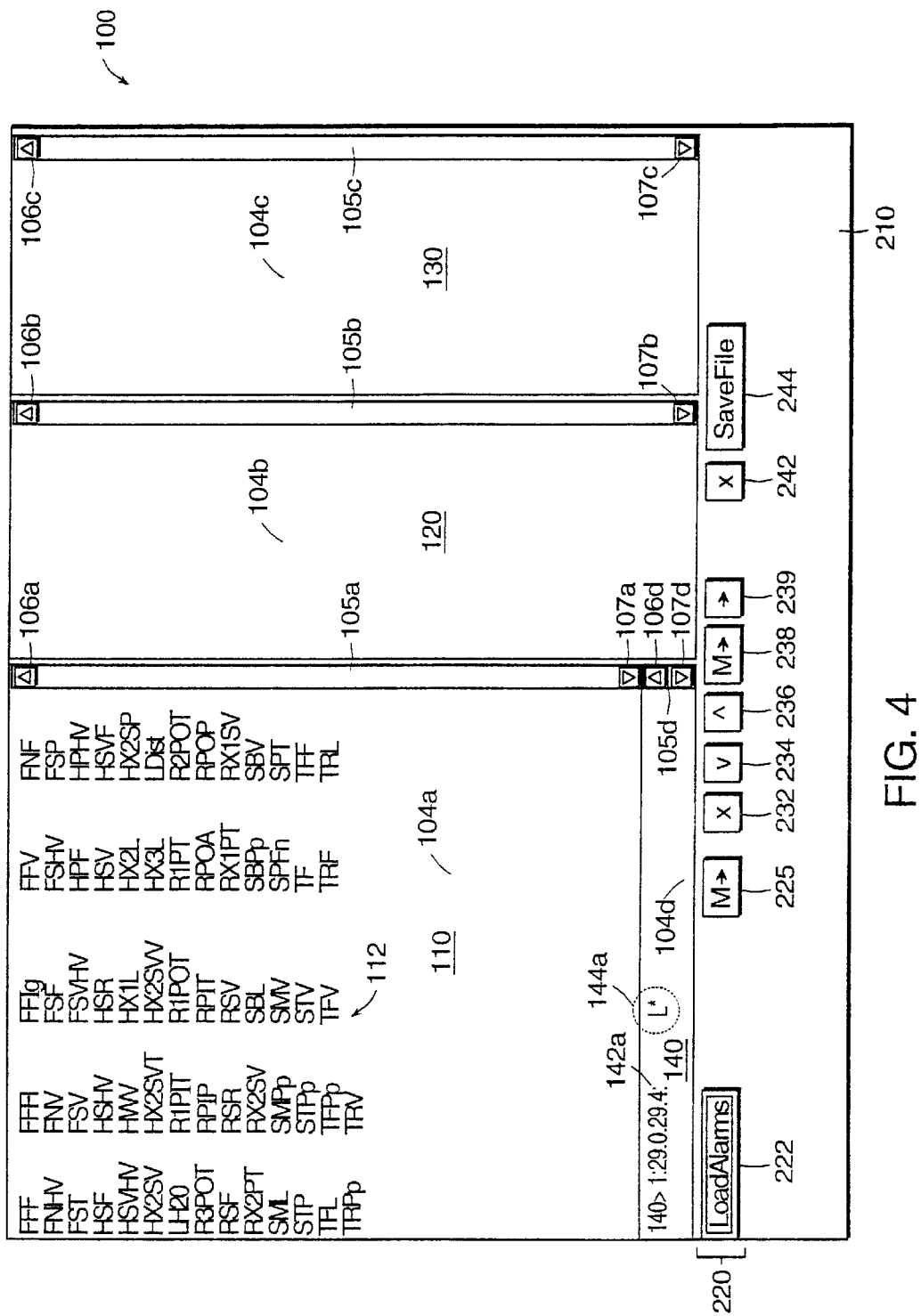
FIG. 4 is a screen display of the application window of the FIG. 3 illustrating a main alarm list and an input window selection portion within the alarm list.

FIG. 4 illustrates an input window 110 having a larger input window list 112 than in the previous discussion. Also illustrated is the input window selection portion 140 having an input window selection list 142a. The input window selection list 142a indicates an input window selection criteria list 144a.

When the LoadAlarms button 222 is activated, used without the input window 110 having been cleared, an input window list 112 appears in the input window 110. In an alternate embodiment, a default input window list 112 is always displayed in the input window 110. Until a move operation occurs, no lists are displayed in the temporary window 120 and output window 130. In the example of FIG. 4, the user has previously selected a substring or partial character pattern 115 beginning with "L". In response, the input window selection portion 140 displays an input window selection list 142a, with input window selection criteria list 144a, having selection criteria "L*". Preferably, the "L*" indicates that a wildcard is being used, such that an alarm indication in the input window list 112 beginning with a letter "L" is moved to the temporary window 120 if an M→button 225 command is issued.

Figure 5A:
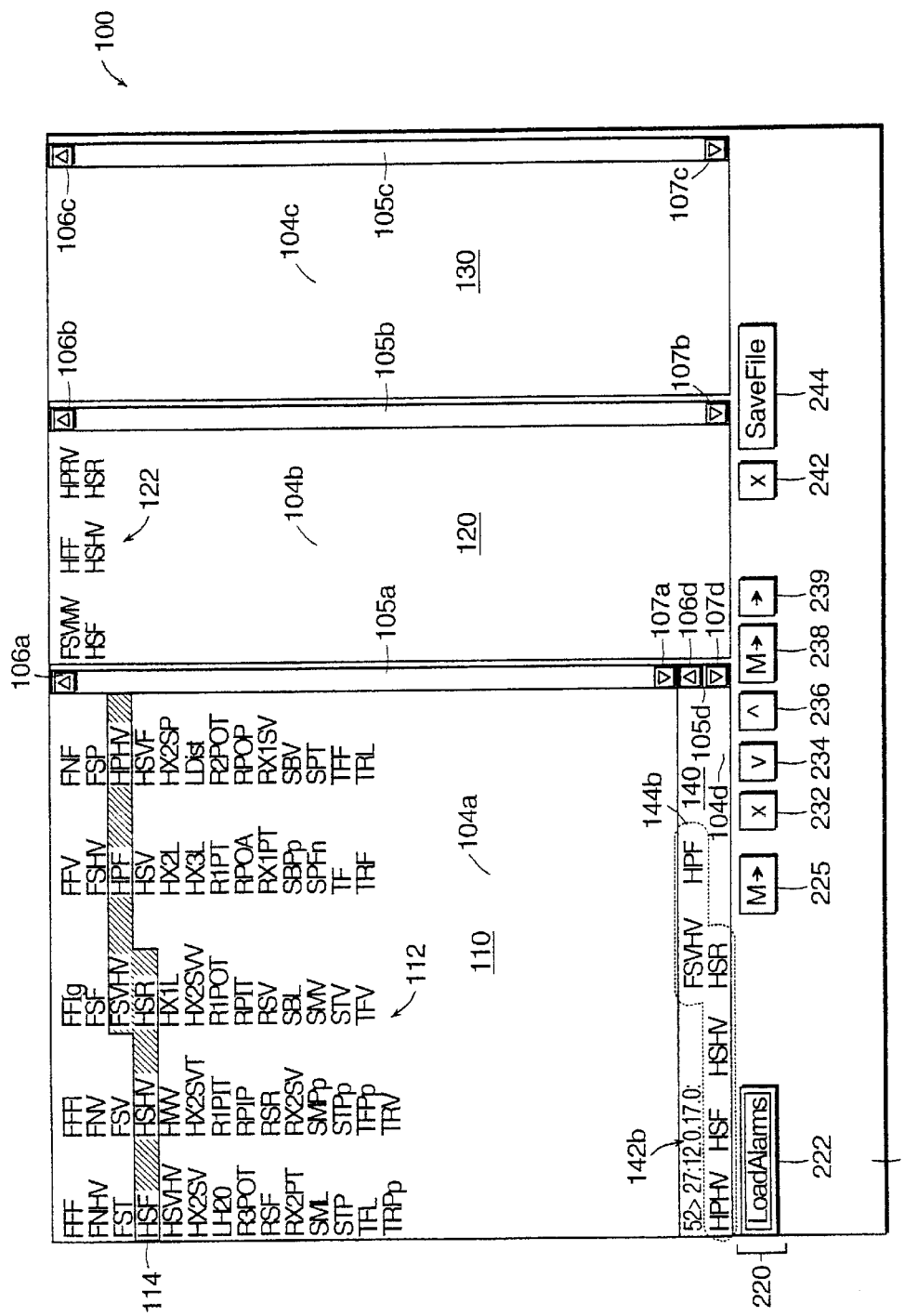
FIG. 5A is a screen display of the application window of FIG. 4 illustrating a selected full character pattern, the input window selection portion response, and the resulting temporary window list after an input window list move operation.

FIG. 5A illustrates an input window 110 having an input window list 112. The input window list 112 is read from an input file 10 in response to a user's selecting the LoadAlarms button 222. In the embodiment shown, a "mouse click" on the graphical representation of the LoadAlarms button 222 is a method of selecting that button and effectuating the corresponding load operation.

A selected full character pattern 114 is shown in the input window list 112 by the use of a highlighted portion. The selected full character pattern 114 is also represented in the input window selection criteria list 144b. Note that the full character pattern of each selected alarm indication in the selected full character pattern 114 is shown in the input window selection criteria list 144b, and that there are no wildcard entries (i.e., "*").

The temporary window 120 displays a temporary window list 122. The temporary window list 122 results from an M→button 225 operation after an input window selection criteria has been entered by a user (as indicated by input window selection criteria list 144b).

Restated, Case 1 of M→button 225 cases is: consecutive complete alarm indications selected by a single selection are all transferred. Because the temporary window list 122 accumulates, additional alarm indications may be added to the temporary window list 122 by making another selection in the input window list 112 and operating M→button 225.

In the preferred embodiment, a computer mouse input device 9 controlling a GUI window text cursor is used to select alarm list entries, and the resulting selection is shown in inverse text (e.g., the selected full character pattern 114). In an alternate embodiment, a change of text color is used to represent a selection. Still, in a further embodiment, alarm icons are dragged and dropped to make a selection.

Figure 5B:
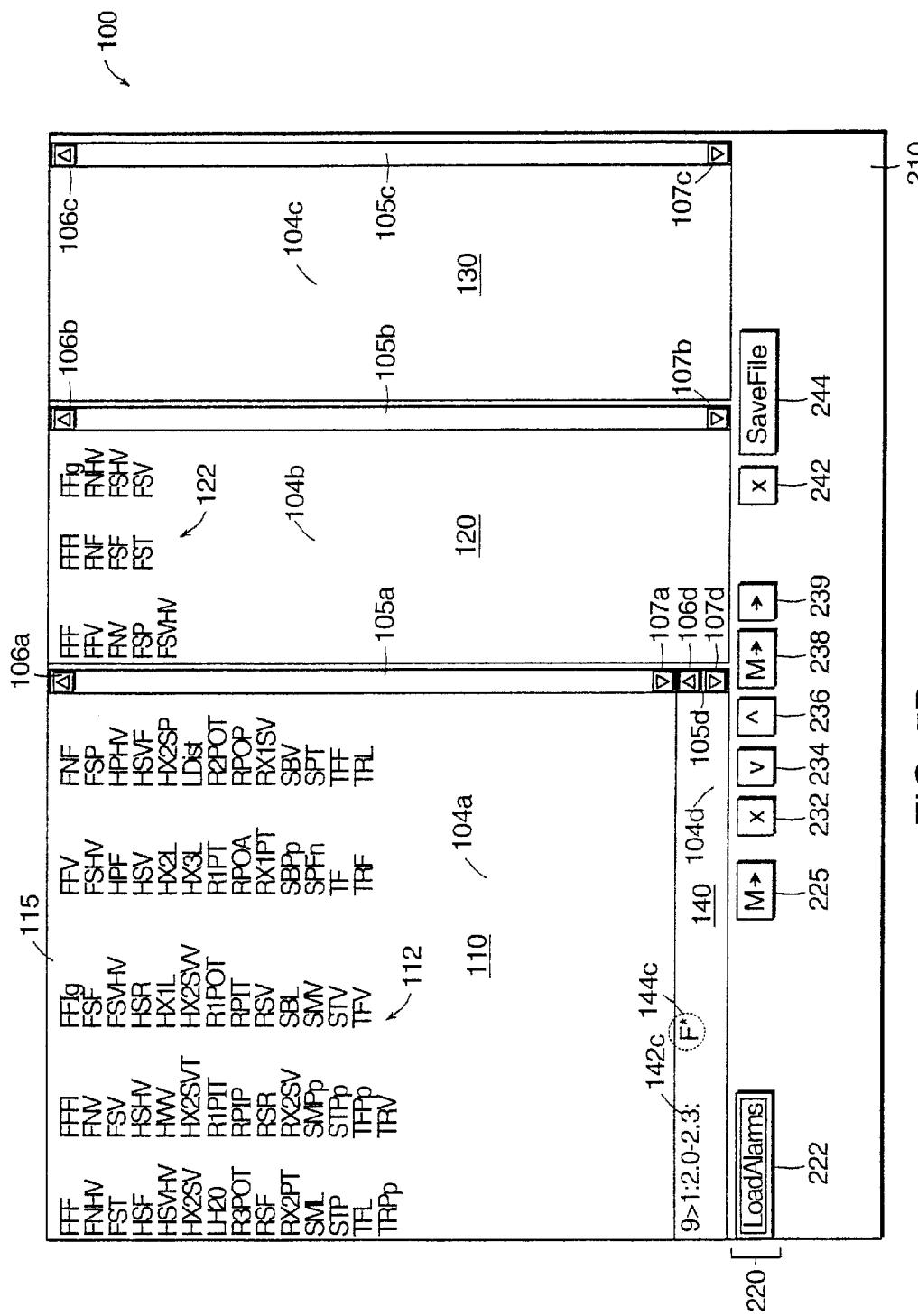
FIG. 5B is a screen display of the application window of FIG. 4 illustrating a selected beginning character pattern, the input window selection portion response to the selection, and the resulting temporary window list after a move operation.

FIG. 5B is another illustration of input window 110 having an input window list 112. Shown is a selected beginning partial character pattern 115, also reported in input window selection criteria list 144c. After an M→button 225 command, the temporary window list 122 receives a subset of the input window list 112 in response to the selected beginning partial character pattern 115. In the illustrated example, the temporary window list 122 entries all begin with an "F", thereby showing the results of a wildcard entry, "F*", as seen in the input window selection criteria list 144c. This is Case 2 of the M→button 225 cases: selected beginning partial character patterns (substrings) 115 are used to select all alarm indications that have the same beginning characters as the selected pattern/substring 115.

Figure 5C:
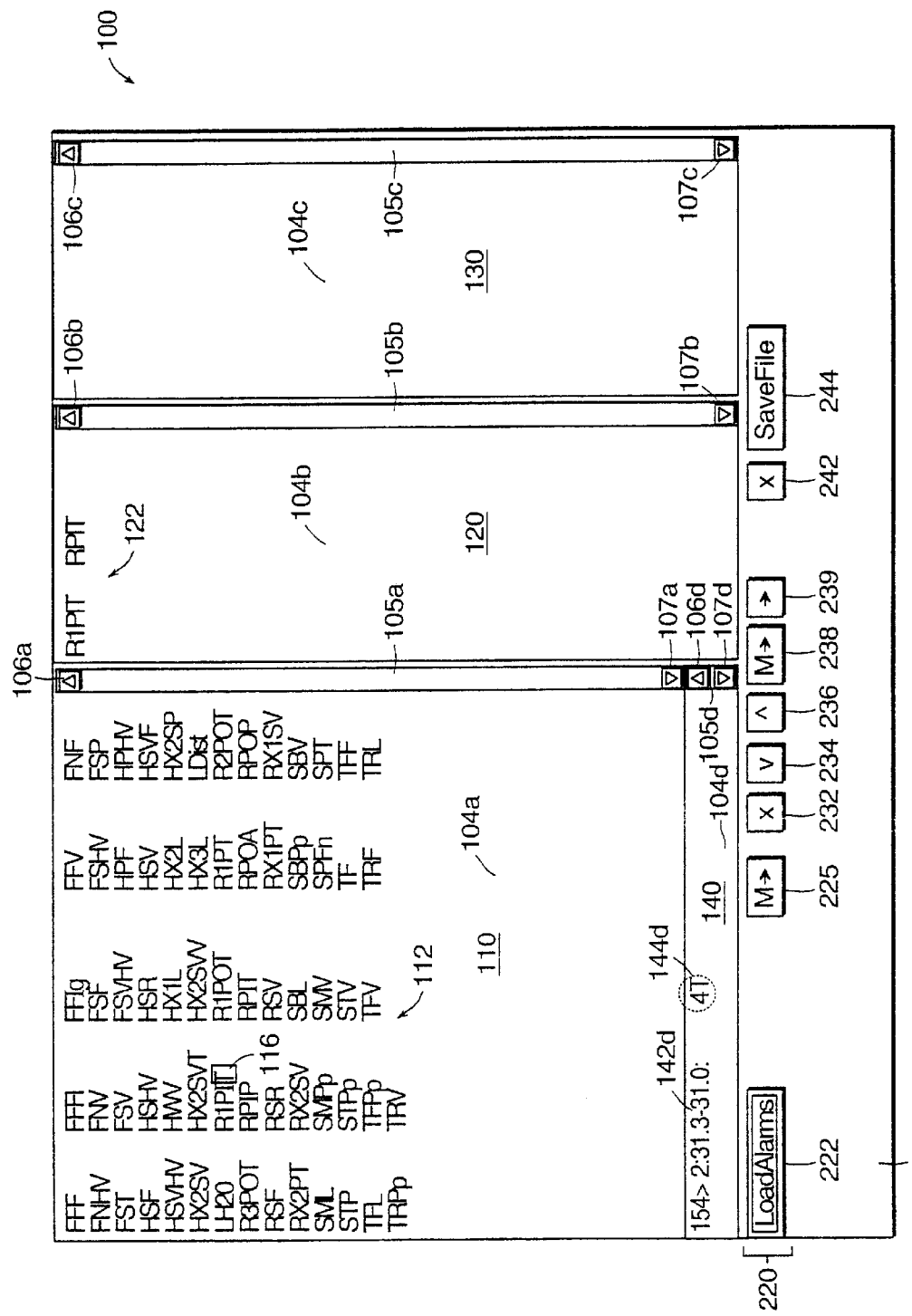
FIG. 5C is a screen display of the application window of FIG. 4 illustrating a selected ending pattern, the input window selection portion response to the selection, and the resulting temporary window list after an input window list move operation.

FIG. 5C is another illustration of an input window 110 having an input window list 112. Shown is a selected ending partial character pattern 116. After an M→button 225 command, the temporary window list 122 receives a subset of the input window list 112 in response to the selected ending partial character pattern 116. Notice that the temporary window list 122 entries all end with a "IT", thereby showing the results of a wildcard entry, "*IT", as indicated in the input window selection criteria list 144d. This is Case 3 of the M→button 225 cases: selected ending partial character patterns 116 are used to select all alarm indications that share the same ending characters as the selected pattern 116.

Figure 5D:
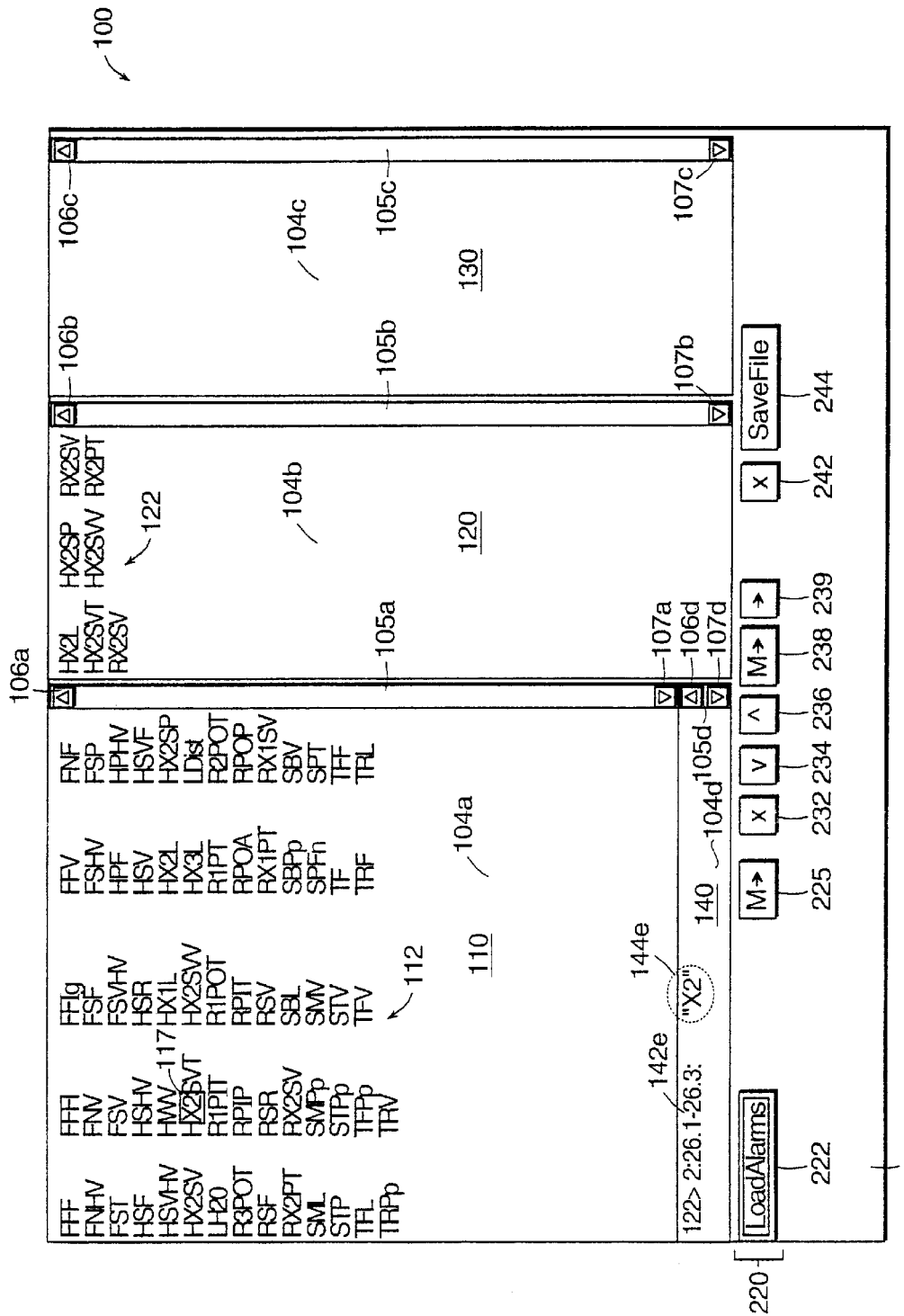
FIG. 5D is a screen display of the application window of FIG. 4 illustrating a selected intermediate character pattern, the input window selection portion response to the selection, and the resulting temporary window list after an input window list move operation.

FIG. 5D is another illustration of an input window 110 having an input window list 112. Shown is a selected intermediate character pattern (substring) 117, also reported in input window selection criteria list 144e. After an M→button 225 command, the temporary window list 122 receives a subset of the input window list 112 in response to the selected intermediate partial character pattern 117. Notice that the temporary window list 122 entries all contain an "X2", thereby showing the results of a wildcard entry, "*X2*", as indicated in the input window selection criteria list 144e. This is Case 4 (last case) of the M→button 225 cases: selected intermediate (neither beginning nor ending) partial character patterns (substrings) 117 are used to select all alarm indications that share the same embedded or intermediate consecutive characters.

In alternate embodiments of the present invention, other wildcard indicators are used in addition to "*", including but not limited to "?", "$", " . . . " to represent "any other text character(s)."

Figure 6A:
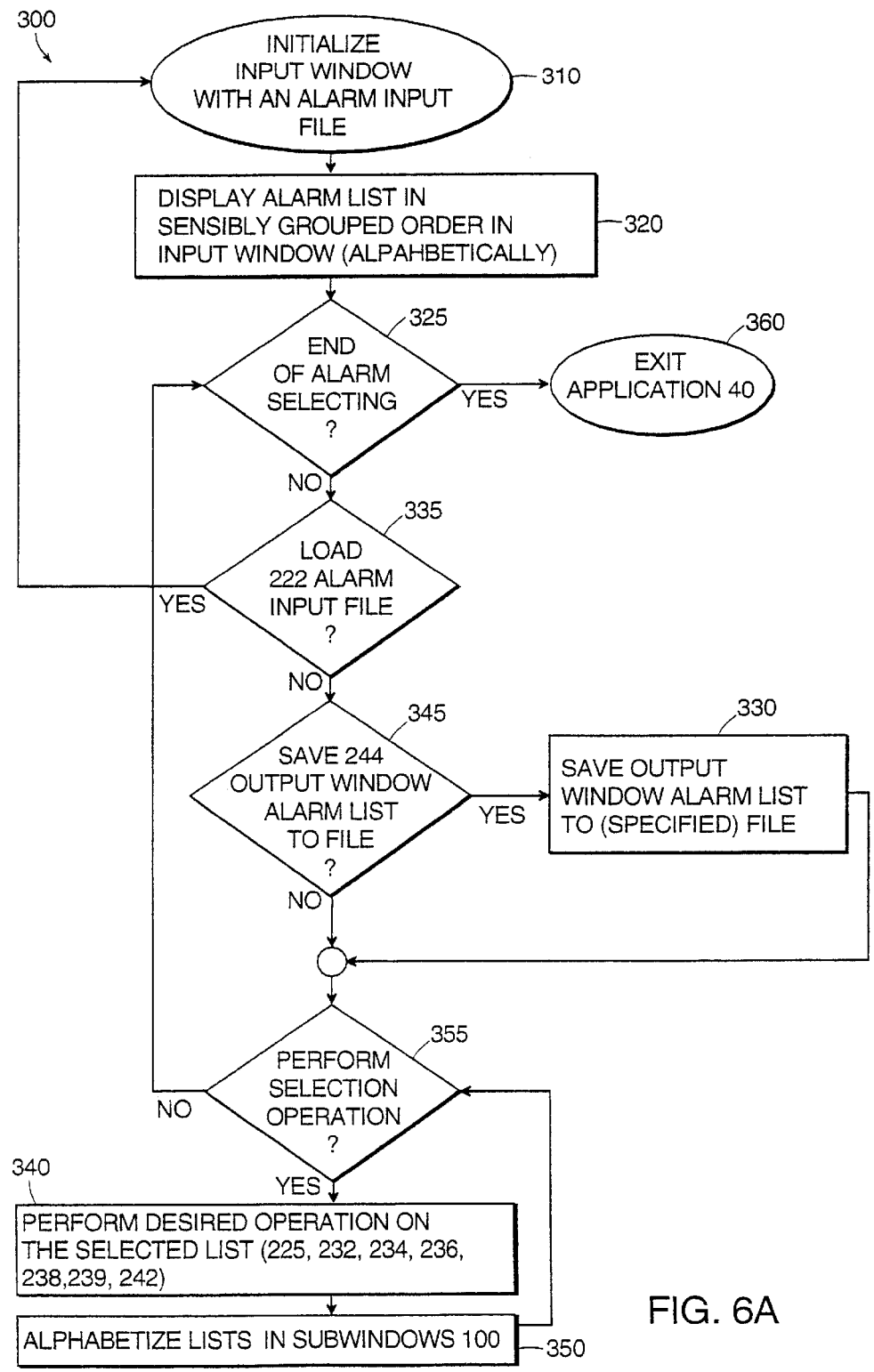
FIG. 6A is a flow diagram of the preferred embodiment of the present invention of FIG. 1.

FIG. 6A shows a flow diagram 300 of the preferred embodiment of the present invention. In general, the alarm analysis tools visual configuration application 40 begins by initializing the input window 110 with an alarm input file 10 in Step 310, and ends when the answer to a query of whether the user has finished selecting alarms in Step 325 is "YES", resulting in exiting the alarm analysis tools visual configuration application 40 in Step 360.

Initializing the input window 110 with an alarm input file 10 in Step 310 begins the visual configuration application 40 and the user's selection of alarm indications. This step commences by operating (i.e., selecting) the LoadAlarms button 222. The next step is to list the input window list 112 in a sensibly grouped order in step 320 in the input window 110. In the preferred embodiment, arranging the input window alarm list 112 in a sensibly grouped order in step 320 means arranging the input window list 112 alphabetically by alarm name.

Next, a query as to whether the user is at the end of alarm selection in Step 325 is asked. If the answer is "YES", the visual configuration application 40 exits in Step 360. If the answer is "NO", then a load input file query in Step 335 is determined.

If the answer to the LoadAlarm input file query in Step 335 is "YES" (i.e., the LoadAlarms button 222 was selected), then an initialize input window 110 with an alarm input file 10 is performed in Step 310. If the answer to the LoadAlarn input file query in step 335 is "NO", then a save output window alarm list to file query in Step 345 is asked.

If the save output window alarm list to file query in Step 345 is answered "YES", then a save output window alarm list to a specified file in Step 330 is performed. (Note that the SaveFile button 244 was selected by the user to reach this step.) If the answer to the save output window alarm list to file query in Step 345 is "NO", then a perform list selection operation query in Step 355 is asked. Also, in one embodiment of the present invention method, in the save output window alarm list to a specified file Step 330, a standard GUI "savefile" message box gives the user the ability to specify what the output file 30 name is and in which disk directory the output file 30 is to be saved.

If the perform list selection operation in Step 355 is answered "YES", then the present invention performs a desired operation on the selected list in Step 340. After performing the desired operation on the selected list in Step 340 is performed, the preferred embodiment alphabetizes (or otherwise orders) the lists in Step 350 in all of the subwindows 102. Then, the perform list selection operation query in Step 355 is asked again. If the perform list selection operation query in step 355 is answered "NO", then the end of alarm selecting query in Step 325 is asked again, and operation continues as described above.

Figure 6B:
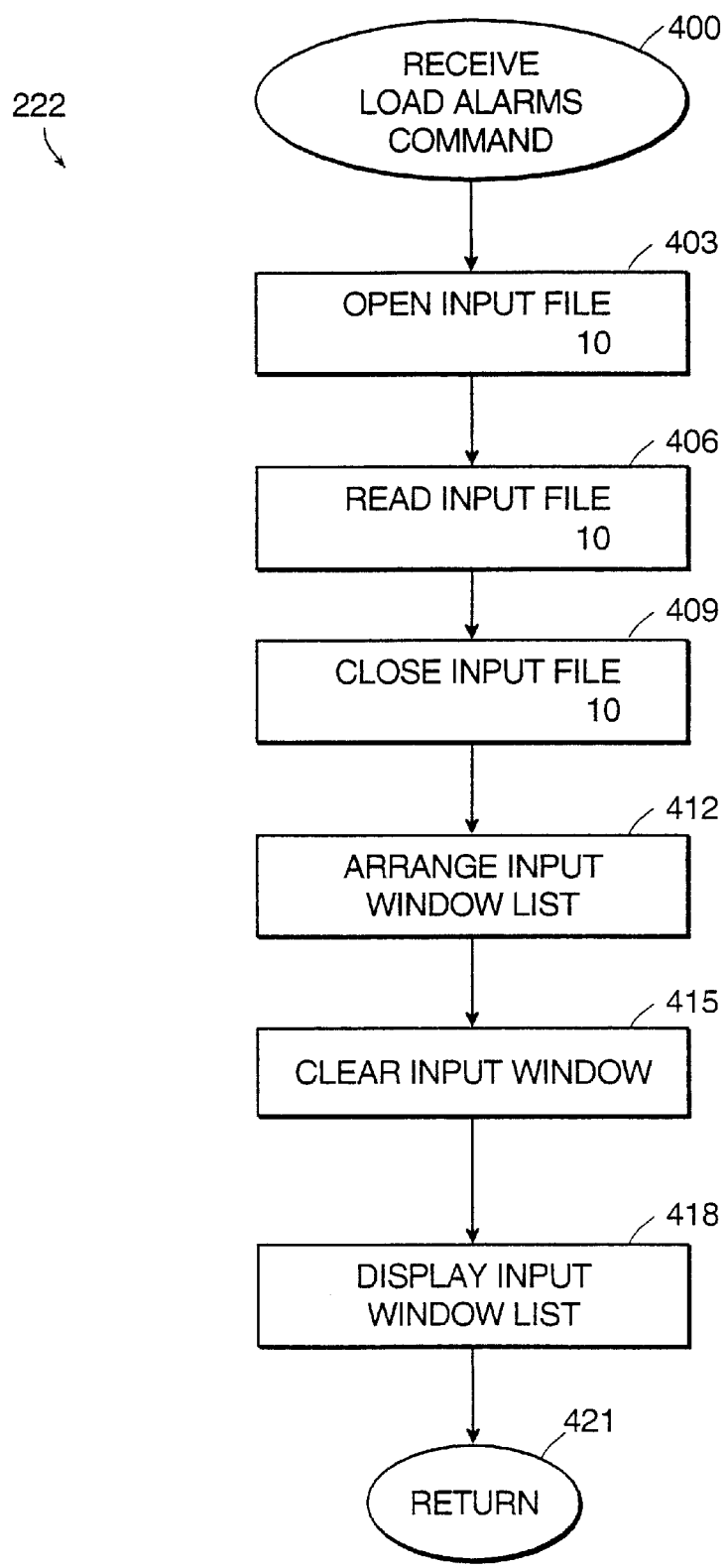
FIG. 6B is a flow diagram of an underlying process for a 'LoadAlarms' operation.

FIG. 6B shows a set of process steps for when a user issues a LoadAlarms button 222 command, such as at step 335 in FIG. 6A. The LoadAlarms button 222 allows the user to have an input file 10 read into the input window list 112 and displayed in the input window 110.

The LoadAlarms set of process steps begins by receiving a LoadAlarms command in step 400. This initiates an open input file process in step 403, where an input file alarm list 12 is read from the input file 10. The open input file process in step 403 facilitates communication between the visual configuration application 40 and the input file 10. In an embodiment of the present invention, a typical graphical user interface query window is used to enable the user to specify the input file 10 to be loaded by the alarm analysis tools visual configuration application 40.

A read input file occurs in step 406. The read input file in step 406 uses various methods to read in the input file alarm list 12, depending on the format of the input file 10. For example, the input file 10 in the preferred embodiment of the present invention is a text file format, so a text-file read format is employed. Binary files and other file formats in other embodiments of the present invention use read input file 10 protocols in step 406 appropriate for the given file format.

The close input file process in step 409 occurs next. Closing the input file after a read operation is traditionally used as a safety method to ensure the input file 10 does not get corrupted.

The input file alarm list 12 is then arranged in the input window list in step 412, where the input file alarm list indications 13 are arranged in a sensibly grouped order, preferably alphabetically. Icons and text are also arranged in a sensibly grouped order when there is that combination of alarm indications; the same is true for additional types of alarm indications.

The input window 110 is cleared in step 415 in preparation of the next step. Next, the input window list 112 is displayed in the input window 110 in step 418. The new input window list 112 is also referred to as a "main alarm list" 112.

After the above procedure has taken place, the Load-Alarms process then returns to a calling routine in step 421. In particular, control returns to step 335 in FIG. 6A of the main flow diagram 300 of the present invention.

Figure 6C:
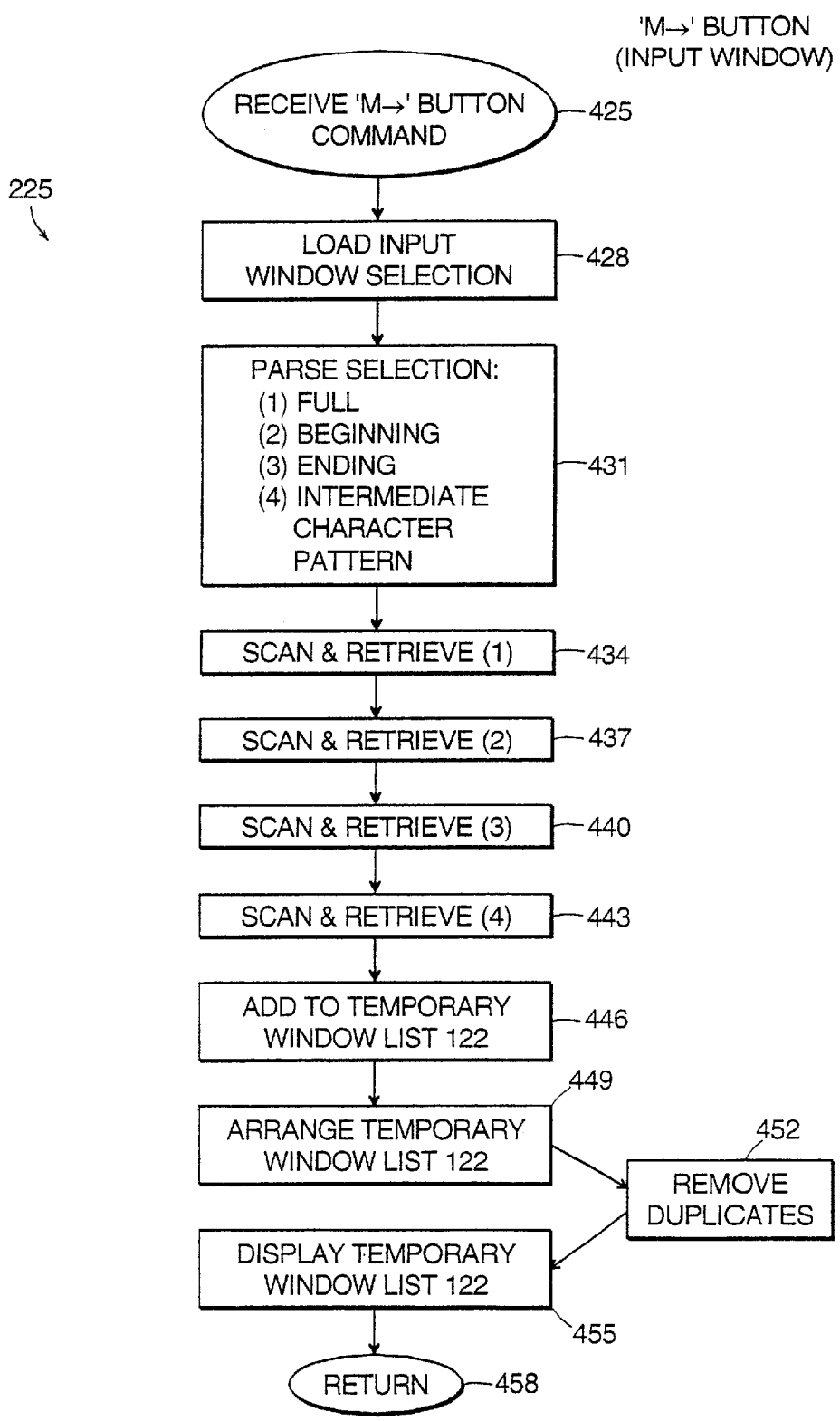
FIG. 6C is a flow diagram of an underlying process for an input window selection move operation.

FIG. 6C is an underlying process of an M→button 225 command. After receiving an M→button 225 command in step 425, this routine loads an input window selection in step 428. In one embodiment of the present invention, the selection is stored in memory in the auxiliary computer 8 and is accessed through arrays, linked lists, or other data structure types used for handling groups of items having similar properties as the user selection.

A parsing of the input selection in step in 431 occurs after the input selection is loaded in step 428. The parsed selection separates the received selection data into (1) full character patterns 114, (2) beginning character patterns 115, (3) ending character patterns 116, and (4) intermediate character patterns 117.

Scanning for and retrieving full character patterns 114 occurs in step 434. Scanning in this context means to search through the input window list 112 and find matches for the full character patterns 114 in the alarm indications. Retrieving matches occurs in step 434, wherein matching alarm indications from input window list 112 are stored in a temporary location for further referencing.

Scanning for and retrieving beginning partial character patterns 115 occurs in step 437. In this case, scanning the input window list 112 is performed, whereby any input window list 112 alarm indications having a same beginning character pattern as the selected beginning partial character pattern 115 is retrieved and stored in a temporary location.

Scanning for and retrieving the ending partial character pattern 116 matches occurs in step 440. The scanning looks through the input window list 112 for any input window list 112 alarm indications having a same ending character pattern as the selected ending partial character pattern 116. Any matches are retrieved and stored in a temporary location.

Scanning for and retrieving the intermediate partial character pattern 117 matches occurs in step 443. The scanning looks through the input window list 112 alarm indications for any pattern having a same intermediate pattern as the selected intermediate partial character pattern 117. Any matches are retrieved and stored in a temporary location.

All alarm indications retrieved and stored in a temporary location in steps 434, 437, 440, 443 are added to the temporary window list 122 in step 446. Preferably, step 446 performs an aggregation to the temporary window list 122, not a delete and replace operation. That allows a user to perform multiple input window 110 selections to increase the temporary window list 122.

Rearranging the aggregate temporary window list 122 in step 449 occurs after receiving the additional alarm indications in step 446. A rearranging in step 449 arranges alarm indications in the temporary window list 122 into a sensibly grouped order, preferably alphabetically, as before, but now includes the added alarm indications from step 446.

Because some of the alarm indications in the aggregate temporary window list 122 can be the same due to aggregation in the selection process, a removing duplicates operation in step 452 is performed. In one embodiment, the removing duplicates operation in step 452 occurs after the arranged temporary window list in step 449. There is an efficiency in this arrangement of steps 449 and 452 because the alphabetizing of the preferred embodiment makes removing duplicates in step 452 a fast task due to duplicates being next to each other in the aggregate temporary window list 122. In turn, searching for duplicates is made to be a faster process than if the aggregating window list 122 is not in alphabetical order. The resulting temporary window list 122 is displayed in the temporary window 120 in step 455. In one embodiment of the present invention, the previous temporary window list 122 is merely overwritten by the resulting temporary window list 122, so a clear window operation is unnecessary.

After performing the M→button 225 command procedure, a return to the calling routine in step 458 enables the alarm analysis tools visual configuration application 40 flow diagram 300 of FIG. 6A to resume normal operation, thereby allowing a user to make further modifications toward the end goal.

Figure 6D:
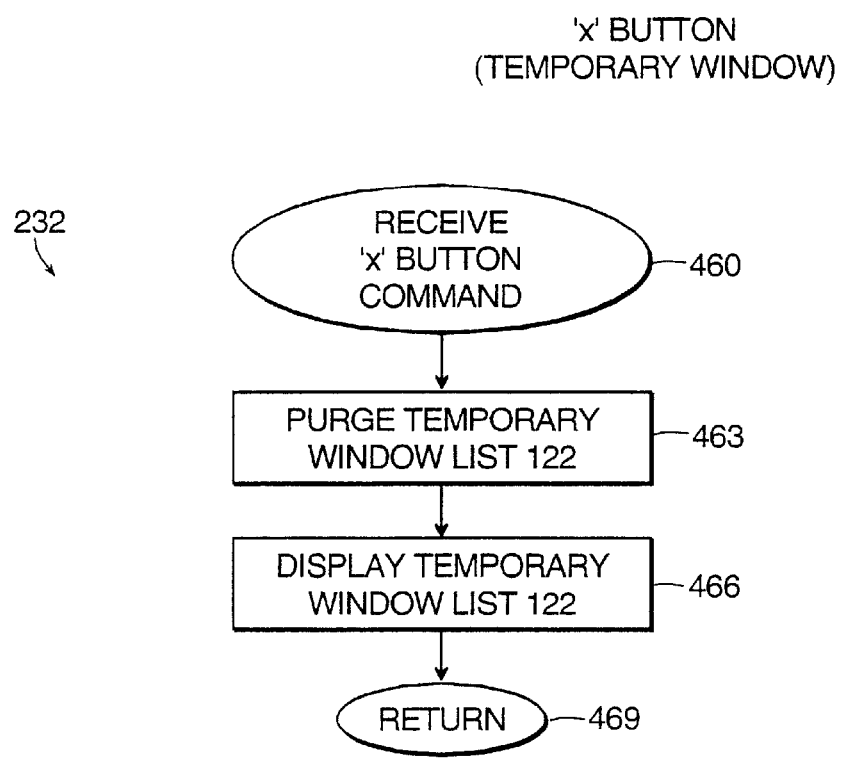
FIG. 6D is a flow diagram of an underlying process for a temporary window purge operation.

FIG. 6D shows the 'x' button 232 command process steps. The 'x' button 232 command is received in step 460. After receiving the x button 232 command, the visual configuration application 40 purges the temporary window list 122 in step 463. After the purging step 463, an empty temporary window list 122 is displayed in the temporary window 120 in step 466. In other words, an empty temporary window list 122 displays no alarm indications in the temporary window 120. In an embodiment of the present invention, the temporary window list 122 contains enough data element space such that the temporary window 120 will display no alarm indications when displaying an empty window list 122. In an alternate embodiment, the display temporary window list 122 in step 466 also contains a clear the temporary window 120 process such that the temporary window 120 shows no alarm indications after the x button 232 is used by the user.

After performing the x button operation, a return to the calling routine is performed in step 469 and control is given back to the alarm analysis tools visual configuration application 40 to enable the user to continue operation.

Figure 6E:
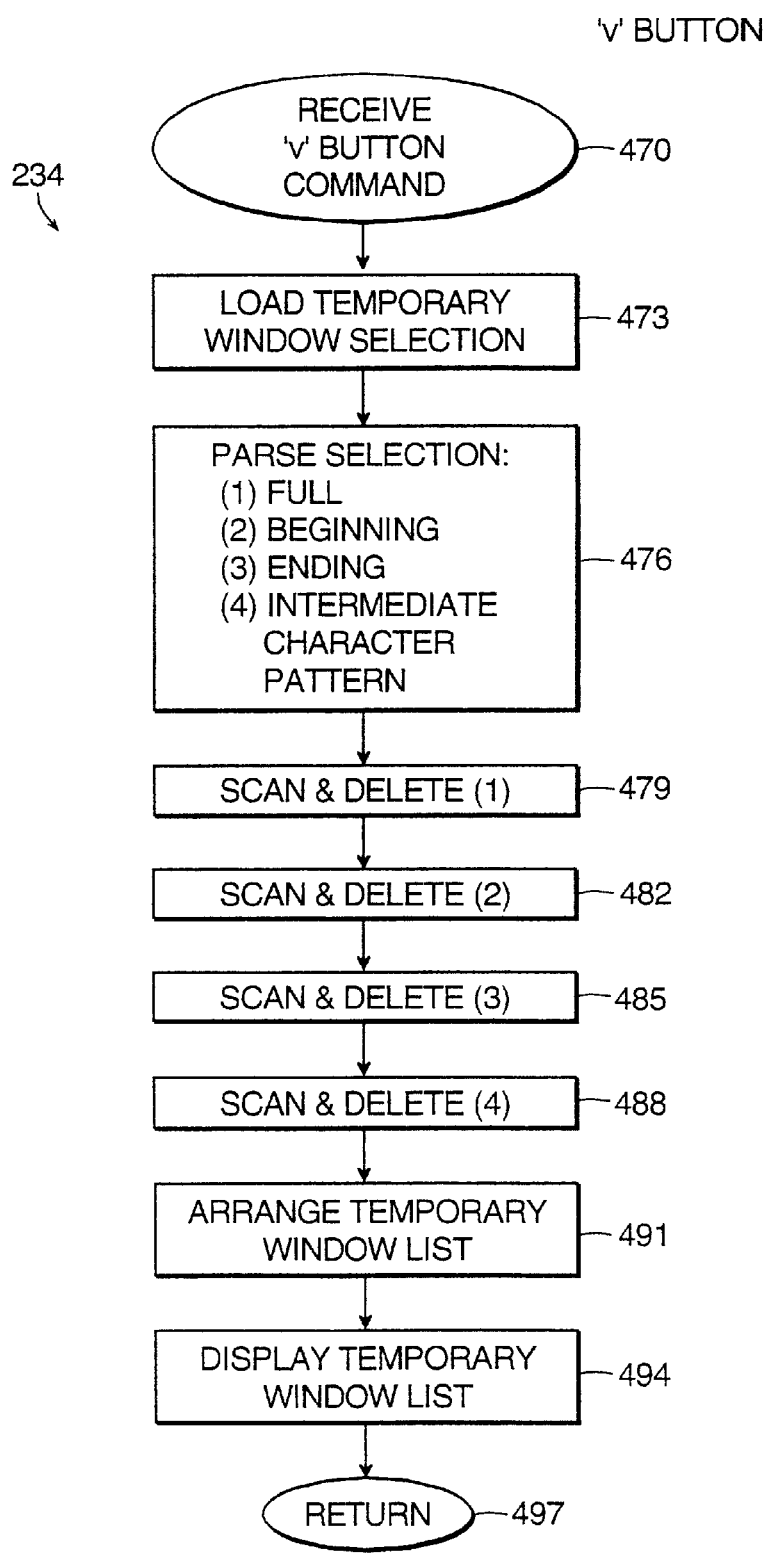
FIG. 6E is a flow diagram of an underlying process for a temporary window selection delete operation.

FIG. 6E shows a 'v' button 234 process steps. After receiving a 'v' button 234 command in step 470, a temporary window selection is loaded in step 473. This means that any highlighted (and hence user selected) text, icons, or other alarm indications in the temporary window 120 are going to be part of the operation discussed below.

A parsing of the selection occurs in step 476. There are four different groups into which the selection can be parsed: (1) selected full character patterns 114, (2) selected beginning partial character patterns 115, (3) selected ending partial character patterns 116, and (4) selected intermediate partial character patterns 117.

First, scanning and deleting the selected full character patterns 114 is performed in step 479. A scanning of the temporary window list 122 finds any matches for the selected full character pattern 114. Likely, the only match is the selected full character pattern 114 itself. Deleting removes any found selected full character pattern 114 matches from the temporary window list 122.

Second, scanning and deleting in step 482 is performed to search for and delete matches in the temporary window list 122 having the same character pattern as the selected beginning partial character pattern 115. The scanning step of the temporary window list 122 looks for any alarm indications having the same beginning partial character pattern as the selection. The deleting step removes any alarm indications having the same beginning partial character pattern as the selected beginning partial character pattern 115 from the temporary window list 122.

Third, scanning and deleting in step 485 occurs wherein scanning of the temporary window list 122 is done to find any alarm indications having the same ending partial character pattern as the selected ending partial character pattern 116. Any found matches are deleted in step 485 from the temporary window list 122.

Fourth, scanning and deleting for the selected intermediate partial character pattern 117 occurs in step 488. Here, a scanning of the temporary window list 122 looks for any alarm indications having a same intermediate partial character pattern as the selected intermediate partial character pattern 117. Found matches are deleted in step 488.

After the scanning and deleting in steps 479, 482, 485, 488 are complete, arranging of the temporary window list 122 occurs in step 491 in which the temporary window list 122 is again arranged in a sensibly grouped order, preferably alphabetically. Non-deleted alarm indications are shifted forward in the list to fill in locations in the temporary window list 122 from which selected alarm indications were deleted, thereby leaving no gaps in the temporary window list 122 displayed in the temporary window 120. The displaying of the resulting temporary window list 122 occurs in step 494.

After the resulting temporary window list 122 has been displayed in the temporary window 120 in step 494, the 'v' button 234 process is completed and a return to a calling routine occurs in step 497. The main flow diagram 300 (FIG. 6A) of the visual configuration application 40 now has control to enable the user to continue processing alarm indications.

Figure 6F:
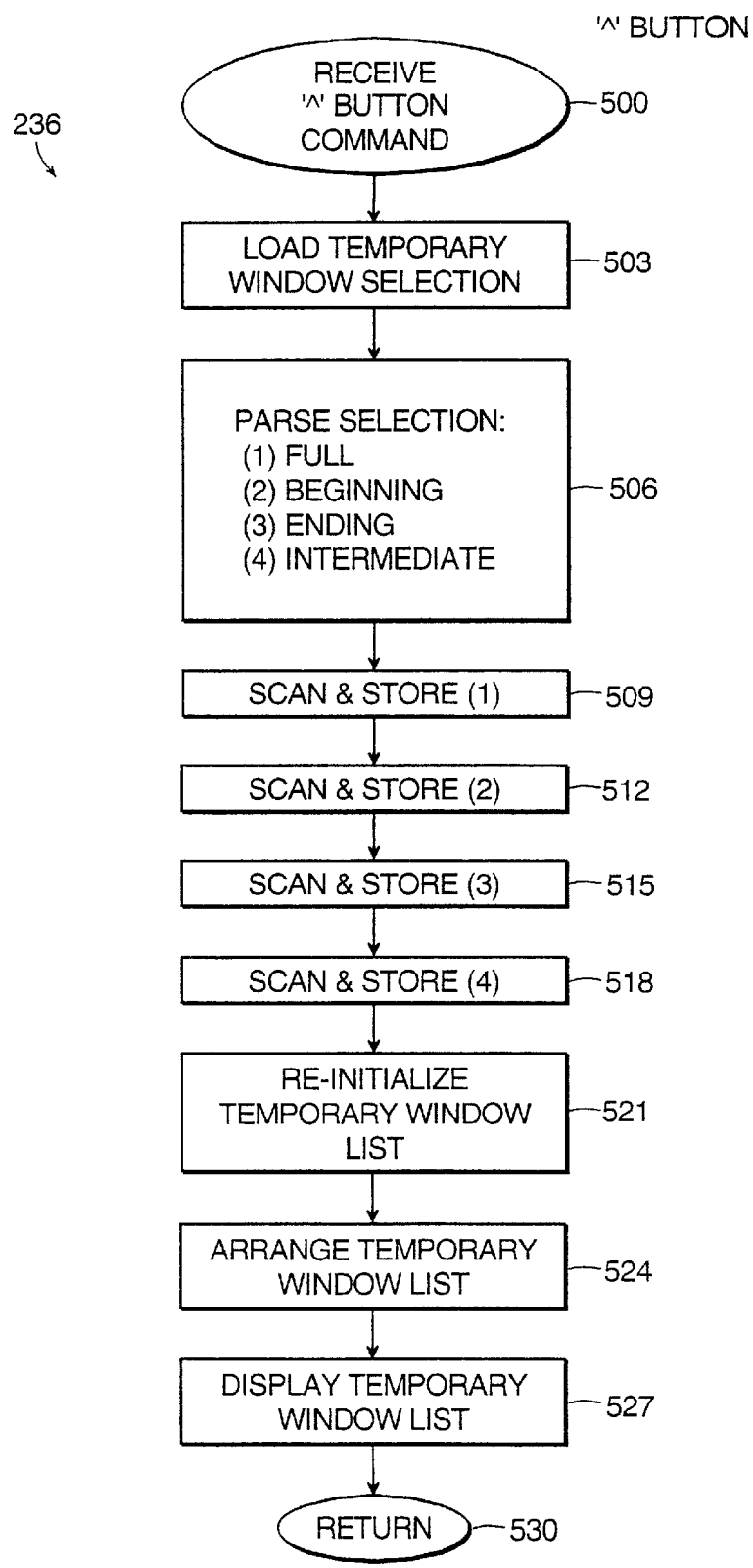
FIG. 6F is a flow diagram of an underlying process for a temporary window selection retain operation.

FIG. 6F shows the process for a '^' button 236. After receiving the '^' button 236 command in step 500, this process loads the temporary window selection in step 503. The temporary window selection comprises alarm indications in the temporary window list 122.

A parsing of the temporary window selection occurs in step 506. Parsing breaks the user input selection into four groups: (1) a selected full character pattern 114, (2) a selected beginning partial character pattern 115, (3) a selected ending partial character pattern 116, and (4) a selected intermediate partial character pattern 117. Scanning for each of these selection groups follows.

Scanning for and storing the selected full partial character pattern 114 in the temporary window list 122 occur in step 509. First, the scanning of the temporary window list 122 in the temporary window 120 for alarm indications matching the subselection (1) occurs. Then, any matches are stored in a keep-only memory.

Scanning and storing operations in step 512 occur next. The temporary window list 122 in the temporary window 120 is scanned for alarm indications matching the subselection (2). Any matches having the same beginning partial character pattern 115 are located. All matching alarm indications are stored in a keep-only memory.

Scanning and storing operations in step 515 occur next, where the temporary window list 122 in the temporary window 120 is scanned for alarm indications matching the subselection (3). Then, any alarm indications found as a match of the ending partial character pattern 116 are stored in a keep-only memory.

Scanning and storing operations in step 518 occur next. First, scanning the temporary window list 122 in the temporary window 120 for alarm indications matching the subselection (4) occurs. Second, after the scan, alarm indications found as a match are stored in a keep-only memory.

The temporary window list 122 is reinitialized in step 521 with all alarm indications found as matches in steps 509, 512, 515, 518 and having been stored in the keep-only memory. The temporary window list 122 is essentially over-written with only those alarm indications having been found to be matches. The rest of the temporary window list 122 is cleared of any alarm indications.

The resulting temporary window list 122 is arranged in a sensibly grouped order, preferably alphabetically, in step 524 after having been reinitialized in step 521. Continually arranging the window lists in a sensibly grouped order is intended to keep lists orderly and consistent for the user.

A display of the temporary window list 122 is performed in step 527, where the ordered, resulting temporary window list 122 is displayed in the temporary window 120. An older temporary window list 122, having been reduced in size by the '^' button operation, is cleared in an embodiment of the present invention before the reinitialized temporary window list 122 is displayed.

A return to a calling routine occurs in step 530, thereby giving control back to the alarm analysis tools visual configuration application 40 (flow diagram 300, FIG. 6A) to enable the user to continue selecting alarm indications.

Figure 6G:
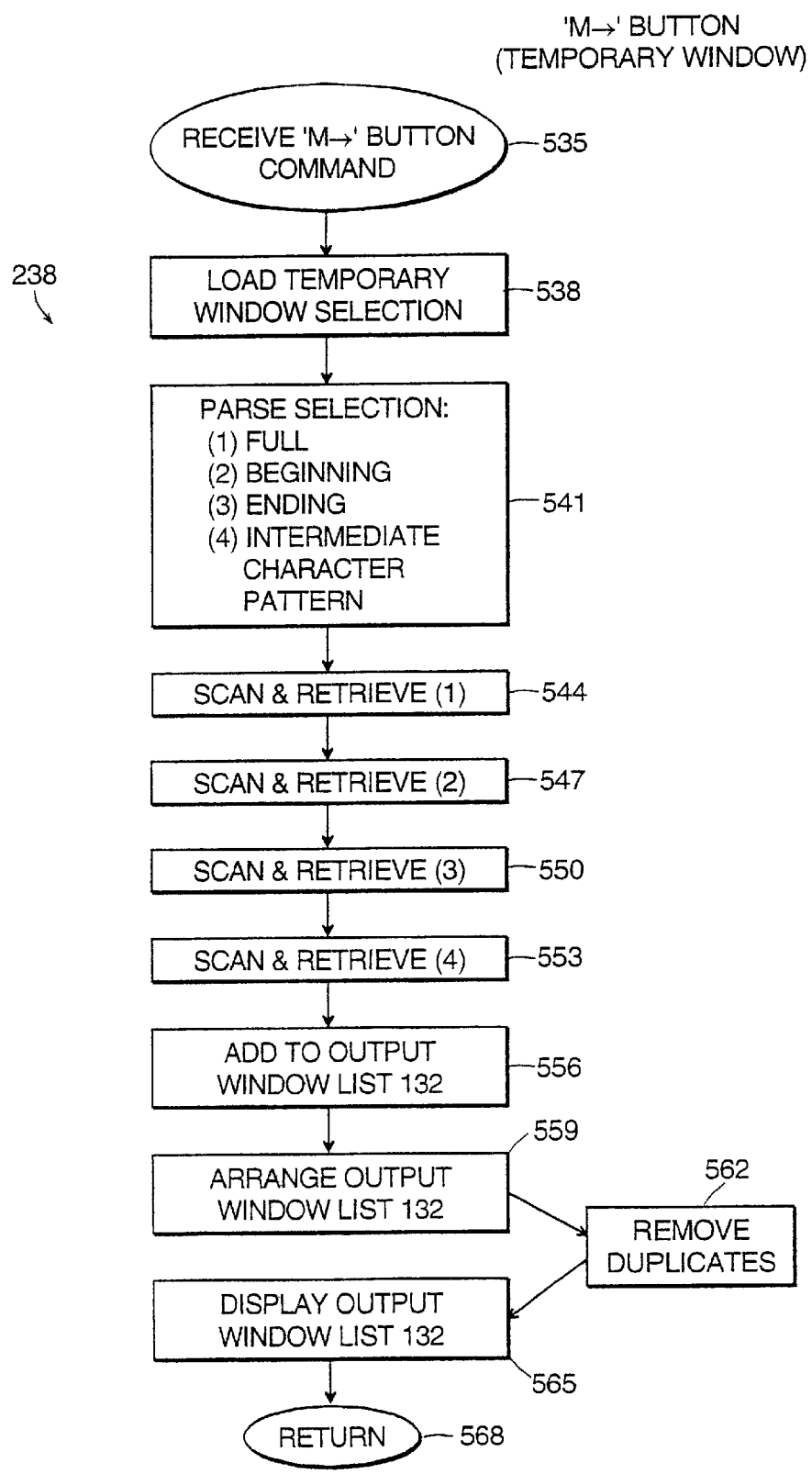
FIG. 6G is a flow diagram of an underlying process for a temporary window selection move operation.

FIG. 6G shows a temporary window 'M→' button 238 operation. The M→button 238 represents a mouse (i.e., computer mouse) selection move operation, whereby alarm indications in the temporary window list 122 matching a user's selection are copied into the output window list 132 and displayed in the output window 130.

An M→button command is received in step 535. Then, a temporary window selection is loaded in step 538 and parsed in step 541.

In the parsing operation in step 541, the selection is parsed into four groups: (1) a selected full character pattern 114, (2) a selected beginning partial character pattern 115, (3) a selected ending partial character pattern 116, and (4) a selected intermediate partial character pattern 117. The temporary window list 122 is next scanned for alarm indications matching the user selected alarm indication character patterns of these four groups.

Scanning and retrieving operations in step 544 scans the temporary window list 122 in the temporary window 120 for alarm indications matching the subselection (1) and retrieves identified matches. All matching alarm indications are copied into the output window list 132. Note that in the preferred embodiment, the updated output window list 132 is not immediately displayed in the output window 130; only after the entire M→button operation sequence has been completed does a display update occur so that the subwindows 120, 130 do not have continual updates, thereby being distracting to the user.

Scanning and retrieving operations in step 547, wherein the temporary window list 122 in the temporary window 120 is scanned for alarm indications matching the subselection (2). All matching alarm indications in the temporary window list 122 are copied to the output window list 132.

A scanning and retrieving operation in step 550 occurs, wherein the temporary window list 122 in the temporary window 120 is scanned for alarm indications matching the subselection (3). All matching alarm indications having a same ending pattern as the selected ending partial character pattern 116 are copied to the output window list 132.

A scanning and retrieving operation in step 553 occurs, wherein the temporary window list 122 in the temporary window 120 is scanned for alarm indications matching the subselection (4). Then, all matching alarm indications in the temporary window list 122 having a same character pattern as the selected intermediate partial character pattern 117 is retrieved and copied to the output window list 132.

In step 556, the additions resulting from steps 544, 547, 550, 553 are aggregated in the output window list 132, as opposed to overwriting.

In step 559, the output window list 132 is arranged in a sensibly grouped order, preferably alphabetical. Again, having the window lists kept in a sensibly grouped order helps the user to concentrate on the task at hand.

In step 562, duplicate alarm indications are removed from the output window list 132. In an embodiment of the present invention, the output window list 132 is concatenated to have spaces removed from between alarm indications.

Displaying the resulting output window list 132 occurs in step 565. In the preferred embodiment of the present invention, the display happens after the bulk of the M→button 238 operation occurs so that there is a single update of the output window 130 rather than multiple updates, so as not to interrupt the user's train of thought.

In step 568, a return to a calling routine is performed, giving control back to the alarm analysis tools visual configuration application 40 (e.g., flow diagram 300 FIG. 6A) to enable the user to continue selecting alarm indications.

Figure 6H:
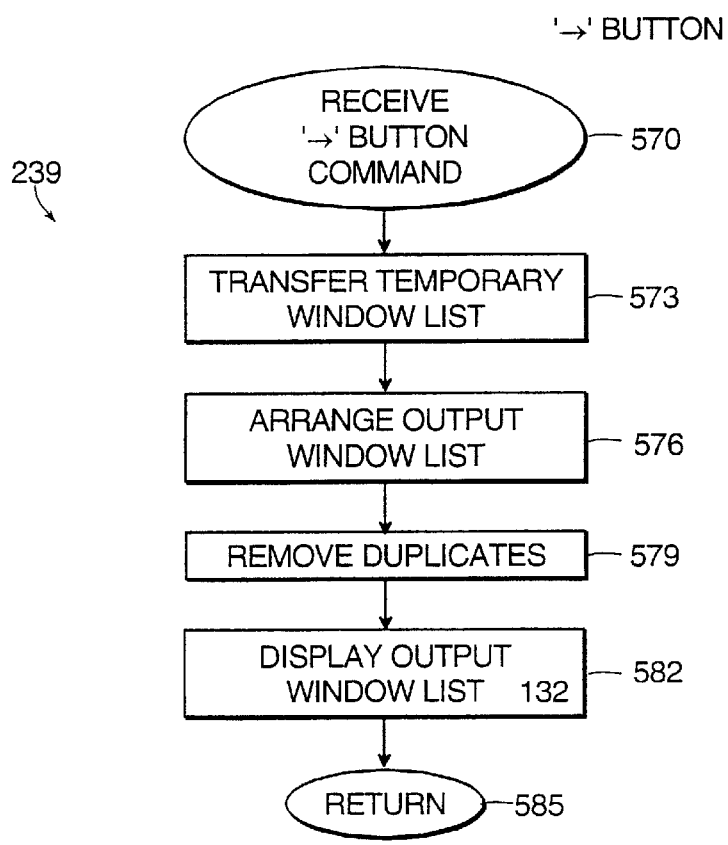
FIG. 6H is a flow diagram of an underlying process for a temporary window transfer-all operation.
Figure 61:
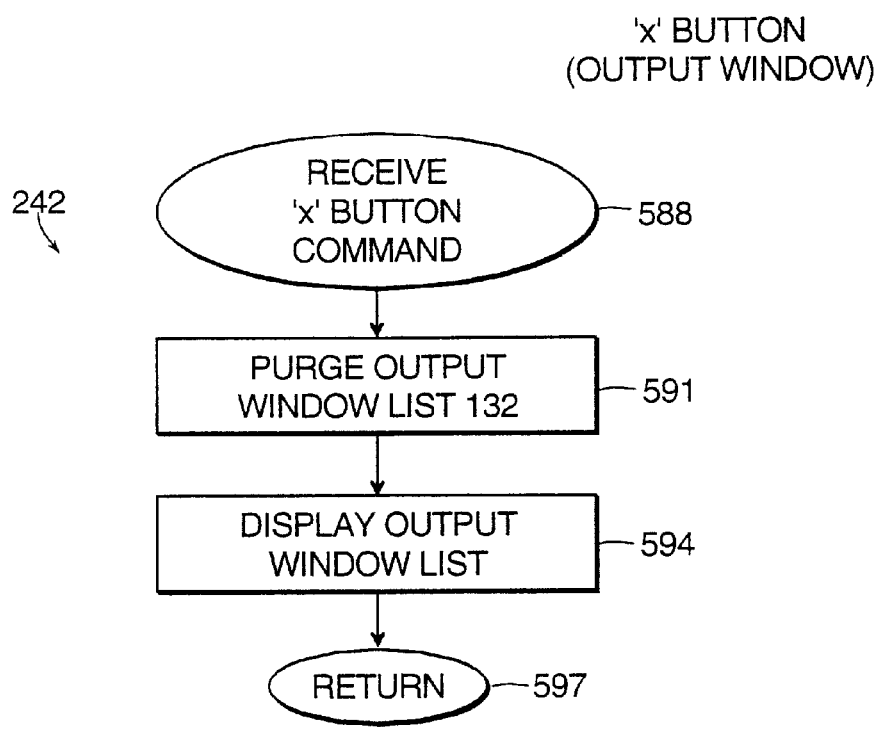

FIG. 6H shows the underlying process for the '→' button 239 command. The '→' button 239 basically copies the entire contents of a temporary window 120 to the output window 130.

A received→button 239 command occurs in step 570. A copy transfer of the temporary window list 122 to the output window list 132 occurs in step 573.

The output window list 132 is arranged in a sensibly grouped order, preferably alphabetical, in step 576 for reasons discussed above. Any duplicate alarm indication is removed in step 579. Again, this step is made easier after the arranging (ordering) of the output window list 132 occurs in step 576.

Once all earlier steps are performed, the output window list 132 is displayed in step 582 in the output window 130. This display occurs only at the end of the →button 239 operation so as not to interrupt the user's train of thought, as stated above.

After the '→' button 239 command process has completed, a return to the calling routine in step 585 is performed. The alarm analysis tools visual configuration application 40 (flow diagram 300) again has complete control so as to enable the user to continue selecting alarm indications.

FIG. 6I shows the underlying process for the 'x' button 242 that resides beneath the output window 130 in the application window 100. Like the temporary window 120 'x' button 232, the output window 130 'x' button 242 also deletes the entire contents of the alarm indications in a subwindow 102, and, in particular, the output window 130 below which it resides.

The 'x' button 242 command is received in step 588. Afterward, the output window list 132 is purged of alarm indications in step 591. The newly purged output window list 132 is then displayed (step 594) in the output window 130. In an embodiment of the present invention, the output window list is large enough to fill the entire output window 130 with blanks, thereby clearing the entire output window 130 of all previously displayed alarm indications. In another embodiment, step 594 further comprises a clearing step of the output window 130 in case the purged output window list 132 is not normally large enough to clear the output window 130 when displayed.

A return to the calling routine in step 597 occurs next, thereby giving control back to the alarm analysis tools visual configuration application 40 (flow diagram 300) allowing the user to continue selecting alarm indications.

Figure 6J:
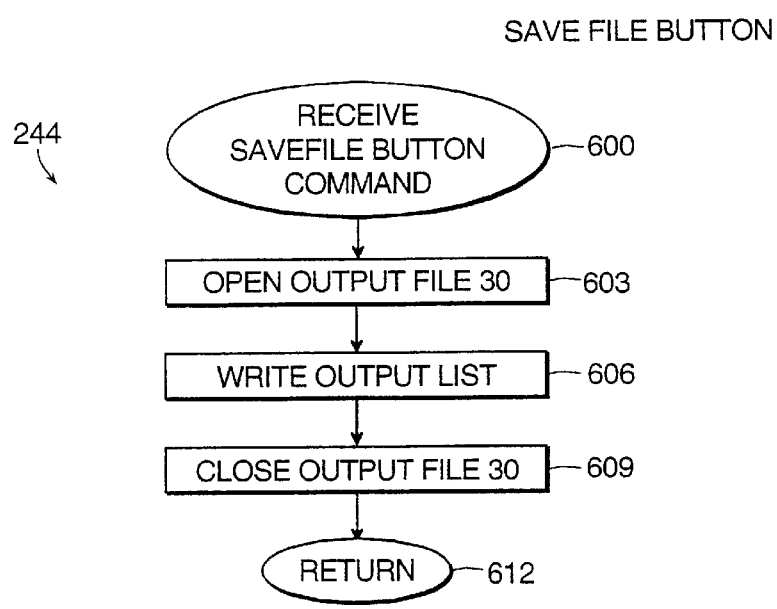
FIG. 6J is a flow diagram of an underlying process for an output window 'SaveFile' operation.

FIG. 6J shows the underlying process behind the 'Save-File' button 244 which is located beneath the output window 130. The SaveFile button 244 basically saves the entire alarm indications listing shown in the output window list 132 to an output file 30 for later use by an alarm analysis tools application 50.

A SaveFile button 244 command is received in step 600. In response to the SaveFile button 244 command in step 600, an open output file 30 occurs in step 603. Having the output file 30 open enables a write output window list 132 in step 606 to occur.

The write output window list 132 in step 606 stores the output window list 132 that is currently displayed in the output window 130 to a storage medium. Typically, the storage medium is a local hard disk in a computer 8; other storage medium are optical drives, network servers, RAM, or other storage memory from which the data is retrievable. In the preferred embodiment, the write output window list 132 in step 606 generates an output file 30 having text format; however in an alternate embodiment, other file formats are used, such as binary.

After having written the output window list 132 to an output file 30 in step 606, a close output file 30 in step 609 is performed to ensure that output file 30 is properly closed so that it does not become corrupt. The return to the calling routine in step 612 follows step 609, which concludes the SaveFile button 244 routine.

Figure 6K:
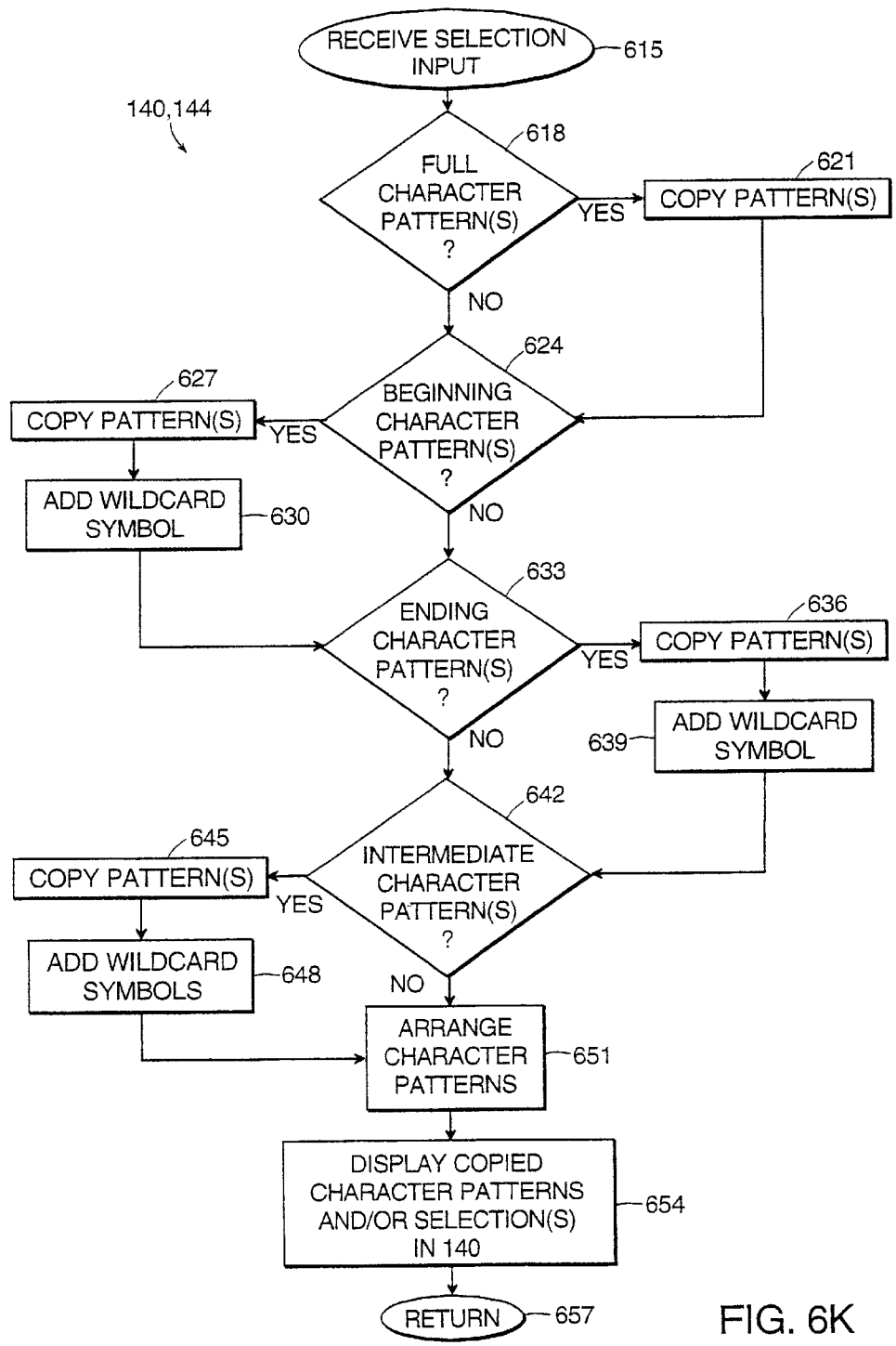
FIG. 6K is a flow diagram of an underlying process for displaying user alarm indication selections in the input window selection portion.
Figure 7:
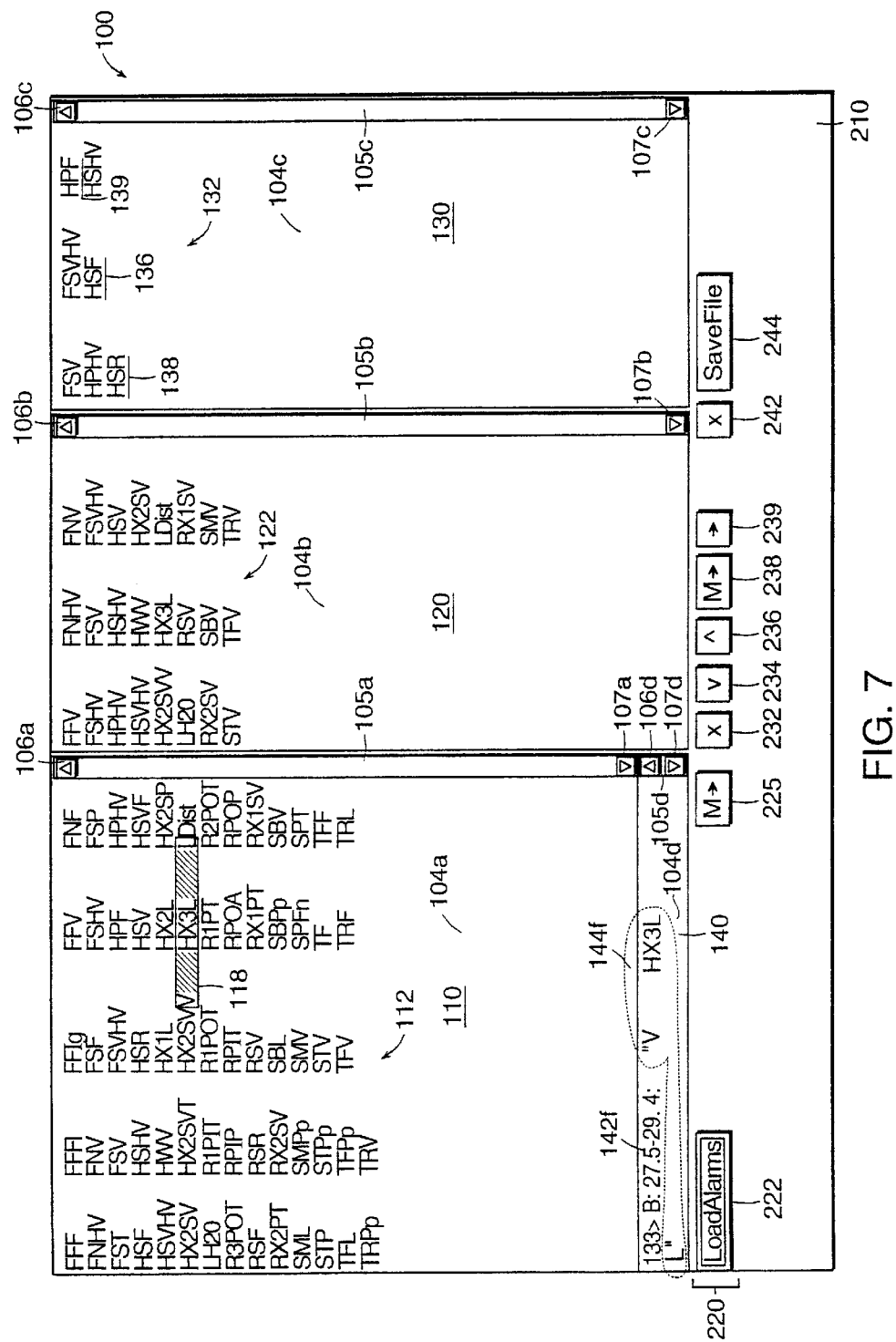
FIG. 7 is a screen display of an application window of the present invention illustrating a selected ending, full, and beginning character patterns, the input window selection portion response to the selection, the resulting temporary window list after an input window list move operation, and the resulting output file window list after selection and move operations of a selection pattern in the temporary window list.

FIG. 6K shows the underlying process for displaying a selection in the input window selection portion 140 as a supplement or echo to the highlighting that occurs upon user selection of alarm indications (or portions thereof) during steps 355, 340, and 350 of FIG. 6. Basically, alarm indications being selected by the user are displayed in the input window selection portion 140 (e.g., "L*" 144a in FIG. 4), where wildcard indicators are added to character patterns to indicate which portions of an alarm indication are wildcards and which portions require an exact match.

A selection input is received in step 615 in a selecting alarm indications routine. From the received selection, a set of queries 618, 624, 633, and 642 occurs in order to display the selections properly to the user.

A full character pattern query in step 618 is asked, wherein scanning of the received selection input of step 615 is performed. Alarm indications having been selected are searched to determine whether a full character pattern 114 has been selected. If a full character pattern has been selected, then a full character pattern 114 is copied out of the selection in step 621.

Copying full character patterns 114 in step 621 includes copying all full character patterns 114 from the selection portion. Step 621 copies full character patterns 114 from the selection text to a temporary storage location.

If the answer to the full character patterns 114 query in step 618 is 'no', a beginning character patterns 115 query in step 624 occurs. The beginning character patterns 115 query in step 624 also occurs after the copy patterns in step 621 is complete. A beginning character patterns 115 query in step 624 scans the user selection to look for any occurrences in which a beginning character pattern 115 has been selected by the user.

If the answer to the step 624 query is 'yes', a copy patterns step 627 is performed, wherein selected beginning character pattern 115 is copied from the selected alarm indications and put into a temporary storage location. A wildcard symbol is added in step 630 at the end of the beginning character pattern 115. In one embodiment, an asterisk is used to indicate a wildcard. In alternate embodiments of the present invention, other characters are used to indicate a wildcard.

If the beginning character patterns 115 query in step 624 is answered 'No', an ending character pattern 116 query in step 633 asked. Step 633 is simultaneously reached after step 630. If an ending character pattern 116 is contained in the user selection, then the ending character pattern 116 is copied from the user selection in step 636. A wildcard symbol is added to the beginning of the selected ending partial character pattern 116 in step 639. Again, an asterisk is used in the preferred embodiment to indicate the wildcard.

After the add wildcard symbol in step 639, or if the answer to the ending character pattern in step 633 is 'no', an intermediate character pattern query is performed in step 642. In step 642, a scan of the user selection to determine whether it contains an intermediate character pattern 117 is performed. If the user selection contains an intermediate character pattern 117, the intermediate character pattern 117 is copied from the user selection in step 645. After copying the intermediate character pattern 117 in step 645, a wildcard symbol is added as a prefix and as a suffix to the intermediate character pattern 117 in step 648. Again, the preferred embodiment uses an asterisk as the wildcard symbol.

After the wildcard symbol in step 648 is complete or if the intermediate character pattern 117 query in step 642 is answered 'No', the copied character patterns, some of which now containing wildcard symbols, are arranged in a sensibly group order, preferably alphabetically in step 651. After step 651, the copied character patterns and/or selections are displayed in step 654 in the input window selection portion 140 to allow the user to verify that proper selection has been read by the visual configuration application 40.

After the user selection has been processed and displayed in step 654, a return to the calling routine in step 657 is performed, which concludes the selecting alarm indications underlying process.

To further illustrate the foregoing processes of FIGS. 6A–6K, FIG. 7 is an example of an input window 110 having an input window list 112. Shown as selected are an ending partial ("V"), a full ("HX3L"), and a beginning partial ("L") character patterns 118. After an M→button 225 command (processed according to FIG. 6C), the temporary window list 122 receives a certain subset of the input window list 112. The subset in this example is a selection of alarm HX3L, plus any alarm indication ending with a capital V, plus any alarm indication beginning with a letter "L", since they are all part of the selection patterns 118. Note that the resulting temporary window list 122 is alphabetically ordered, without regard to the arrangement of the partial selection of included items.

Also, input window selection portion 140 indicates criteria 144f corresponding to the selected character patterns as "*V", "HX3L", and "L*". This display in input window selection portion 140 is supported by the routine outlined in FIG. 6K.

The output window list 132 represents an aggregation of subsets of the input window list 112. This is evidenced from comparing the displayed output window list 132 with the temporary window list 122. Alarm indication entries "HPF" 134, "HSF" 136, and "HSR" 138 are in the output window list 132, but not in the temporary window list 122. Therefore, the three alarm indication entries "HPF" 134, "HSF" 136, and "HSR" 138 resulted from a prior subset selection process.

Clearing the output window list 132 is done by pressing the x button 242 (whose processing is outlined in FIG. 6I). Similarly, clearing the temporary window list 122 is accomplished by selecting the 'x' button 232 (whose processing is outlined in FIG. 6D). Other operations on the temporary window list 122 are accomplished by selecting portions of the temporary window list 122 the same way as selecting portions of the input window list 112. For example, the 'v' button 234 (whose processing is outlined in FIG. 6E) is used to delete the selected alarm indications in the temporary window 120. The '^' button 236 (whose processing is outlined in FIG. 6F) is used to keep only the selected alarm indications in the temporary window 120, and the M→button 238 (whose processing is outlined in FIG. 6G) is used to move alarm indications selected in the temporary window 120 to the output window 130.

Saving the output window list 132 is done by using the SaveFile button 244 (whose processing is outlined in FIG. 6I). All the alarm indications listed in the output window alarm list 132 are saved to an output file 30. In the preferred embodiment of the present invention apparatus, the SaveFile button 244 operation produces a GUI query window asking for a filename and directory to which the output window list 132 is to be saved.

Figure 2C:
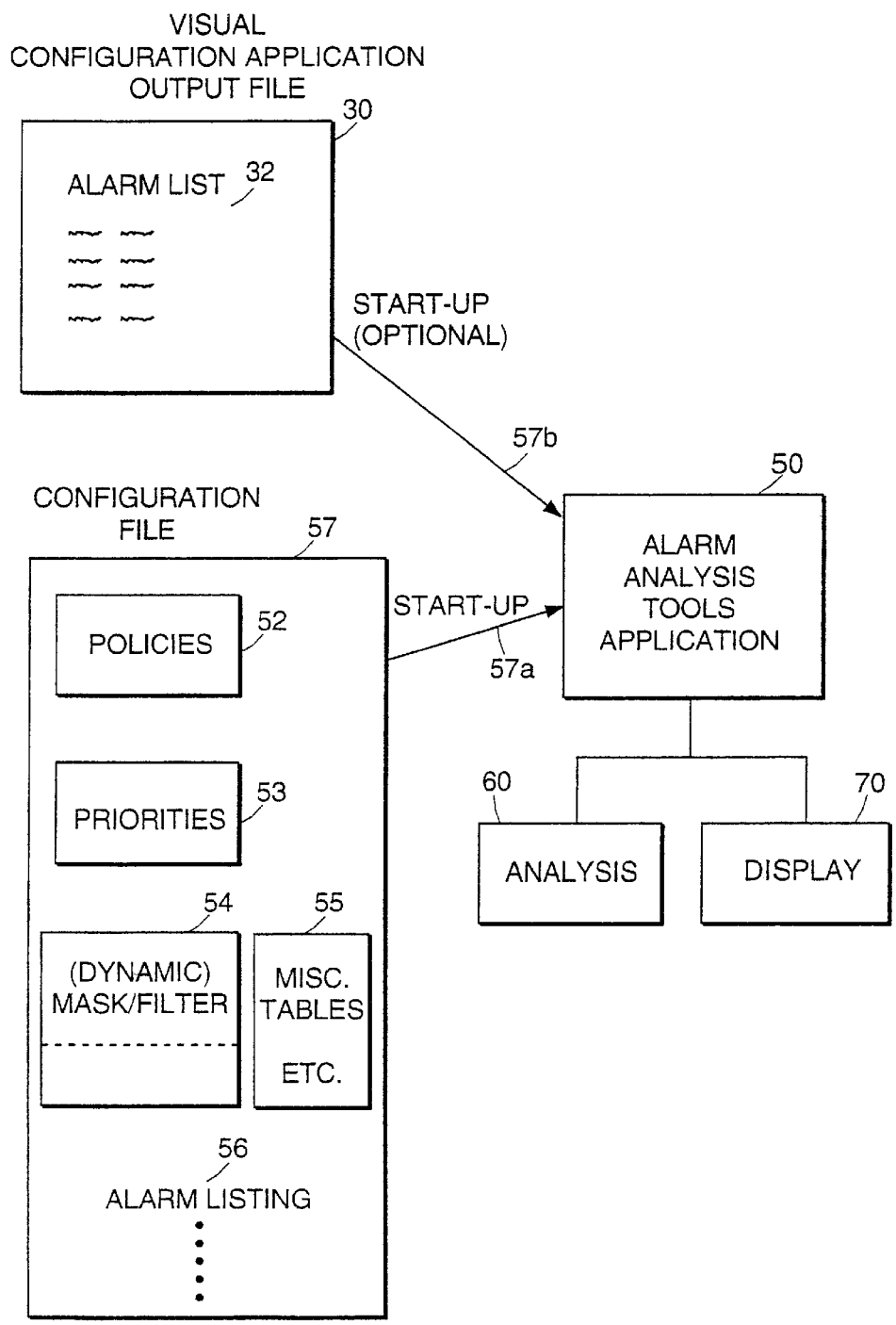
FIG. 2C is a block diagram showing the alarm analysis tools application shown in FIG. 1, its major components, and input files used for configuration.

FIG. 2C is a block diagram showing the relations between an alarm analysis tools application 50, visual configuration application output file 30, and a configuration file 51. Also shown is the general structure of the alarm analysis tools application 50.

The visual configuration application output file 30 has an alarm list 32, selected by a user of the visual configuration application 40 of FIG. 1. As previously described, the visual configuration application 40 is a unique way of selecting alarms to be monitored. During startup, the alarm list 32 is transferred to the alarm analysis tools application 50 via a startup link 57b.

The configuration file 51 comprises several parts. First, there is a policies section 52, containing policies, defined by a configuration engineer or an operator, for determining the processing and displaying of received alarm messages. There is a priorities section 53, containing the definitions of priorities given by a configuration engineer or an operator, also used during analysis and display during operation of the alarm analysis tools application 50. Also, the configuration file 51 includes definitions of mask/filter selections by a configuration engineer or an operator. The mask/filters section 54 also contains dynamic mask/filters in a preferred embodiment of the present invention. Also contained in the configuration file 51 are miscellaneous tables 55, for instance, adaptation tables, whereby several ranges for alarms are defined and employed depending upon various operating conditions. The configuration file 51 further includes an alarm listing 56. The alarm listing 56 is an alarm list used during configuration that supplements the alarm list 32 of the visual configuration application output file 30.

The configuration file 51 is transferred to the alarm analysis tools application 50 during startup via start up link 57a. In another embodiment, the configuration file 51 contains display information, console specific information, alarm and/or machine status information, and other information that is used to analyze and display alarm messages transmitted to the alarm analysis tools application 50.

The alarm analysis tools application 50 is comprised of an analysis portion 60 and a display portion 70. Also, the alarm analysis tools application 50 processes frames of alarm messages into defined groups according to the initialization policies 52, allowing for dynamic policy considerations, which is used in the analysis portions 60. The display portion 70 displays alarm information in an organized and meaningful manner to the operator.

Figure 2D:
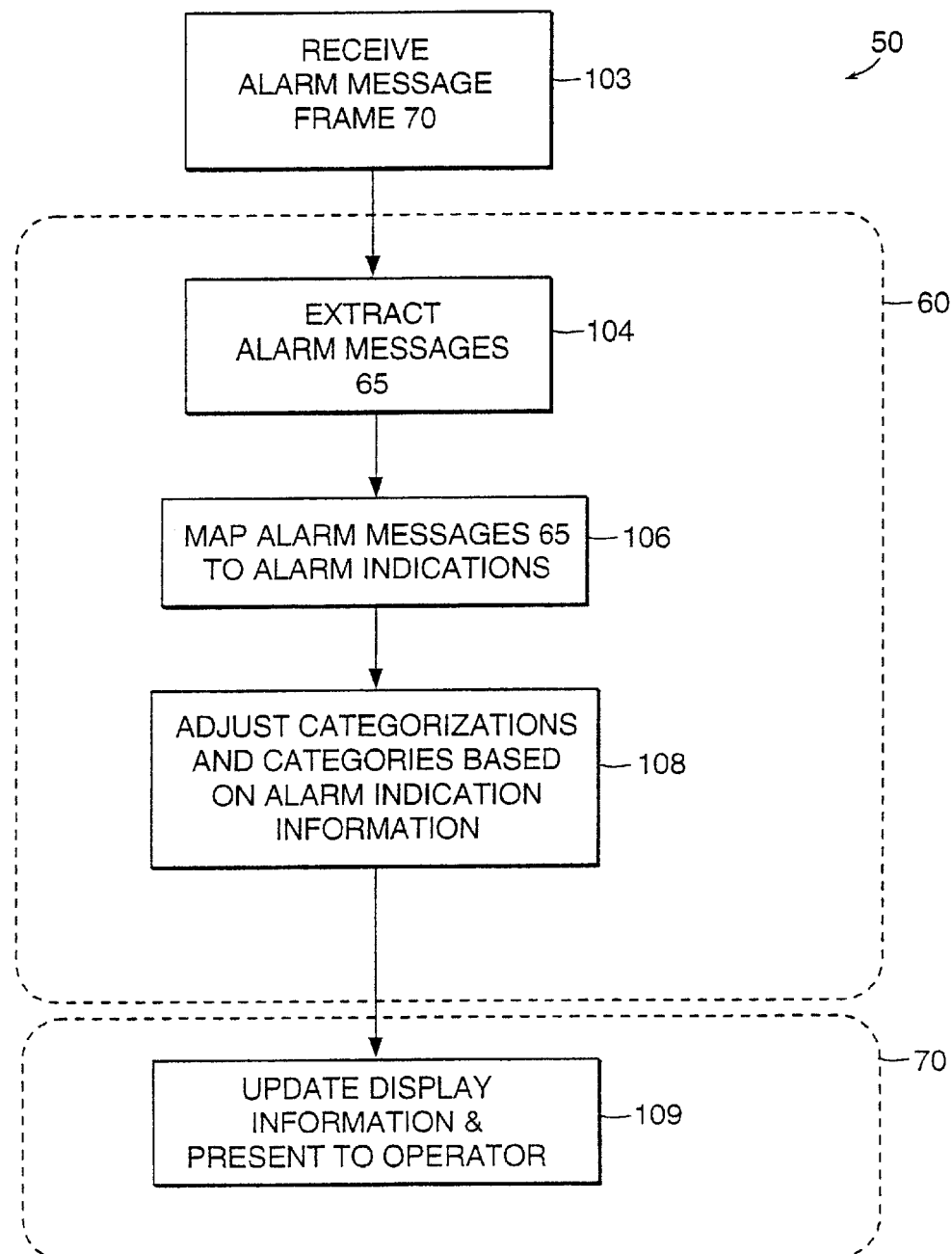
FIG. 2D is a flow diagram of the alarm analysis tools application of FIG. 1.

FIG. 2D is a general flow diagram of the alarm analysis tools application 50. The flow diagram is shown organized in three portions: a receive portion 103, an analysis portion 60, and a display portion 70.

The alarm analysis tools application 50 receives alarm message frames 75 (FIG. 1) in step 103. In response, an alarm message frame 75 is transferred into the analysis portion 60.

The first step 104 in the analysis portion 60 is to extract alarm messages 65 (FIG. 1). The extracted alarm messages 65 are then mapped to alarm indications in Step 106. Typical alarm indications include text, icons, sounds, or other information representing an alarm to an operator. In the preferred embodiment, the alarm indications include a one word summary and a priority display (both discussed later in FIG. 13). The alarm indication information is then used to adjust categorizations and categories in Step 108. A categorization is (i) a user configured hierarchical set of categories, with every application alarm in one of the categories, where the categorization is made up of categories which represent the same kind of operational, process, or processing division; and (ii) any hierarchical category, where the subcategories function to completely subdivide the containing categorization. A category is a user configured set of alarms, listed by their alarm indications (i.e., names) and included alarm types. A special type of category (which will become apparent later) is a pattern, whose member alarms are configured with some assumed order of expected occurrence and overall duration, and are cataloged as: casual (predictive of some more serious alarm), acute (most important in their own right), or consequential (confirmatory of the overall occurrence of the sequence as a whole and its casualty). Adjustments include updating a metric associated with categories and categorizations to signify that an alarm indication has been received or is no longer active.

The display portion 70 in the alarm analysis tools application 50 performs display operations. After receiving adjusted categorizations and categories, based on alarm indication information from Step 108, the display is updated according to the new information and presented to an operator in Step 109. Step 109 enables an operator to view alarm information in a plurality of formats.

Figure 8:
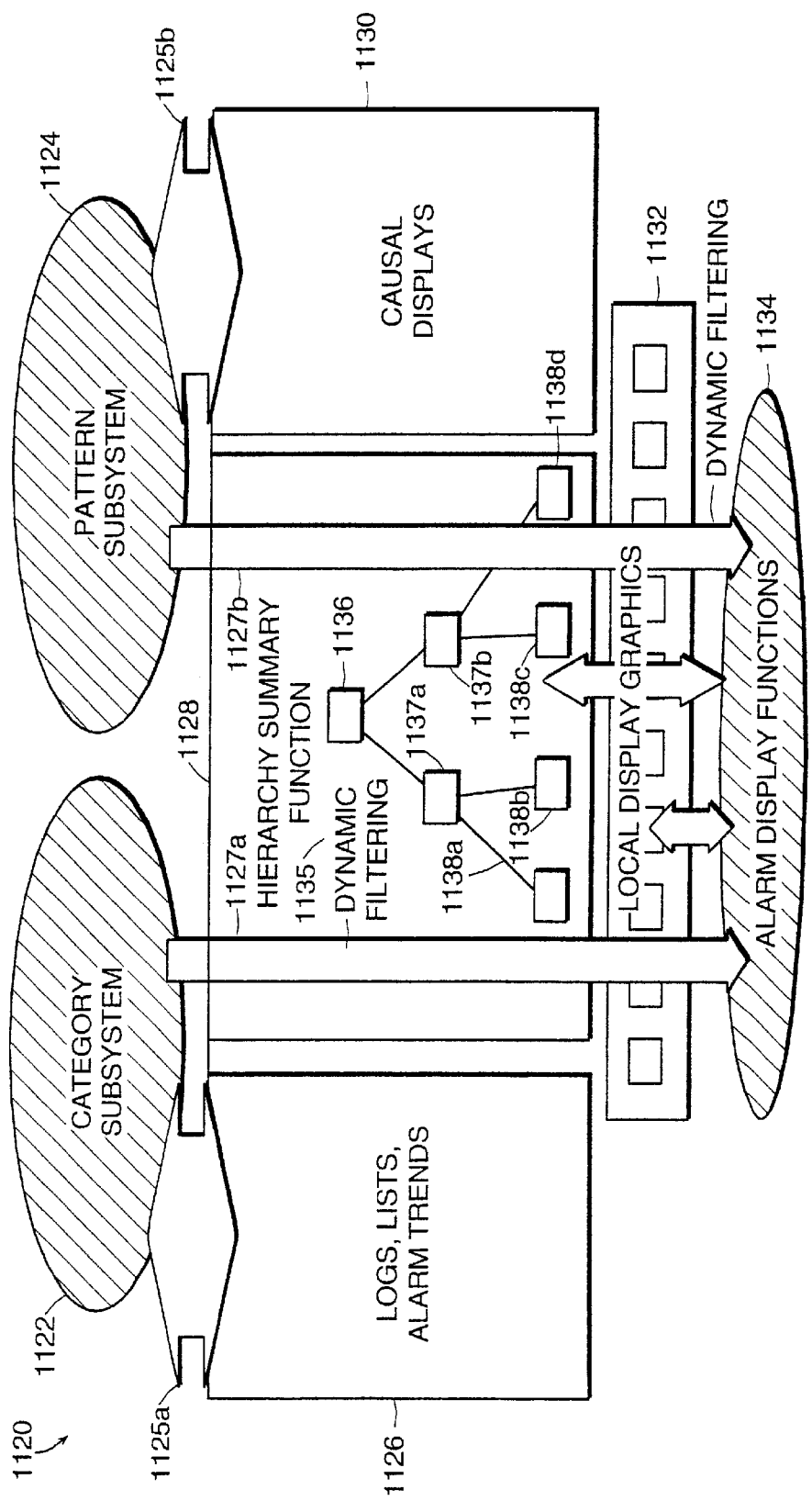
FIG. 8 is a structural block diagram showing the major components of the alarm analysis tools application of FIG. 1.

FIG. 8 is a structural embodiment 1120 of the present invention. Included in this structural embodiment are implementations of the analysis portions 60 and display portions 70 (of FIG. 2C) used by the present invention to display alarm information to an operator.

A category subsystem 1122 and/or a pattern subsystem 1124 provide a set of main analysis portions 60 in the structural embodiment 1120 shown. Within the subsystems 1122, 1124 is a means for mapping alarm messages 65 (FIG. 1) into alarm indications and updating a plurality of variables used to update category and categorizations metrics.

Several paths link the category and pattern subsystems 1122, 1124 with the display routines (implementing display portion 70). Links 1125a and 1125b transfer categories and patterns, which are also categories, directly to display generators 1126, 1128, 1130 (collectively 1166, FIG. 9). One display generator 1126 supports displaying of logs, lists, and alarm trends, while another display generator 1130 supports causal displays. Display generator 1128 is further described below. Dynamic filtering links 1127a, 1127b mask and filter information between the category and pattern subsystems 1122, 1124 and the alarm display functions 1134. The alarm display functions 1134 are supported by display graphics functions 1132 that provide low-level graphical driver functionality specific for the computer on which the present invention is being operated.

Figure 13:
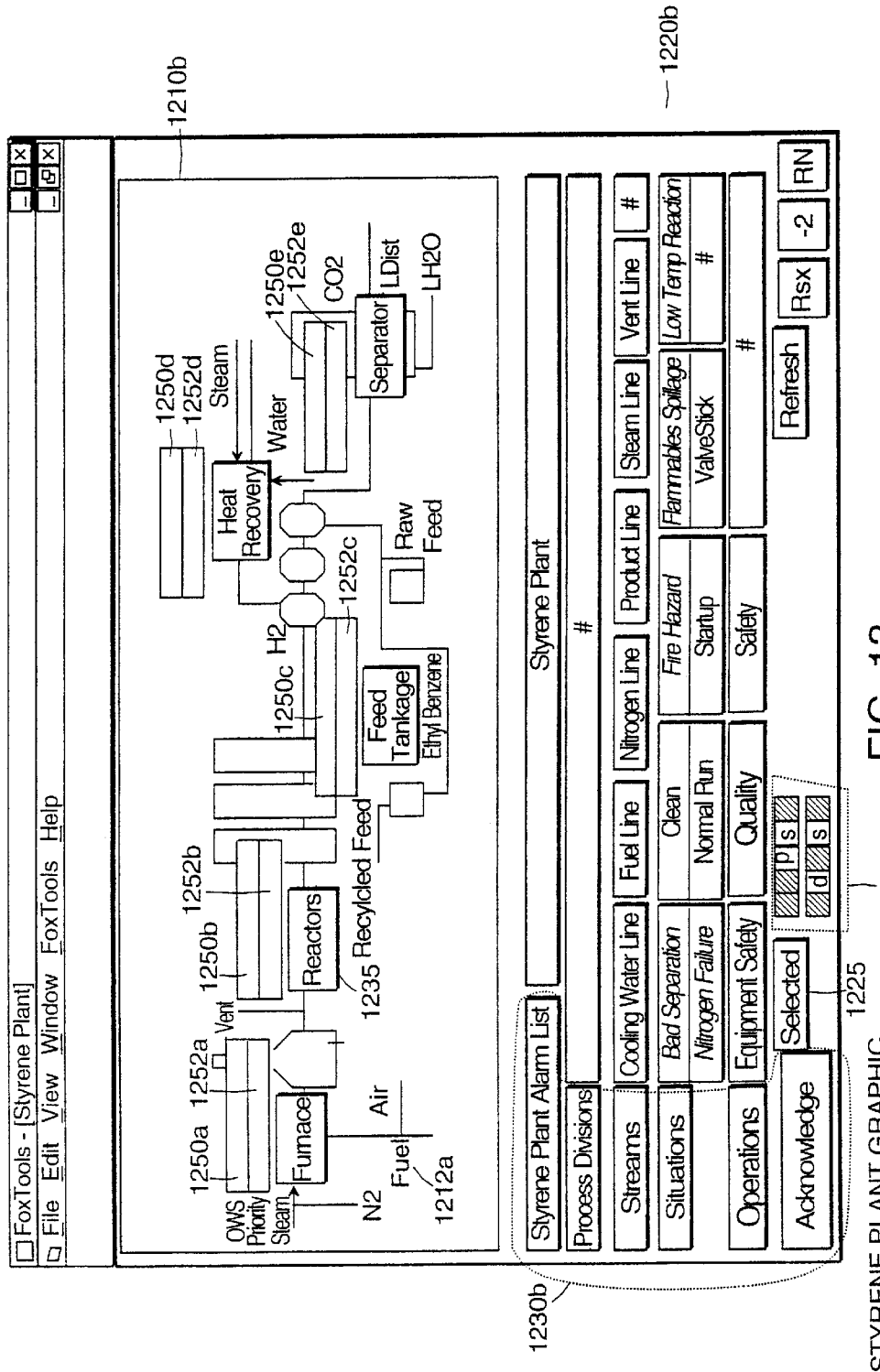
FIG. 13 is the preferred embodiment of a display that is used to show alarm information to an operator, as graphically illustrated in FIG. 12.

Inside the display generator 1128 is a hierarchical diagram 1135, representing categories and display capabilities of those categories. The top level category 1136 is an indicator category (referred to as an "indicator" category since it is a top level category represented in a display window, as seen in FIG. 13). An operator traverses the category hierarchy 1135 to see sub-categories 1137a, 1137b, and further traverse the category hierarchy 1135 to even lower subcategories 1138a, 1138b, 1138c, 1138d. Information from subcategories, such as 1138a, propagates through the hierarchy 1135 up to the top level category 1136, thereby giving an operator an ability to view subcategory information.

Figure 9:
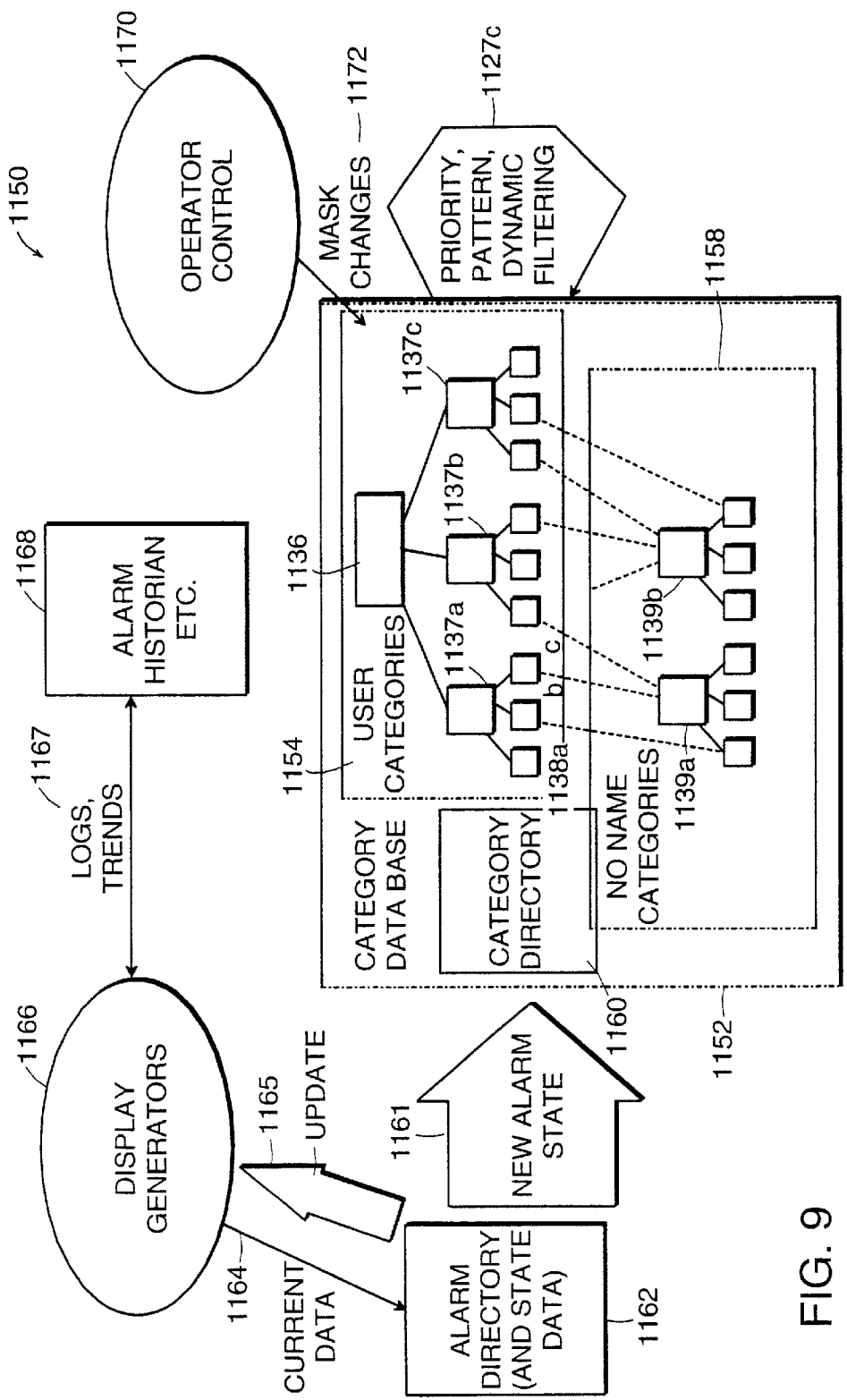
FIG. 9 is a flow diagram illustrating the flow between major components of FIG. 8.

FIG. 9 is an intermediate flow diagram 1150 illustrating data flow and control of an embodiment of the present invention. Shown in detail are respective sets of steps for the analysis 60 and display 70 portions of FIG. 2C.

A starting point of the flow diagram 1150 is an alarm directory (and state data) 1162. This is the first point at which alarm indicators are received. Information from alarm directory 1162 transfers to a set of display generators 1166 via an update link 1165. Display generators 1166 transfer information in the form of current data via link 1164 back to the alarm directory 1162.

The display generators 1166 transfers information, in the form of logs and trends in link 1167 to an alarm historian (etc.) 1168. The alarm historian 1168 saves information to files on a medium having data retrieval capability; the files are local, in one embodiment of the present invention, and remote in an alternate embodiment of the present invention.

The alarm directory 1162 also transfers information to an analysis portion 60 of the embodiment of the present invention 1150. A transfer occurs in the form of new alarm state information in link 1161. The new alarm state information is received by a category database 1152 having a category directory 1160, which has a subset of category information about a set of categories within the category data base 1152.

Represented in the category database 1152 are user categories 1154 and no name categories hierarchies 1139a, 1139b, collectively 1158. The user categories 1154 has a top level indicator category 1136, intermediate subcategories 1137a, 1137b, and 1137c; and low level categories 1138a, 1138b, and 1138c. The subcategories 1138a, 1138b, 1138c and others, are further represented in the form of no name categories 1158. The no name categories hierarchies 1139a and 1139b are those categories that are separated from the user categories 1154 for preprocessing due to their repetition, thereby increasing efficiency so as not to recalculate categories 1138a, 1138b, and 1139c multiple times, each time an alarm indication is updated.

A category database 1152 further includes steps of priority, pattern, and dynamic filtering in flow 1127C. The priority, pattern, and dynamic filtering information is learned at startup, but an operator has control to change any of these settings, under password protection, in an embodiment of the present invention.

Figure 12:
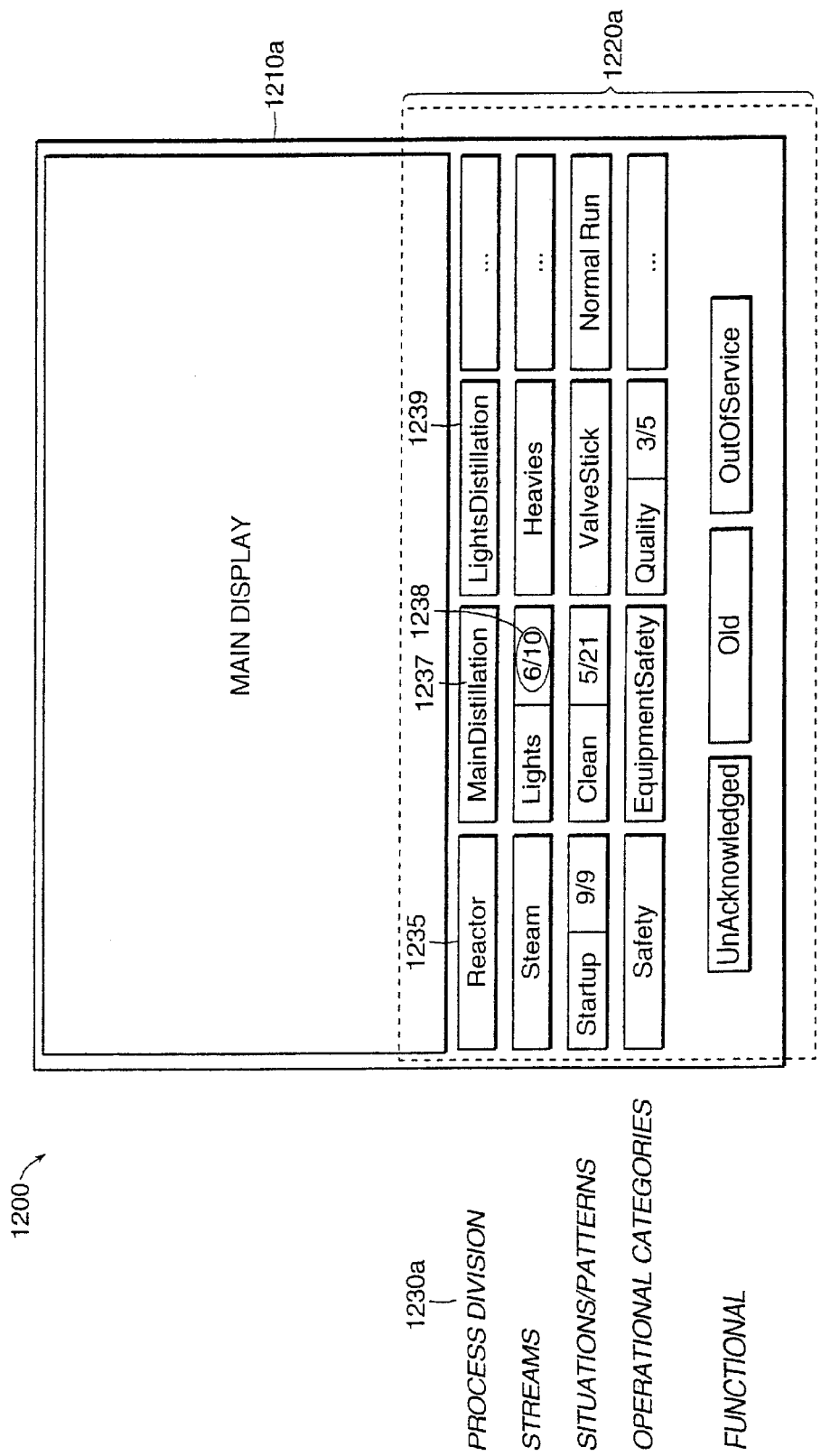
FIG. 12 is a general display representation of the displays shown in FIG. 8.

Operator control 1170 enables an operator to view user categories in multiple ways and also perform mask changes via link 1172. Mask changes are used to view user categories in different ways, and analyze categories 1154 according to (some) criteria. Also, the operator control in 1170 provides input to the priority, pattern, and dynamic filtering of step 1127C. The preferred embodiment GUI for operator viewing and carrying out such mask changes is illustrated in FIGS. 12 and 13, discussed later.

Figure 10:
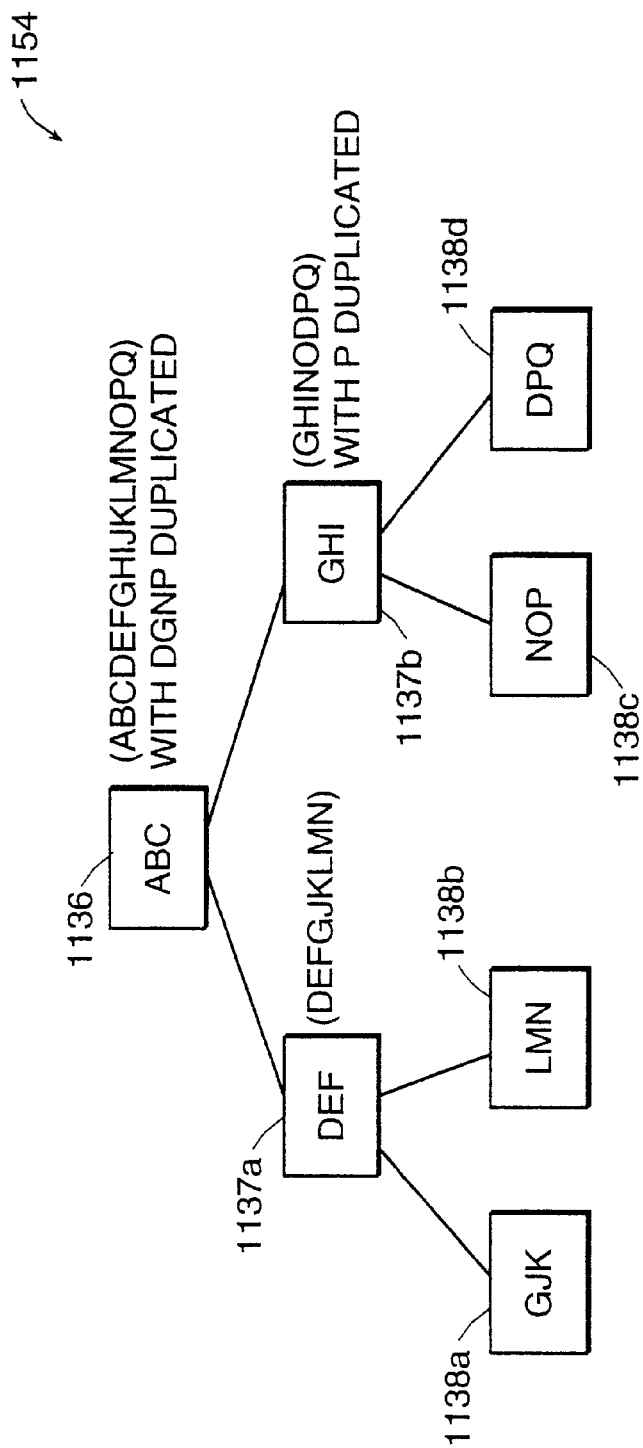
FIG. 10 is a structural diagram of the user categories of FIG. 9.

FIG. 10 shows a category hierarchy 1154 with each category indicating the directly included alarms, as well as those inherited from lower level categories and those that are duplicated. Alarms are included in hierarchically developed categories, where the same alarm may occur in several lower level categories. For the purposes of membership and membership counts, duplicated alarms in lower level categories are considered only once in any higher level categories. The basic strategy of membership counting and bookkeeping is from the bottom up, with alarms being first counted in an immediate lowest including category, and then into successively higher categories. An up count is a precompiled/initialized number associated with a lowest level alarm reference that defines how many levels up that alarm is to be included into the alarm counts of higher level categories. This allows the counting process to proceed bottom up, stopping at that level where the alarm becomes redundant.

From the bottom up, category 1138a includes alarms G, J, and K. Category 1138B includes alarms L, M, and N. Category 1137a includes alarms D, E and F, but also includes its subcategory alarms 1138a, 1138b, giving all alarms in 1137a as (D, E, F, G, J, K, L, M, N ). Likewise, the top level category 1136 also includes alarms in subcategory 1137b, which further includes subcategories 1138c and 1138d. Subcategory 1138c includes alarms N, O, P. Subcategory 1138d includes alarms D, P, Q. Subcategory 1137b includes alarms G, H and I, but also alarms in subcategories 1138c and 1138d, thereby giving a list (G, H, I, N, O, D, P, Q). Note that P appears only once in the alarm list of category 1137b.

Category 1136, tallying up its subcategories 1137a and 1137b, includes alarms (A, B, C, D, E, F, G, H, I, J, K, L, M, N, O, P, Q), wherein D, G, N and P are shown only once, even though there are duplicate entries in the lower level subcategories.

Figure 11:
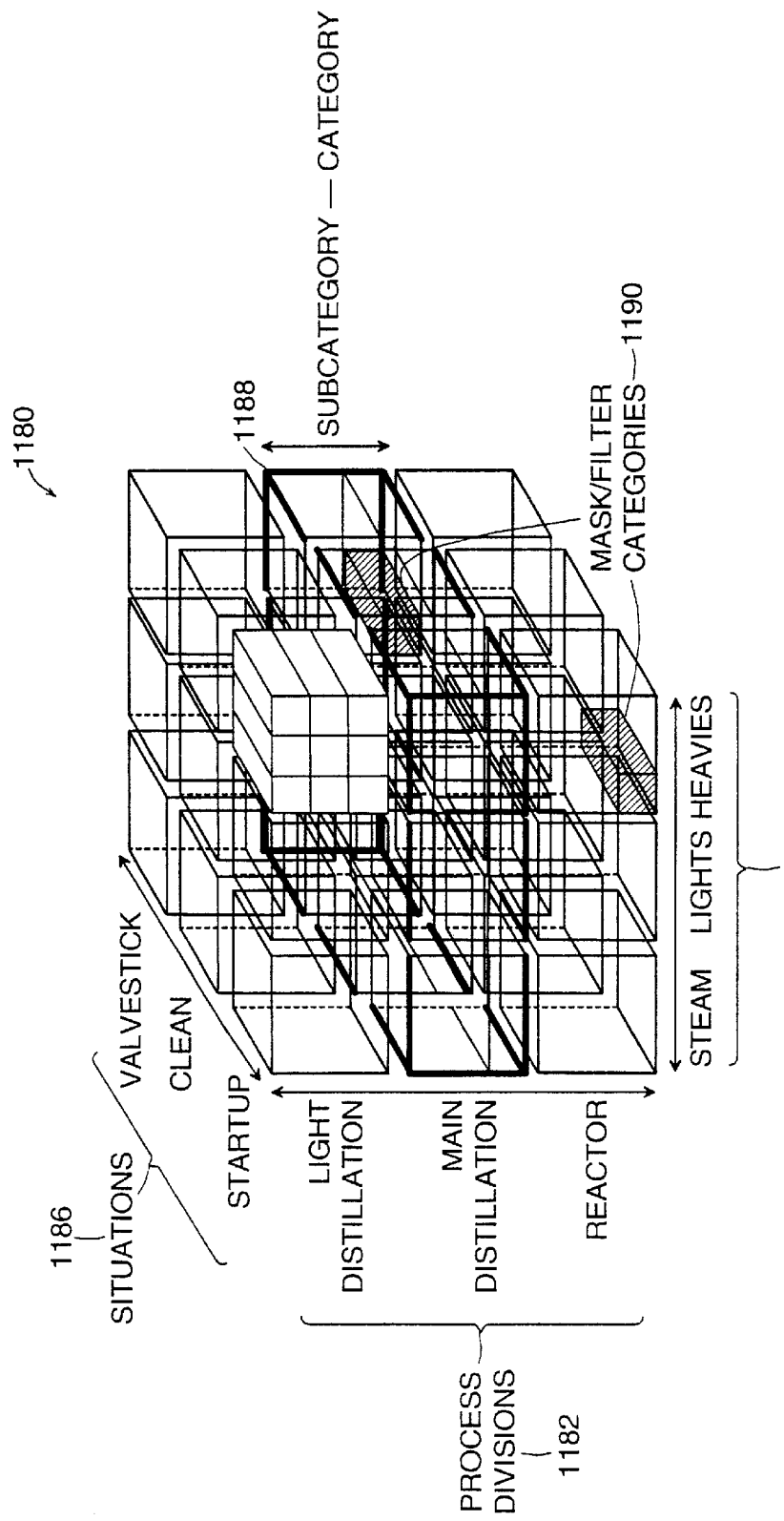
FIG. 11 is a three dimensional illustration representing the relationships among the elements contained in the category database of FIG. 9, namely categorizations, categories, alarm indications, and mask/filters.

To restate the foregoing in geometric terms, 3-dimensions and their intersections are used and form a "cube." FIG. 11 illustrates a categorization cube 1180, where each dimension corresponds to one independent categorization. The categorization cube 1180 has a process divisions categorization 1182 axis, a streams categorization 1184 axis, and a situations categorization 1186 axis. The categorization cube 1180 further includes a main distillation category 1188, which is denoted by a set of heavy lines. Finally, a pair of mask/filter categories 1190 is represented by the shaded rectangular boxes within subcategory cubes.

Any of the categorization cubes' 1180 subcategories, at any level, is a slice "perpendicular to" the corresponding subcategory axis, or dimensions. Masking is achieved by selecting one or more slices for each "dimension" and intersecting them with selections of slices taken from each of the other dimensions.

The categorization cube 1180 is a visual representation of the independent categorizations. It is important to understand the role of the independent categorizations 1182, 1184, 1186 as each containing all, or substantially all, of the alarms. Each independent categorization 1182, 1184, 1186 is like a separate coordinate in a coordinate system, whose individual values are the alarms grouped in the subcategories, which define the increments of that coordinate system.

FIG. 12 is an illustration of a hypothetical application mask/filter 1172 and operator control 1170 of FIG. 9. The example display 1200 is made up of independent categorizations 1230a addressing process divisions, streams, situations, and operations. Within the Process Divisions categorization 1230a, there are categories 1220a, namely: Reactor 1235, Main Distillation 1237, and Lights Distillation 1239. Within the Streams categorization 1230a are: Steam, Lights, Heavies. Within the Situations categorization 1230a are categories and/or patterns 1220a: Startup (a category), clean (a category), valve stick (a pattern), and normal run (a hierarchical category). Within the Operations categorization 1230a are three categories: Safety, Equipment Safety, and Quality.

The example display 1200 includes a main display area 1210a and a categorization display area 1220a. An operator interfaces with the categorization display area 1220a and views in the main display area 1210a, information about the mask/filter categorizations and the selection criteria input. Useful information is shown as a ratio of filtered alarms versus the total number of alarms within a category. Illustrative of this point is the Lights category indicator alarm ratio indication 1238, which indicates "6/10" (meaning six alarms have not been filtered, four have been filtered, and there have been a total of ten alarms received for the Lights category).

FIG. 13 is an example of the mask/filter of FIG. 12 applied to a styrene plant. The graphical illustration/representation of the styrene plant has independent categorizations 1230b, each having respective indicator categories 1220b. For example, the "Streams" categorization 1230b has indicator categories 1220b "Cooling Water Line", "Fuel Line", "Nitrogen Line", "Product Line", "Steam Line", "Vent Line", "# (others)". Likewise, the "Situations" categorization 1230b has its respective indicator categories 1220b and/or patterns "Bad Separation", "Nitrogen Failure", "Clean", "Normal Run", . . . , and so on. Furthermore, the embodiment shown has a main display area 1210b.

The main display area 1210b provides a graphical illustration 1212a of the subject polymer/chemical process having process divisions categories: Furnace, Reactors, Feed Tankage, Heat Recovery, and Separator. Each illustrated category has an associated one word summary display 1250a, 1250b, 1250c, 1250d, 1250e, and an associated priority display 1252a, 1252b, 1252c, 1252d, 1252e. These one word summary and priority displays are derived from the alarm indications mapped to (step 106) and displayed (step 109) in the analysis 60 and display 70 sections of FIG. 2C.

During operation, each indicator category 1220b shown has a one word summary and priority calculated when the Process Divisions categorization shown (in 1230b) is selected for the main display area 1210b. Continual update occurs while this display is active and the system is operating.

Additional areas, or so-called "buttons" in the embodiment of the present invention display are the "Selected" button 1225 and toggle control buttons 1240, which are discussed later.

The intent of having a schematic diagram 1212a is to provide an operator with alarm context information. Having an understanding of a process flow and having one word summary and priority summary displayed beside a category aids an operator in diagnosing an abnormal situation. Additionally, like typical graphical user interface windows, the GUI window of the styrene plant has menu items: File, Edit, View, Window, FoxTools™, Help. In particular, the FoxTools™ menu bar item provides (in a drop-down menu) a series of selectable items (selectable through computer mouse or keyboard selection methods) that are used to provide input to an alarm analysis routine 60 (FIG. 2C) and alarm display routine 70 (FIG. 2C), ultimately affecting an operator's understanding of an abnormal situation. Further menu item detail is discussed later.

Figure 14:
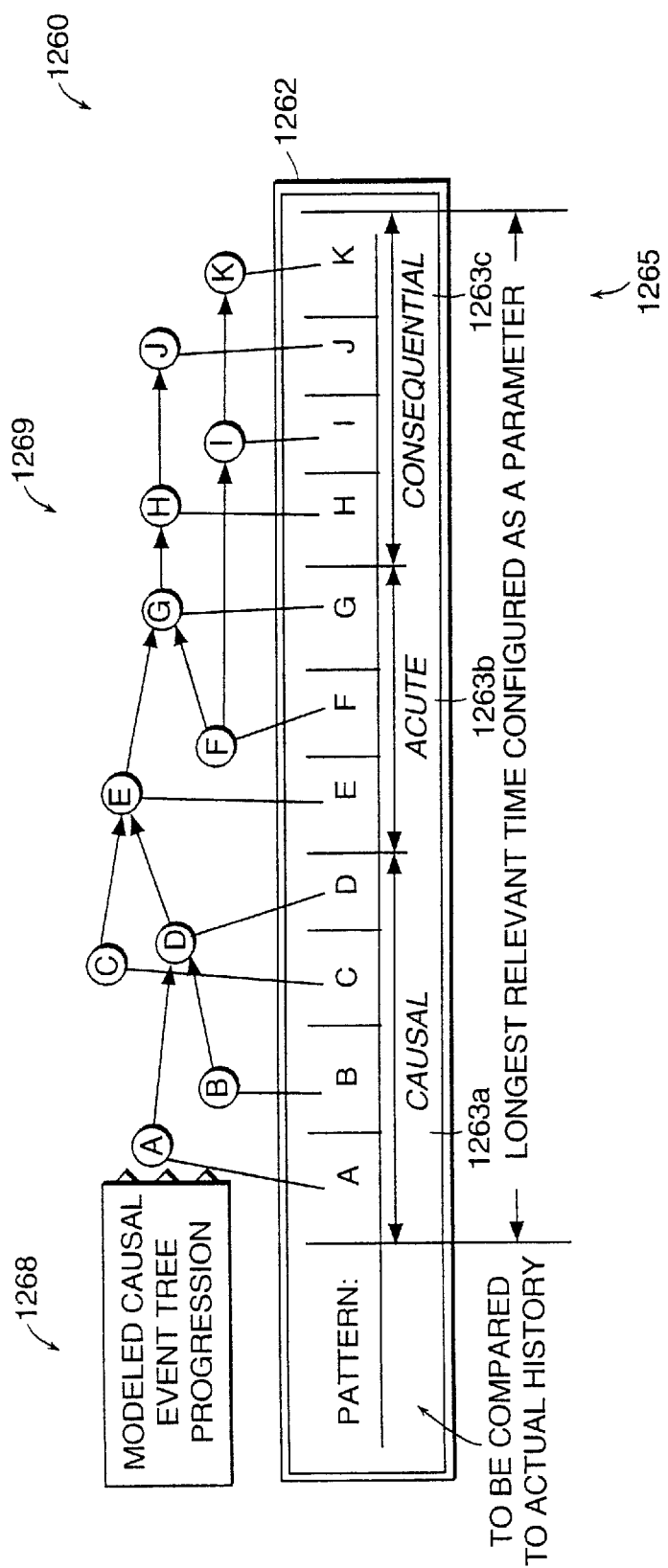
FIG. 14 is a flow diagram of a pattern category generally shown in FIG. 9.

To further automate selection and displaying of related alarm information, the present invention provides dynamic filtering 1127c FIG. 9. To enable such filtering, so-called "patterns", or ordered sets of alarms, are employed. FIG. 14 illustrates a pattern 1262 which is a configured sequence of alarms mapped from a causal event progression model. A pattern module, in general, accommodates the use of causal models to infer unmeasured events or alarm conditions, predict significant alarms, dynamically filter the display of less important alarms in alarm showers, and diagnose complex alarm patterns. Causal models are analog or logical, provided directly in the system, or imported from other applications, such as an expert systems.

The pattern structure of FIG. 14 divides its alarms and variables into causal alarms 1263a (used to anticipate more important alarms), acute (important) alarms 1263b, and consequential alarms 1263c (tailing consequences of the important alarms 1263b). The pattern 1262 is configured directly or generated indirectly from an associated model. The configuration data normally includes just the content alarms, the order and causal 1263a/acute 1263b/consequential 1263c classification data, and a time parameter 1265. However, certain added functions require additional operator and engineer configuration. An additional prediction or diagnosis uses a pattern matching process, where the pattern and alarm or trend history are computed into a normalized metric.

The pattern information 1260 represented further includes a modeled causal event tree progression 1268, represented by the causal event tree flow diagram 1269. From the causal alarms 1263a, acute alarm(s) 1263b are predicted. From the acute alarms 1263b, consequential alarm(s) 1263c are predicted.

For example, causal alarm A, followed by causal alarm D predicts acute alarm E. Also, causal alarm B followed by casual alarm D predicts acute alarm E. Finally, casual alarm C predicts acute alarm E.

An acute alarm E prediction further predicts acute alarm G. An acute alarm F event predicts acute alarm G and consequential alarm I in pattern 1262. Following the predicted G portion of the tree progression 1268, acute alarm G precedes consequential alarm H, which precedes consequential alarm J. Consequential alarm I precedes consequential alarm K in this pattern 1262. Note that the longest relevant time configured as a parameter 1265 determines the time length within which a series of alarms is considered part of the modeled casual event tree progression 1268.

Figure 15:
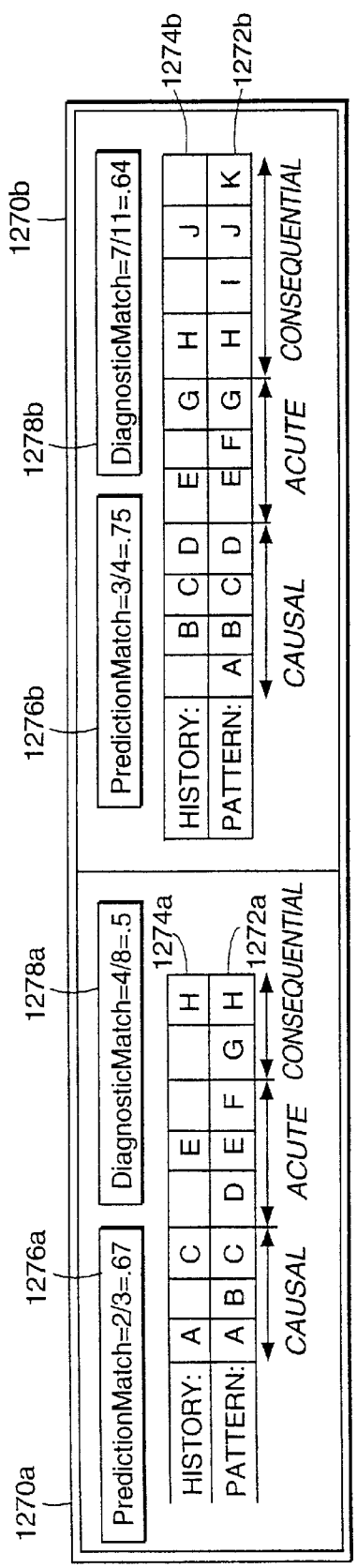
FIG. 15 includes two examples of pattern categories as generally represented in FIG. 14, and illustrate pattern category metric calculations.

FIG. 15 has two prediction and diagnosis examples showing a pattern metric based on a largest set of history alarms matching a given pattern order. Prediction and diagnosis require a comparison of pattern metrics corresponding to different related patterns, to pick those patterns that most closely match the actual history of alarms. Predictions use comparisons involving only causal alarms or variables. Diagnosis use an entire set of causal, acute, and consequential alarms or variables. This process amounts to a fuzzy logic expert system in which the patterns 1262 constitute a set of rules. An advantage of pattern analysis is that it accommodates any modeling errors or redundant models of this sort likely in this kind of modeling. This is an important characteristic in a system where the models come from many sources and include many modeling errors.

Example 1270a has a pattern 1272a, which is compared against a pattern history 1274a. It shows a prediction match 1276a equaling ⅔ (67%) of the causal alarms. It also contains a diagnostic match 1278a equaling ⅛ (50%) for the entire pattern 1272a. The prediction match 1276a and the diagnostic match 1278a are determined from the history 1274a.

Example 1270b has a pattern 1272b, which is compared against a pattern history 1274b. It shows a prediction match 1276b equaling ¾ (75%). It also has a diagnostic match 1278b equaling 7/11 (64%). These matches 1276b and 1278b are determined from the history pattern 1274b and calculated based on the present pattern 1272b.

Figure 16A:
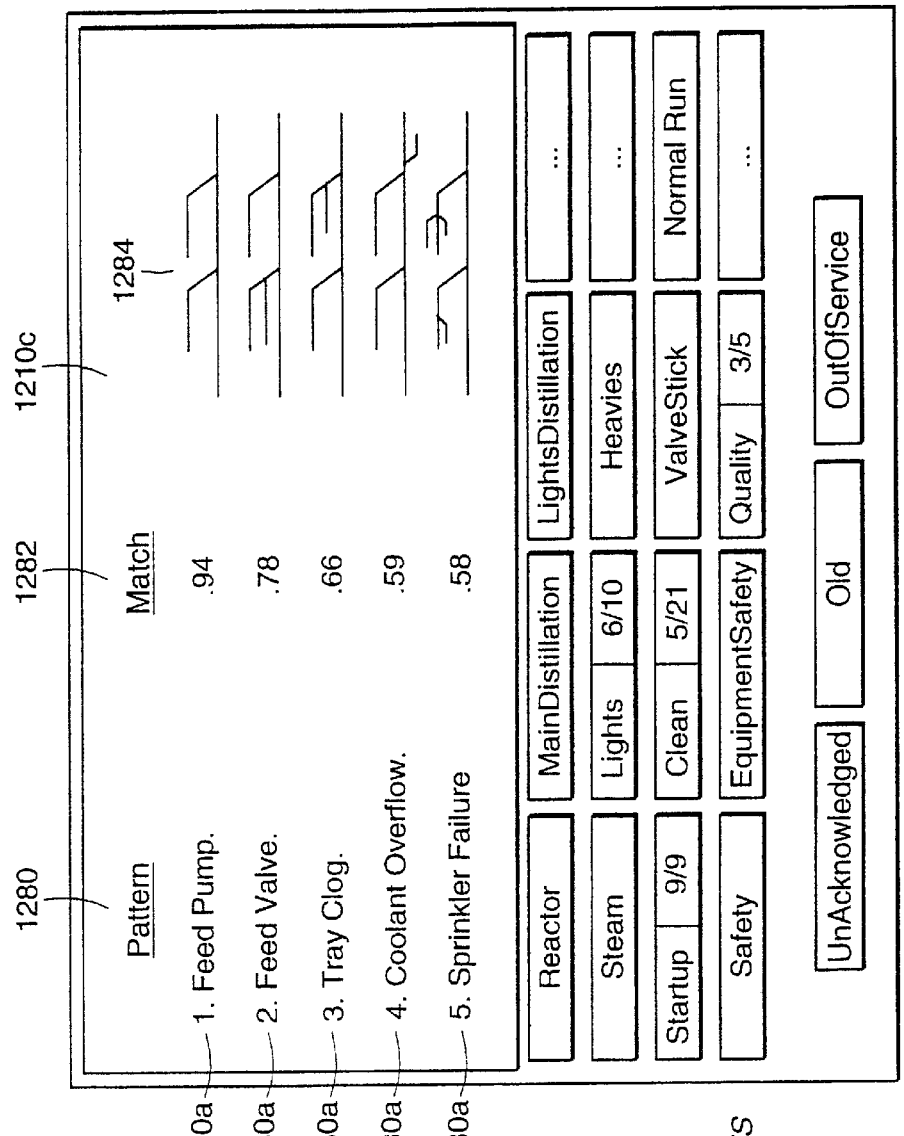
FIGS. 16A and 16B are general predictions/diagnostic displays relating information of FIG. 14 to an operator.

FIG. 16A gives several alternative diagnosis, by name and associated so-called "fish bone" diagram, ordered by their computed metric. Each predicted pattern 1280a is listed in a main display area 1210c in a left column 1280. A computed metric match column 1282 indicates relative predictions among the several patterns 1280a. A fish bone diagram 1284 provides further indication about alarm timing to a trained operator.

Figure 16B:
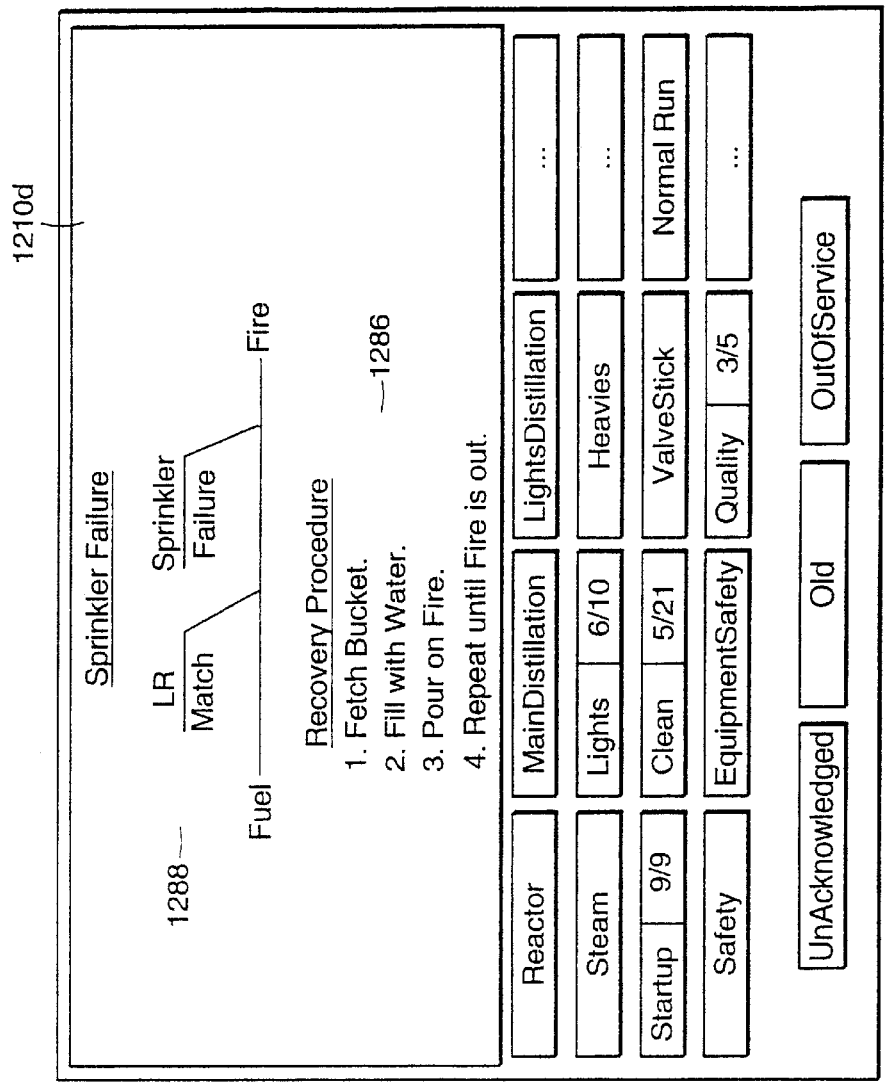

FIG. 16B illustrates a screen view for a certain pattern and includes a correction procedure. For example, in a main display area 1210d, a fish bone diagram 1288 for a sprinkler failure is represented. Below the fish bone diagram 1288, a recovery procedure 1286 for a sprinkler failure is shown in a series of steps. In this case, the steps are: (1) Fetch Bucket, (2) Fill with Water, (3) Pour on Fire, (4) Repeat until Fire is out. Also shown are the categorizations and categories (within each categorization), enabling an operator to further traverse an alarm information display hierarchy.

The pattern has a second role. It distinguishes between alarms that are meaningful in themselves (the acute alarms) and alarms (the causal or consequential alarms) whose larger role is to allow an operator to predict or anticipate the serious alarms, or confirm their pattern of causality. There is a user interest in suppressing expected consequential alarms or causal alarms, once their associated acute alarms have actually occurred. A flag in the pattern policy configuration data (52, FIG. 2C) specifies a desired form of dynamic filtering.

The patterns also support configuration of alternative display functions to better summarize an actual situation while not deleting all reference to associated causal alarms. The pattern, in one embodiment, causes a display of only the acute alarms, distinguishing them in color (as suggested above) when a alarm represents a prediction from associated alarms. Dynamically filtering (1127c, FIG. 9) the causal alarms once the acute alarm is active, but displaying it with a symbolic representation to indicate associated active alarms (with a "+" or "T100 et al."), is done in another embodiment of the present invention. In a further embodiment of the present invention, acute alarms are displayed with a tag or pattern name, depending on whether the causal alarms are also active. Additionally, when a pattern has supported a prediction or diagnosis, it is display in an appropriate color.

Figure 17A:
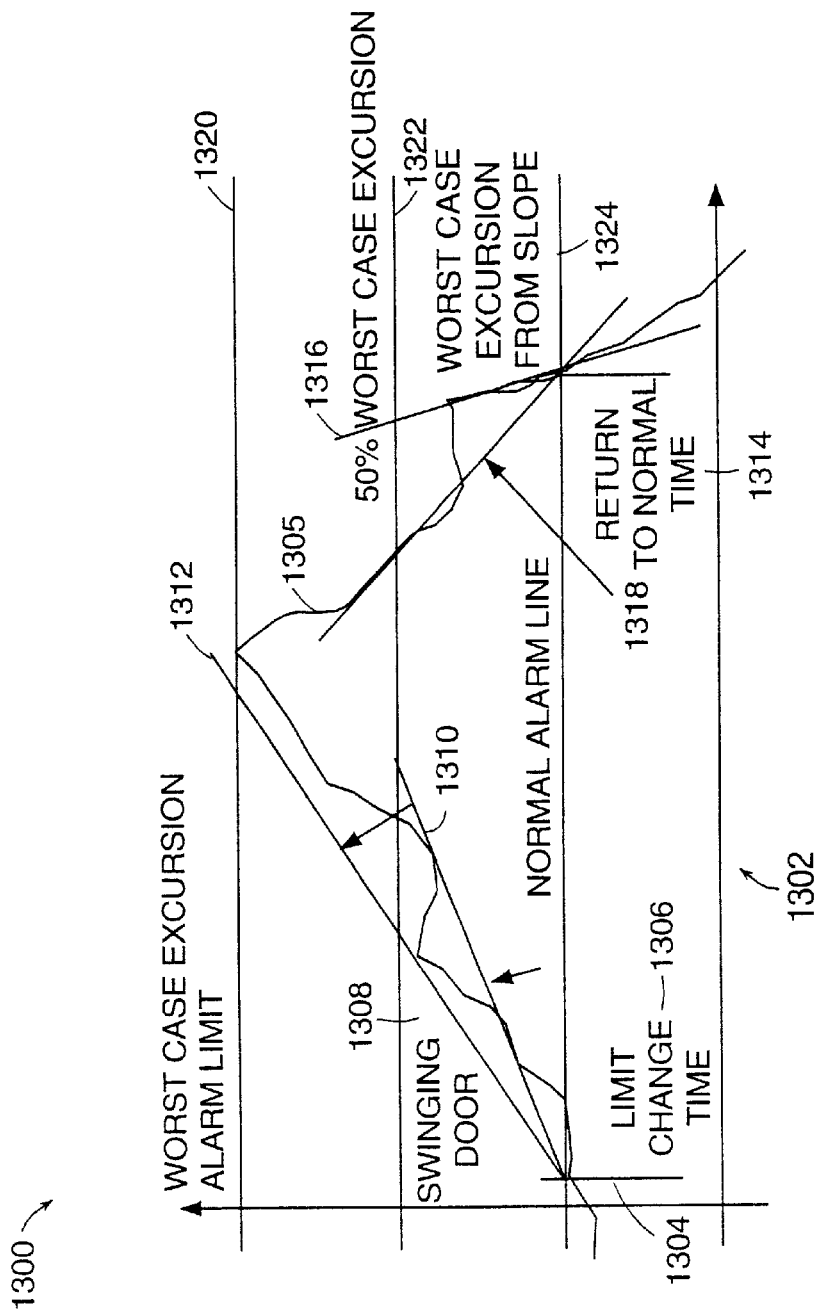
FIG. 17A is a time chart illustrating a use of a dynamic alarm adaptation table, where an alarm setting is related to a prediction, graphically illustrated in FIG. 14.

FIG. 17a is an example of dynamic alarm adaptation enabled by the present invention. Specifically, the graph represents a swinging door ramp-in and estimated ramp-out adaptation. Alarm limit adaptation extends to adapting a limit ramp-in and ramp-out rate. On the ramp-in side, the alarm adaptation is done by a variant of a swinging door compression, where a worst case slope increases through an initial alarm change time. On the ramp-out side, a less efficient process tracks a most recent 50% of a worst case excursion and time of return within old limit times, plus any worst case excursion outside of a previously adapted ramp, and uses these to infer a new ramp rate.

An alarm limit adaptation graph 1300 has a time axis 1302 and an alarm limit axis 1304. Three alarm limits are a normal alarm limit 1324, a 50% worst case excursion limit 1322, and a worst case excursion alarm limit 1320.

The graph 1300 further shows a process control variable measurement line 1305, with a limit change time 1306. On the ramp-in side, there is a swinging door set of limits 1308 (upper limit), and 1310 (lower limit). On the ramp-out portion of the measurement line 1305, there is a worst case excursion from slope limit 1316, and a normal slope limit 1318. A return to normal time point 1314 is an alarm limit time at which the measurement line 1305 is within the normal alarm limits 1324.

Figure 17B:
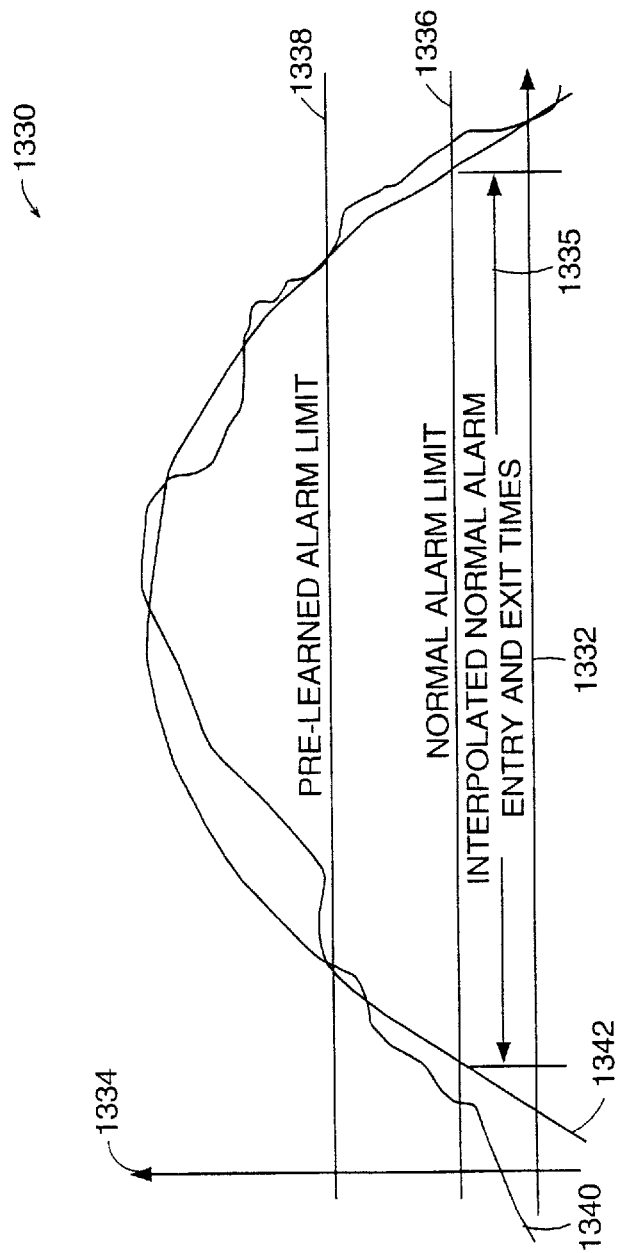
FIG. 17B is an illustration of a timechart parabolic interpolation to estimate alarm point crossings and peak excursion of an example of an alarm pattern of FIG. 16A.

FIG. 17b is an illustration of parabolic interpolation to estimate an alarm point crossing and peak excursion. Alarm learning assumes an availability of worst case excursion values. The alarm analysis tools 50 (FIG. 1) explicitly sample an associated measurement (periodically, but infrequently) for its worst case excursion. In the case of a pattern, the alarm analysis tools 50, in one embodiment, invoke a parabolic interpolation process to estimate a true worst case excursion, based on actual alarm entry and exit times, and the worst case excursion of an occasionally sampled set of process data values. This interpolation also estimates the entry and exit times of a normal alarm limit excursion to determine when alarm limits are to be reset.

The alarm excursion graph 1330 has a time axis 1332 and an alarm value axis 1334. A process control variable measurement line 1340 travels in a parabolic fashion. An interpolation parabola 1342 estimates the path along which the measurement line 1340 is estimated to travel. The estimation parabola 1342 has an interpolated normal alarm entry and exit time length 1335. Represented as horizontal lines are two alarm limits: a Normal Alarm Limit 1336 and a Pre-learned Alarm Limit 1338. The Normal Alarm Limit 1336 is in effect under normal operating conditions, but, under pre-defined conditions loaded during start-up 57a (FIG. 2B) from the miscellaneous tables 55 (FIG. 2B), the Pre-learned Alarm Limit 1338 is automatically employed.

Figure 18:
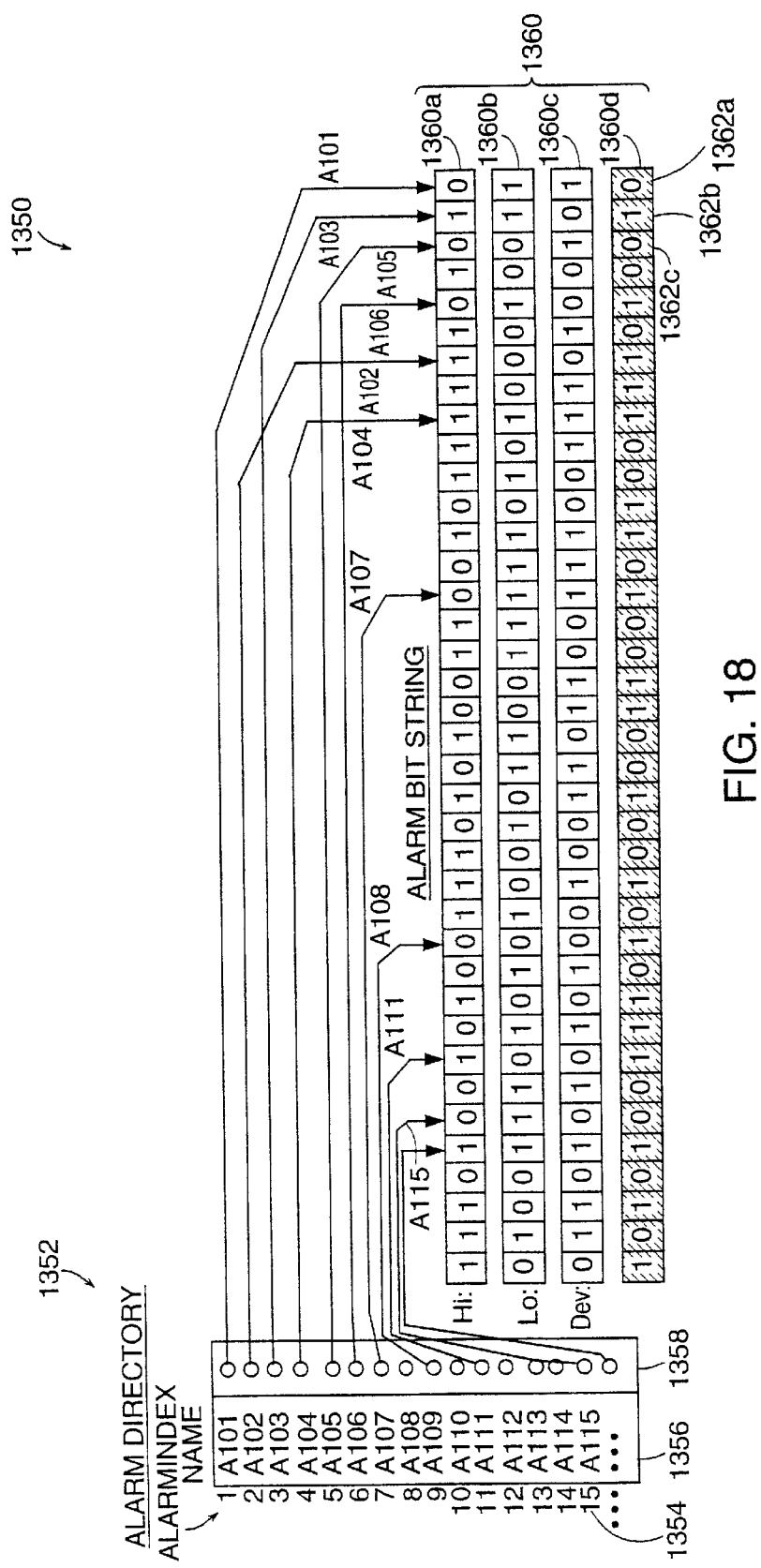
FIG. 18 is an alarm bit string, having an associated alarm directory, used to represent received alarm messages by the alarm analysis tools application of FIG. 1.

In order to provide alarm state data at 1161, 1162 in FIG. 9, the preferred embodiment utilizes alarm and category bit strings. FIG. 18 is a basic alarm and category bit string. In the methods of the alarm analysis tools 50, an active state of the alarms is represented by several long bit strings, one for each class of (high/lo/dev/etc) defined alarm. In the alarm bit string 1350, each bit address 1362a, 1362b, 1362c, etc., corresponds to a particular process variable 1356. Each address 1362a, 1362b, 1362c, etc., is related to a particular process variable 1356, and its name, through an alarm directory 1352. The alarm directory 1352 has an alarm index 1354 relating to the alarm variable name 1356, having a set of corresponding pointers 1358, pointing to a location in the bit string 1350.

Whenever an alarm occurs, a corresponding bit (i.e. 1360a, 1360b, 1360c, 1360d) in an appropriate alarm class string 1360 and bit address 1362a, 1362b, 1362c, etc., is set. Whenever an alarm condition ceases to be true, the corresponding bit is reset. A "set" bit corresponds to a logical "1"; a reset bit corresponds to a logical "0".

Figure 19:
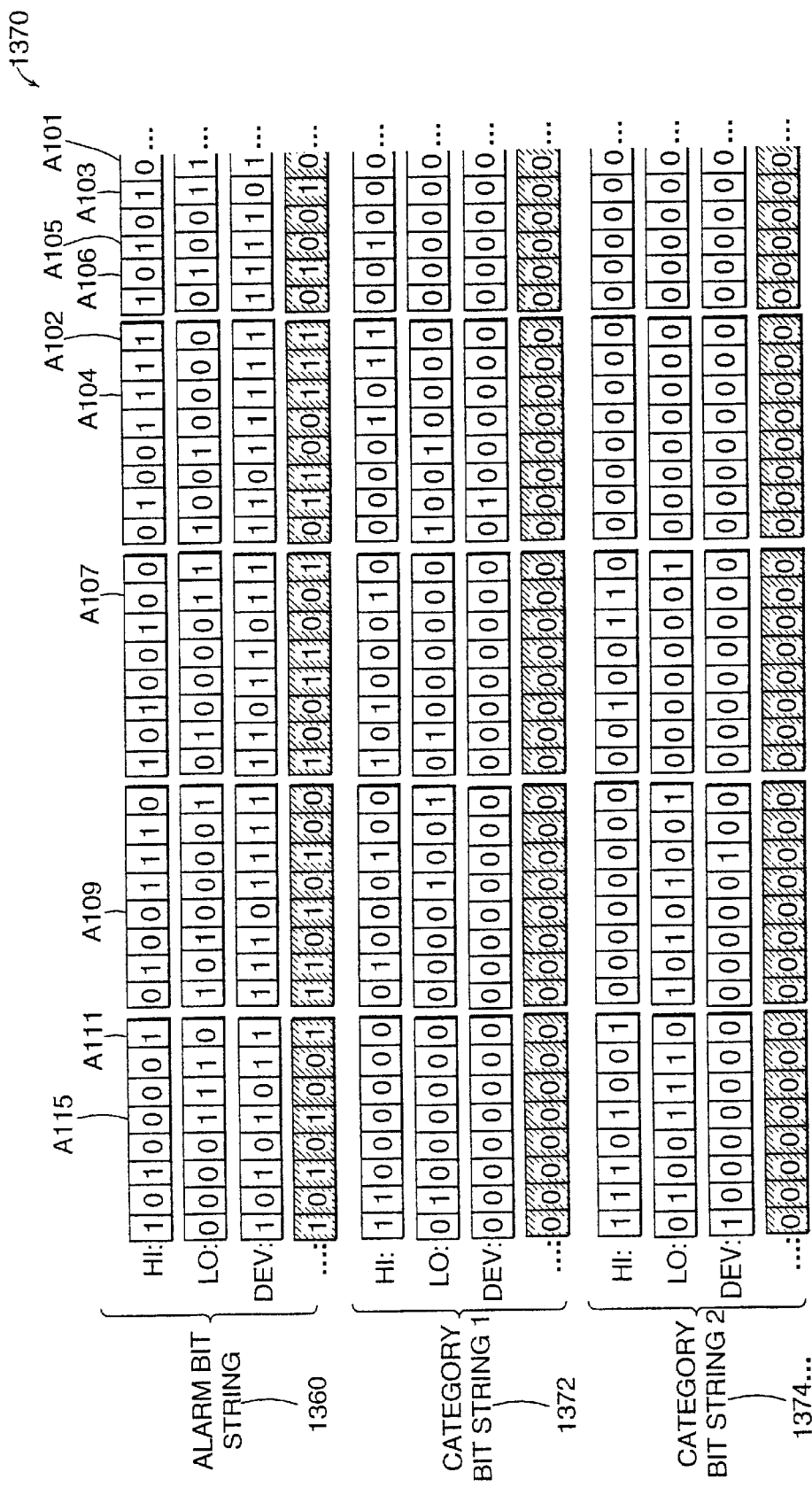
FIG. 19 is a bit matrix having an alarm bit string, a category bit string 1, and category bit string 2 for processing the alarm indications, in accordance with FIG. 9.

FIG. 19 shows an alarm bit string 1360, and two category bit strings 1372, 1374. Each category (or pattern functioning in a simple category role) bit string 1372, 1374 is represented by a set of bit strings, whose bit addresses correspond exactly to the addresses of the alarm bit string. In each category 1372, 1374, bit addresses are set for those alarms considered to be included in the category 1372, 1374 and reset for those not considered part of the category 1372, 1374.

A one word summary or other computation is carried out by masking the alarm bit string 1360 and category bit strings 1372, 1374 together to compute the strings of the various alarm and category bit set intersections involved. After the intersection steps are performed, members of a resulting set are determined by counting set bits in a resultant bit string. In practice, of course, the bit strings are broken into the memory bytes or words appropriate to their computers, and processed byte- or word-wise.

Figure 20:
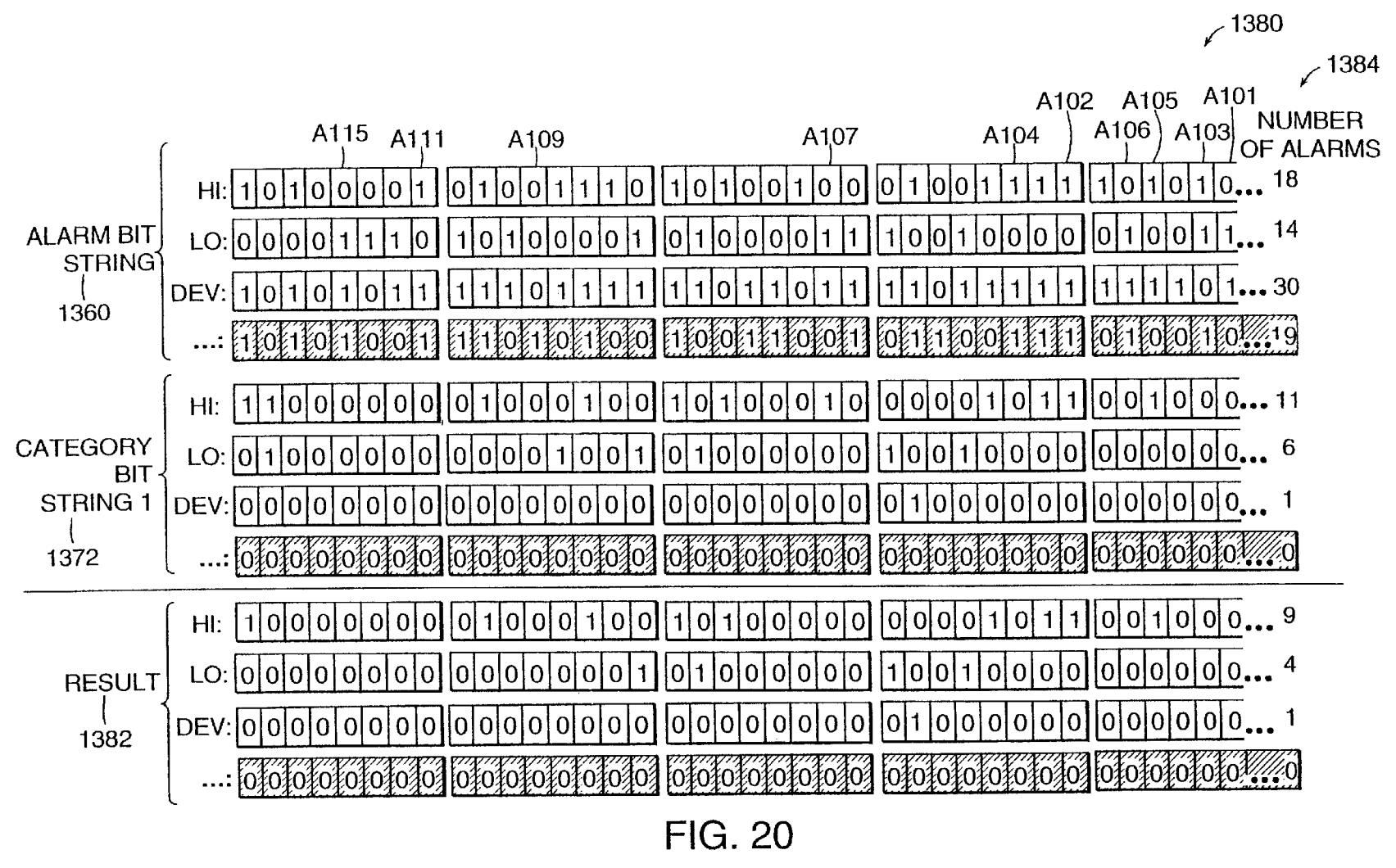

FIG. 20 is an example of an alarm bit string 1360 and a category bit string 1372 masking operation, where a result is shown in a result bit string 1382. A number of alarms count for each level within the alarm bit string 1360, the category bit string 1372, and resultant bit string 1382 is shown in a vertical column labeled, "number of alarms" 1384, on the right hand side of the bit strings 1380.

An example of the use of these strings to compute alarm tool information for a display is considered in a computation of active alarms in a particular category. In the present example, the number of such active alarms is counted by intersecting the set of active alarms 1360 with the set of category alarms 1372, bit- or byte-wise AND-ing the corresponding bit strings 1360, 1372, and then counting the resulting number of set bits in the resultant bit string 1382, placing the sum in the number of alarms column 1384. The set bits in the resultant bit string 1382 correspond to precisely those bits that are set in both the alarm bit string 1360 and the category bit strings 1372. And, for the purposes of category alarm priority counts, the number of alarms in the resultant bit string 1382 is the number of active alarms in the category 1372. In this case, the number of high alarms is 9; of lo alarms, 4; and of DEV alarms, 1, for a total of 14 alarms.

The intersection computation is carried out by taking advantage of the naturally paralleled bit operations of a usual machine, so that the number of separate ANDs is between ⅛th and ¹⁄₆₄th of the number of bits. Even so, with up to 200,000 alarms, the above computations require 18,750 byte-wise (or 2,344,064 bit-wise) AND operations.

Specifically, alarm A101 in the alarm bit string 1360 has a bit pattern, 0110, in the high/lo/DEV/ . . . rows, respectively. Alarm A101 in the category bit string 1372 has a bit pattern, 0000, in the hi/lo/DEV/ . . . rows, respectively. The AND-ing intersection produces an alarm A101 bit pattern, 0000, in the resultant bit string, as expected.

Alarm A105 has an alarm bit string 1360 of 1010. Its corresponding category bit string 1372 has a bit pattern of 1000. The AND-ing operation yields a resultant bit string 1382 of 1000, because the Hi position bit in the alarm bit string 1360 and the Hi position bit in the category bit string 1360 each contain a logical "1", which results in a logical "1" from an AND-ing operation.

As a second example of the calculations, a one word summary is another category (from an indicator category subcategory, where an indicator category is a top level category in a main display area) that includes all of the active alarms that the indicator category includes, but has the smallest intersection with the indicator category. In this case, the basic calculation calls for the same intersection as above, carried out first (as above) between the alarm bit string 1360 and the indicator category bit string 1372. The initial resultant bit string 1382 is then intersected with each candidate category (in principle, with all subcategories of the indicator category or of any of the independent categorizations not including the indicator category subcategory). This, in principle, calls for the same AND-ing operation for every category in the application (several hundred categories, or more). However, once a category is shown to include all of the necessary active alarms, all of its super categories can be ignored because it will always be a better candidate one word summary category than any of its super categories.

However, each such operation is stopped at any byte (or word) encountered where a new AND-ed result does not match an initial result because the candidate category is then missing an active alarm contained in the indicator category. Further, once all alarms in the initial result have been covered in the AND-ing process, the process is also stopped because AND-ing is then complete to the extent that the structure of a particular string is already known. The same shortcut can be used on any of the AND-ing operations. In the preferred embodiment, the ordering of alarm variable addresses in the bit strings is pre-compiled to maximize the likelihood of early completion of any AND operations.

Among those categories whose intersections successfully match the initial result, each (category, not its intersection) is then AND-ed with the original indicator category, and the resulting combined bit string set bits are counted. A matching category having a lowest count is the one word summary category. The individual intersections, counts, and comparisons are most efficiently carried out separately for each category in order.

Figure 21:
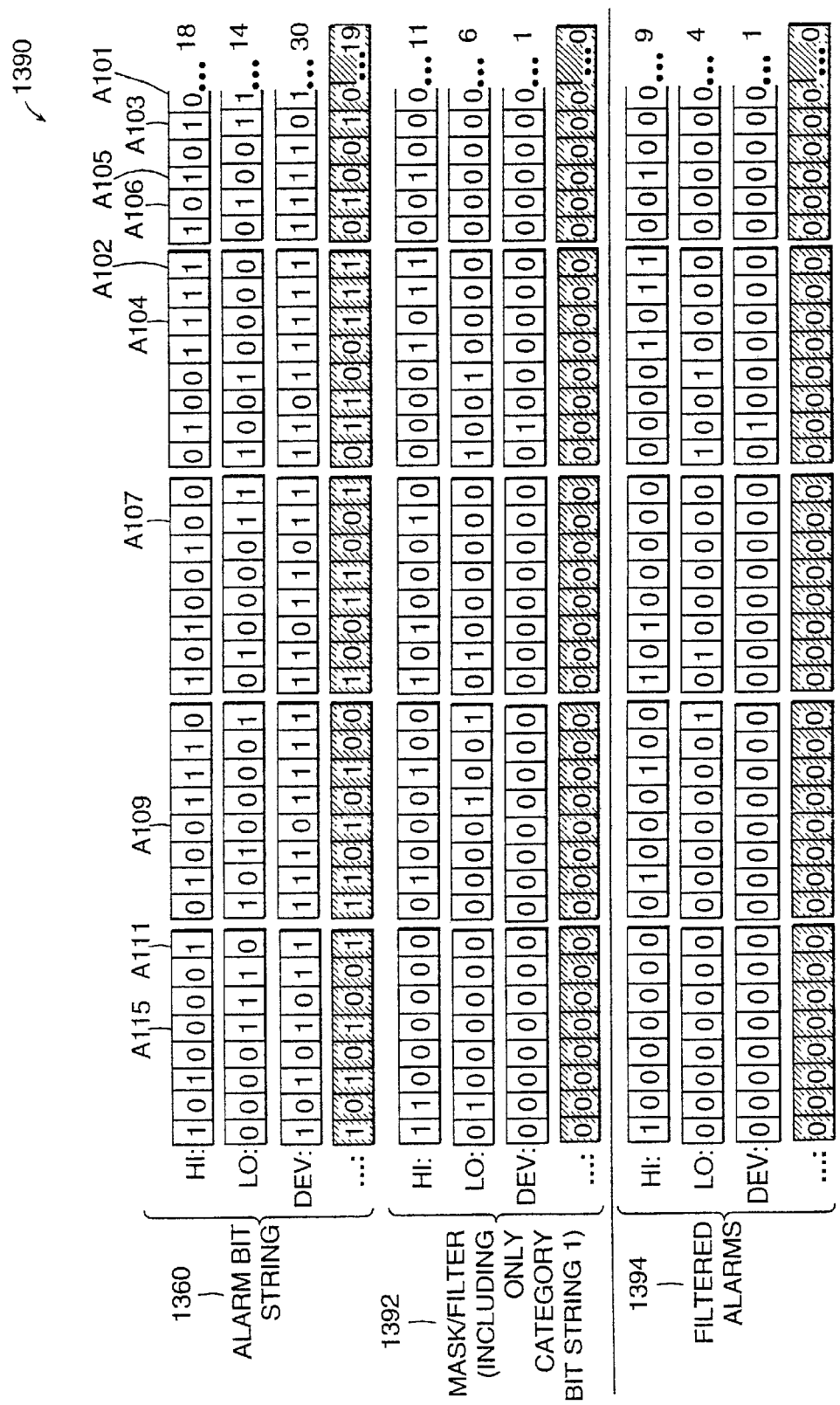
FIG. 21 is a bit matrix showing an alarm bit string mask/filter and filtered alarms for use in determining the underlying alarm message handling for the display of FIG. 13.

FIG. 21 is an example of a mask/filter function. The computations shown in FIG. 19 and FIG. 20 assume no use of a mask/filter. Category priority computations are normally carried out without the use of a mask/filter. However, one word summary computations, in the preferred embodiment, are applied after the alarms have been subjected to a mask/filter. This requires a separate pair of bit strings; one for the mask/filter 1392 as calculated itself, and one for the filtered alarms 1394, which are then used in computations restricted to them. An alarm bit string 1360 is provided and used in an AND-ing operation with the mask/filter 1392 to calculate a filtered alarms bit string 1394.

The mask/filter 1392 itself is computed by considering all category bit strings that have been effectively selected for the mask/filter. All those that are in each independent categorization are OR-ed together. The OR-ed results for each such categorization are then AND-ed together. The mask/filter 1392 results, containing bits for all alarms that are included in at least one of the selected subcategories of every one of the independent categorizations.

This operation, in one embodiment, is incremental in the sense that the net mask/filter string 1392 is changed by combining with any new independent categorization resulting when a selected category is deselected. The resulting categorization is more restricted and therefore applicable to narrow the bit selection of the mask/filter 1392 as a whole. The same cannot be said of a new selected category, which requires a computation from scratch (there are, however, other opportunities for incremental mask/filter computation based on independent storage of intermediate independent categorization results.)

Figure 22:
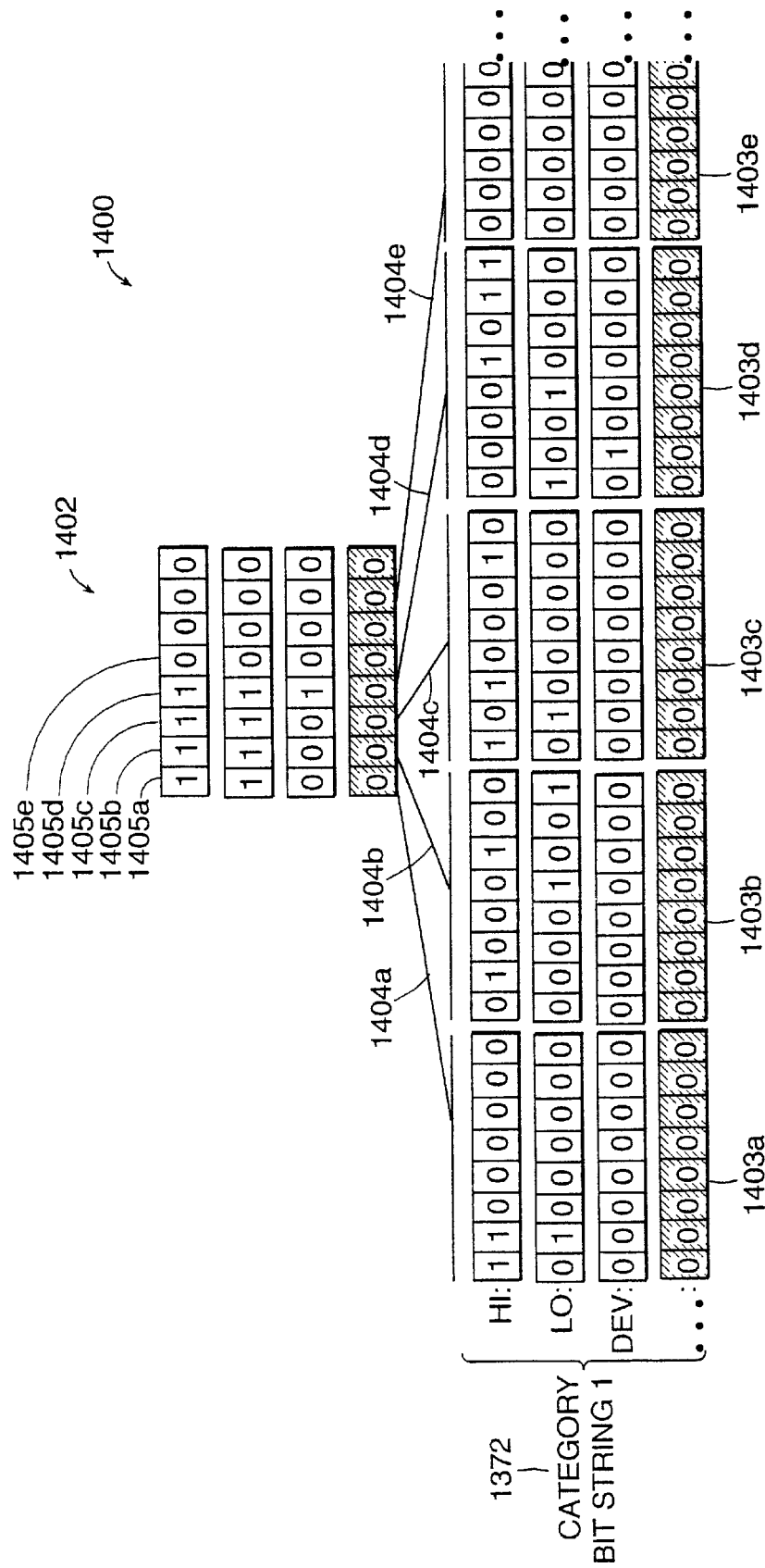
FIG. 22 is an illustration for an advanced method of handling large bit strings for the alarm analysis tools application of FIG. 1.

FIG. 22 shows an embodiment of a grouped string variant. The alarm analysis tools 50 (FIG. 2C) emphasizes computations based on categories that are assumed to be sparse in their alarms. Under those assumptions, bit strings have many fewer set bits than reset ones. This effect is minimized by having one or more levels of higher level bit strings, where each set bit in a higher level bit string corresponds to a byte or word in a lower level bit string that includes at least one set bit. The intersection operations are carried out first on a smaller higher level string, and then later, when needed, on the larger lower level bit string.

In the embodiment 1400 shown, a sparse representation is altered further: each group of related (high/lo/DEV) alarms is grouped together in digital words, with a single address integer indicating a relative address of a group in a corresponding full bit string 1372. An entire data structure then consists of an initial count of the groups for the particular category 1402, followed by the groups themselves. A special short code allows a coding of those categories (the global and independent categorizations) which include all alarms. In addition, a presumed principal, independent categorization (most naturally the one based on the main process divisions) is used to weigh the bits so that each successive subcategory includes a corresponding group of successive bits together. This optimizes the sparse bit representation, at least for these categories, to be as small as possible.

The top bit string 1402 is a summary of a plurality of separate bytes 1403a, 1403b, 1403c, 1403d, 1403e represented by this top bit string 1402. The separate bytes 1403a, 1403b, 1403c, 1403d, 1403e of alarm bit strings 1372 are linked to the top bit string 1402 by links 1404a, 1404b, 1404c, 1404d, 1404e. The left-most byte in the category bit string 1372 has bits set in the Hi alarm and the Lo alarm rows, with all bits reset in the DEV and the " . . . " rows. A corresponding bit pattern in the left-most vertical column 1405a is shown and reads (from top to bottom) 1, 1, 0, 0. Link 1404b connects to string 1403b, which has bits set in the Hi and Lo bit rows, therefore the bit group 1405b has a 1, 1, 0, 0. The middle bit string group 1403c in the bit string 1372 is linked to the vertical column 1405c via link 1404c. The bit string group 1403c, has bits set in the Hi and Lo bit positions and has a corresponding vertical bit group 1405c of 1, 1, 0, 0, accordingly. The second from the right bit string 1403d linked via 1404d has a Hi and Lo rows bits set within the byte, therefore, a 1, 1, 1, 0 pattern is shown in the top bit string 1402 bit column 1405d. The right-most byte 1403e has all zeros, therefore the corresponding vertical column 1405e linked by link 1404e has 0, 0, 0, 0 to indicate that no bits are set within the corresponding byte 1403e.

Figure 23:
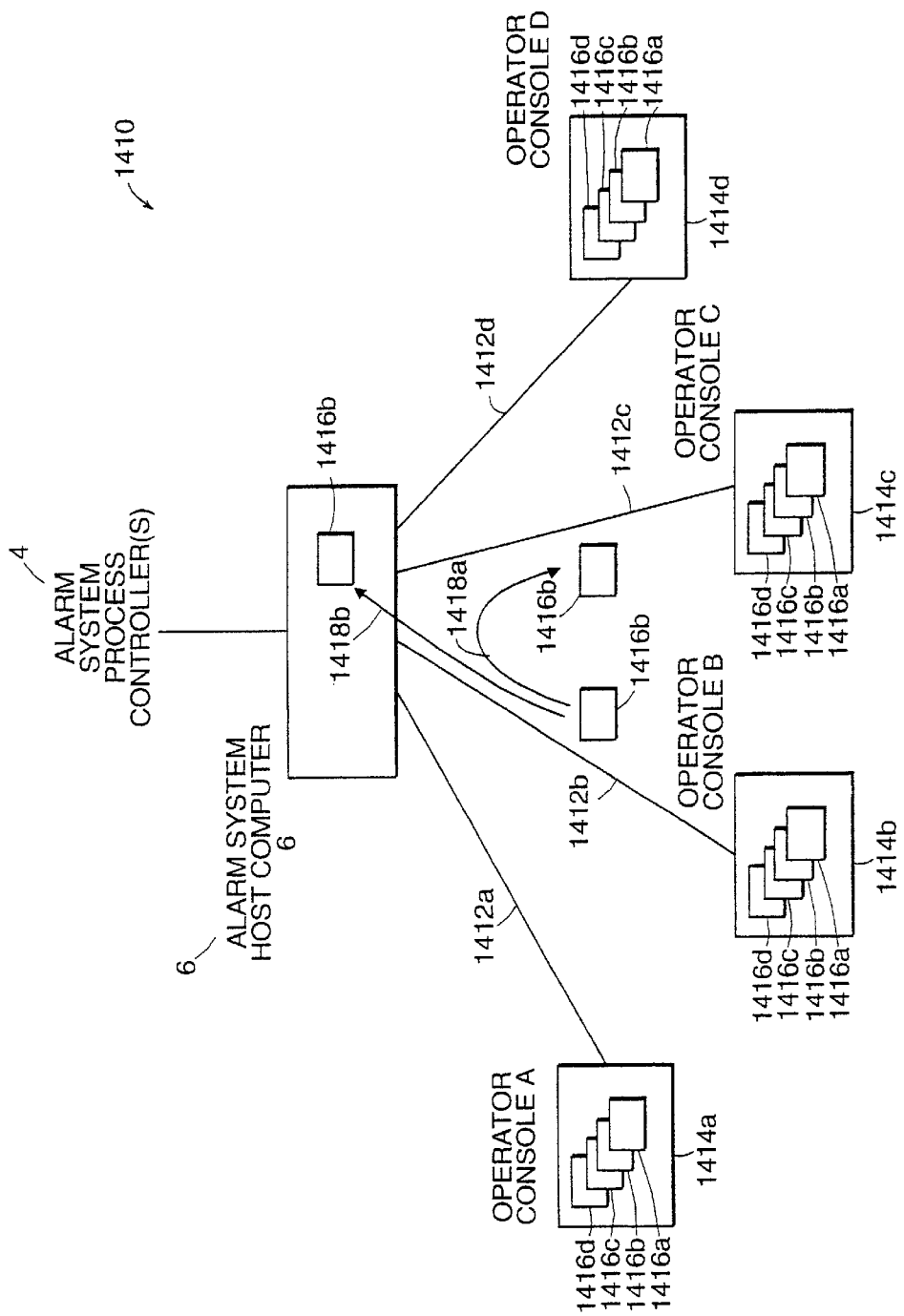
FIG. 23 is a block diagram of an alarm analysis tools application of FIG. 1, where a set of operator consoles are used to monitor alarms in an alarm system.

FIG. 23 is a block diagram of an alarm analysis tool system 1410 having multiple operator consoles 1414a, 1414b, 1414c, 1414d monitoring an alarm system. Shown is an alarm system process controller 4 linked to an alarm system host computer 6. The multiple console system 1410 has an operator console A 1414a, an operator console B 1414b, an operator console C 1414c, and an operator console D 1414d. The operator consoles are linked to the alarm system host computer 6 via data communications links 1412a, 1412b, 1412c, 1412d, respectively.

Each operator console 1414a, 1414b, 1414c, 1414d has a specific operator console mask/filter specific for the operator console. For example, operator console B 1414b has a specific mask/filter 1416b specific for that console. In the embodiment shown, each operator console 1414a, 1414b, 1414c, 1414d has a mask/filter specific for each console 1416a, 1416b, 1416c, 1416d. In an alternate embodiment, a mask/filter is operator specific, thereby dividing tasks among several operators. This also requires an ability to merge on-line the dedicated mask/filters associated with more than one task, to allow an operator to take over the role of one of his colleagues in an emergency.

The console-linked masks 1416a, 1416b, 1416c, 1416d (1416a . . . d) offer similar selection capability as the operator controlled masks, but are accessible for display or change only under password control. The base mask/filter (however merged) allow two different implementations: first, as an overlay that always deselects unselected categories whenever called, allowing an operator to make another mask/filter selection; second, as a permanent selection to a configured console, so that only the selected categories are visible and available for selection in a mask/filter.

Suppression of display and inhibition of alarm generation and messaging generally accomplish the same thing. In one embodiment, an existing system defines inhibiting alarms at the source end in a way that implies that the only place to fully inhibit the propagation of a message is at the source. While one would like to manage all dynamic alarm suppression as display suppression, the present invention recognizes the importance of providing a user with an option of viewing category suppression in terms of display suppression or in terms of source inhibition. In an embodiment of the present invention, this is the surest way of ensuring that an alarm suppressed in one location does not show up elsewhere to confuse the operator.

When the latter option is chosen the alarms are inhibited at their source. A special problem arises when more than one active category applies to a particular alarm, or when prior manual or automatic changes in inhibition apply. In this case, the category mask/filter system keeps track of any prior inhibit states or external inhibiting actions, so that when all categories suppression cease to apply, the inhibit state is restored to an appropriate state. Tracking external inhibitor actions is particularly difficult but important.

Use of source inhibiting where display suppression is active affects pattern prediction adversely. In this case, it is like reconfiguration in that, if not properly treated, it gives rise to a false metric computation. Such alarms are marked as inhibited and excluded from the prediction metric calculation.

Continuing to refer to FIG. 23, a specific console mask/filter 1416b is transmitted from operator console B 1414b to operator console C 1414c via links 1412b and 1412c. This transfer is shown as transfer 1418a. This is a case where each operator console has only its individual console mask/filter. In an alternate embodiment, a simple message is transferred from operator console B 1414b to operator console C 1414c to activate mask/filter 1416b in operator console C 1414c, rather than the entire operator console B mask/filter 1416b during transfer 1418a. Either embodiment is for the purpose of having the responsibilities of a first operator transferred to a second operator.

Still, according to another aspect of the present invention, the operator console B 1414b specific mask/filter 1416b is transferred via transfer 1418b to the alarm system host computer 6 (or a central alarm analysis tools 50 processor unit). The transferred mask/filter 1416b inhibits all alarms specified therein from every operator console in the set 1414a, 1414b, 1414c, 1414d. This global inhibiting by mask/filter 1416b is intended to prevent operator confusion, as previously discussed.

While this invention has been particularly shown and described with references to preferred embodiments thereof, it will be understood by those skilled in the art that various changes in form and details may be made therein without departing from the spirit and scope of the invention as defined by the appended claims.

For example, the alarm system host computer 6 and alarm tool auxiliary computer 8 of FIG. 1 may be effectively replaced by a single computer. The single computer (e.g., a server) serves as both the host and the auxiliary computers providing the functionality of both, as described separately above in conjunction with FIG. 1.

Also, various linked lists, tables, arrays, tree structures, and other working data structures are utilized in conjunction with the routines and processes of FIGS. 6A–6K. The context of the data structures are the subwindow 102 links, selected entries, character patterns 115, 116, 117, and the like processed in FIGS. 6A–6K. It is understood that depending on the type/kind of data structure used to support the discussed routines, various search, traverse and retrieve functions/procedures are employed as common in the art.

Other example variations and equivalents may be obtained from the following discussion of a particular embodiment of the present invention.

FIGS. 24–40 collectively is intended to be a demonstration of an embodiment of the present invention, principally showing an interaction among various windows within a typical application. An example application is a hypothetical styrene plant, where a plurality of example alarms in a global categorization are linked to categories, and further to categorizations via a set of mask/filters and pattern definitions, as specified in the detailed description section.

The embodiment shown is intended to operate on a computer having GUI (graphical user interface) technology, specifically Microsoft Windows™; however, the present invention is a method and apparatus of an alarm analysis tool, not limited to any particular computer system, operating system or user interface. Furthermore, any input/output device capable of interacting with information stored in and displayed on a computer provides a means for operating interaction with the present invention. Such input/output devices include: a computer mouse, keyboard, touch screen, trackball, speech interpretation means, touchpad, etc.

Figure 24:
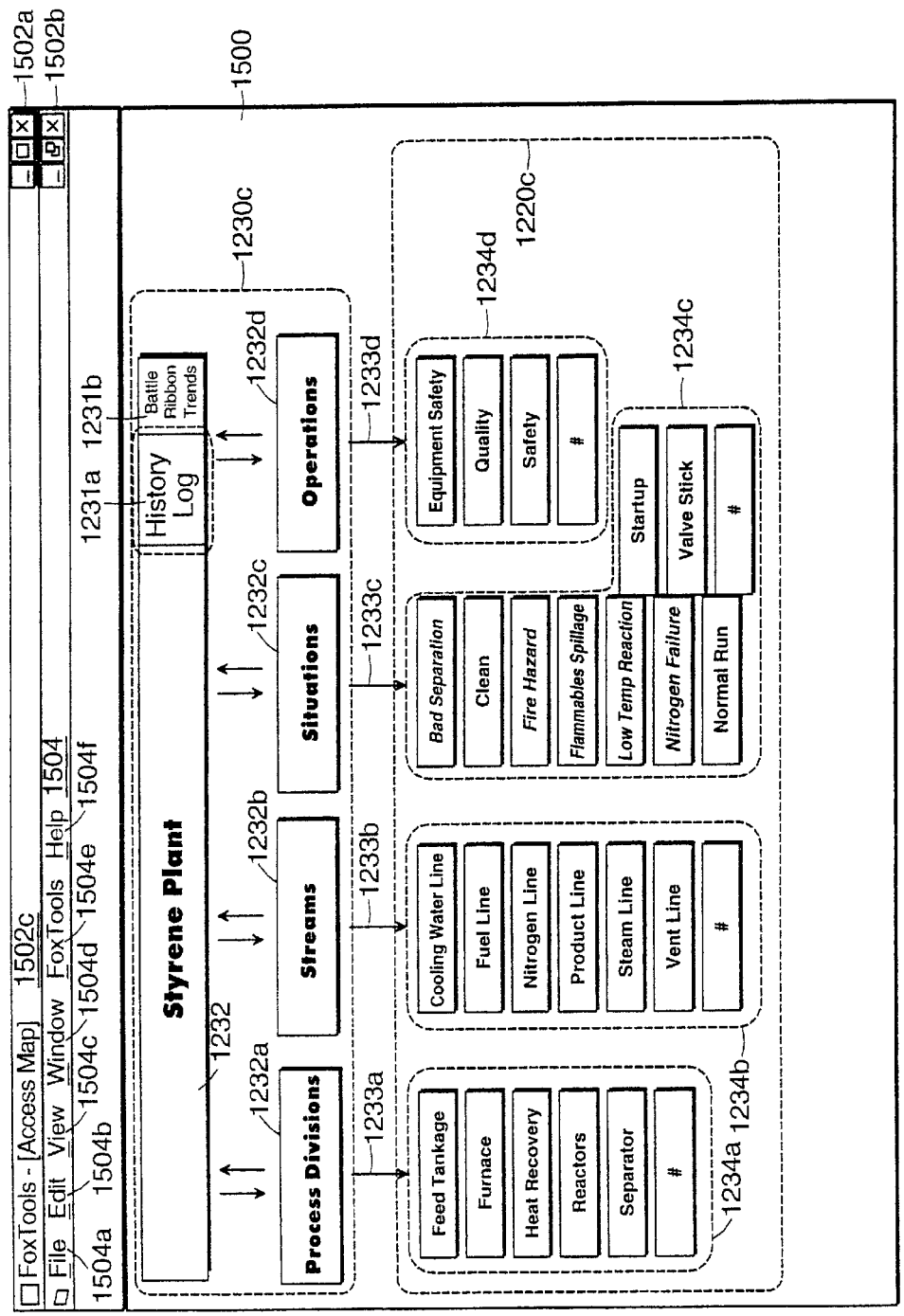

FIG. 24 represents the preferred embodiment of a top level GUI 1500 of the present invention. Standard GUI features shown are window control buttons 1502a, 1502b, a window title bar 1502c, and a window tool bar menu 1504. In the GUI window 1500 shown, a plurality of control button icons 1230c, 1220c are displayed, whereby an input/output device operated by a user is used to select a subwindow to be displayed.

The window control icons 1502a, 1502b are used to reduce an application window to an icon (in a standard GUI manner), increase the window 1500 to a default large size or a user specified size, and close the window or application.

The GUI window 1500 title bar 1502c indicates the application, "FoxTools™". The title bar 1502c also shows a window name, in this case "Access Map". A properly titled window is intended to provide information to an operator.

A standard window tool bar menu 1504 provides operation capability to an operator. The preferred embodiment has a list: file 1504a, edit 1504b, view 1504c, window 1504d, FoxTools™ 1504e, help 1504f. Standard Windows™ tool bar menu items include file 1504a, edit 1504b, view 1504c, and window 1504d. The file item 1504a is used to perform standard file operations, selected from a set including new file, open file, close file, save file as . . . , import and export, print, exit. The edit item 1504b includes standard editing operations, such as undo, cut, copy, paste, clear, select all, delete. View item 1504c includes standard operating items, such as zoom, show hidden items, and application customizable viewing information. The window item 1504d includes application window commands, such as "cascade windows", "tile windows", and "show a presently opened window". The window item 1504d enables an operator to move opened windows included in the alarm analysis tool application to the application foreground.

The FoxTools™ menu bar item 1504e is a list of alarm analysis tool customized operations, which provides specific application operations for a particular alarm system. For example, the access map 1500 shown in the GUI window 1500 is available from the FoxTools™ items 1504e pull down menu list (standard in the art) in the event a close window operation is selected from among the window buttons 1502b. Furthermore, other window graphics are selectable from the FoxTools™ item 1504e.

The help item 1504f in the window tool bar 1504 provides a list of information for an operator from which to learn features of the present invention. Information retrievable via the help item 1504f are definitions incorporated in the alarm analysis tools application 50 (FIG. 2C), information on how to traverse a window structure within the alarm analysis tools application 50, operating presumptions and modes, etc. In one aspect of the present invention, the help item 1504f is a pull down menu displaying a list dependent on the window presently being displayed.

In the categorization portion 1230c of the window 1500 shown, there is a styrene plant (i.e., global categorization) button 1232, a process divisions categorization button 1233a, a streams categorization button 1232b, a situations categorization button 1232c, and an operations categorization button 1232d. Also shown in the embodiment in window 1500 is a history log button 1231a and a battle ribbon trends button 1231b. Selection of any of the aforementioned buttons, 1232, 1233a . . . d, 1231a, 1231b opens an associated subwindow, corresponding to a title in the button selected.

An alarm category section 1220c includes a plurality of categories. Each column of categories is defined to be included within a categorization listed in the categorization button 1232a, 1232b, 1232c, 1232d located directly above the category button column, and pointed to by a graphical arrow 1233a . . . d, respectively. In the embodiment shown, selecting a category button from the category button columns 1231a . . . d, results in an associated subwindow being displayed, having information specific to the category having a title listed in the selected button.

Figure 25:
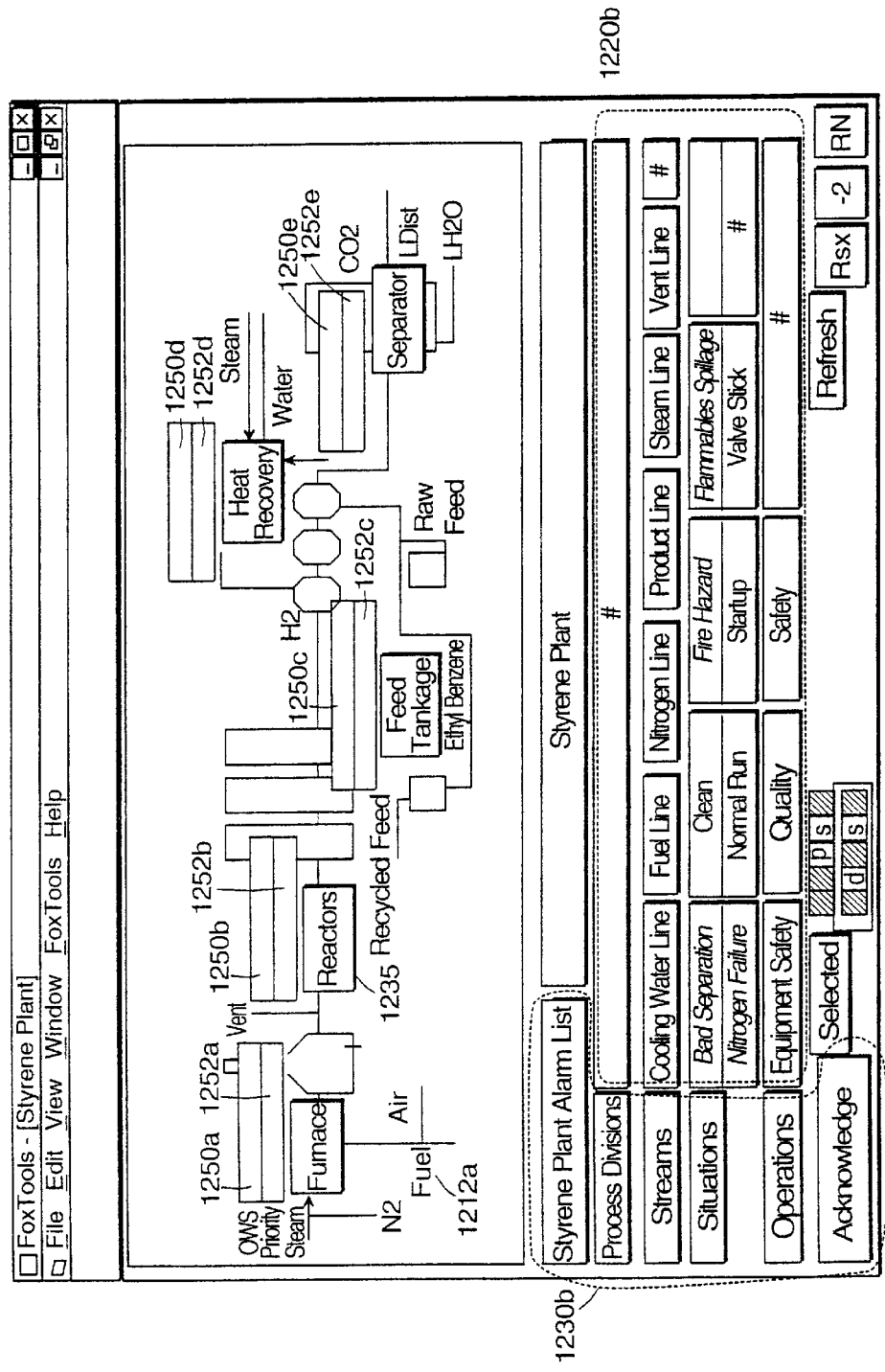

FIG. 25 is an example of the mask/filter of FIG. 12 applied to a styrene plant. The graphical illustration/ representation of the styrene plant has independent categorizations 1230b, each having respective indicator categories 1220b. Further detail is found in the previous discussion of FIG. 13.

Figure 26:
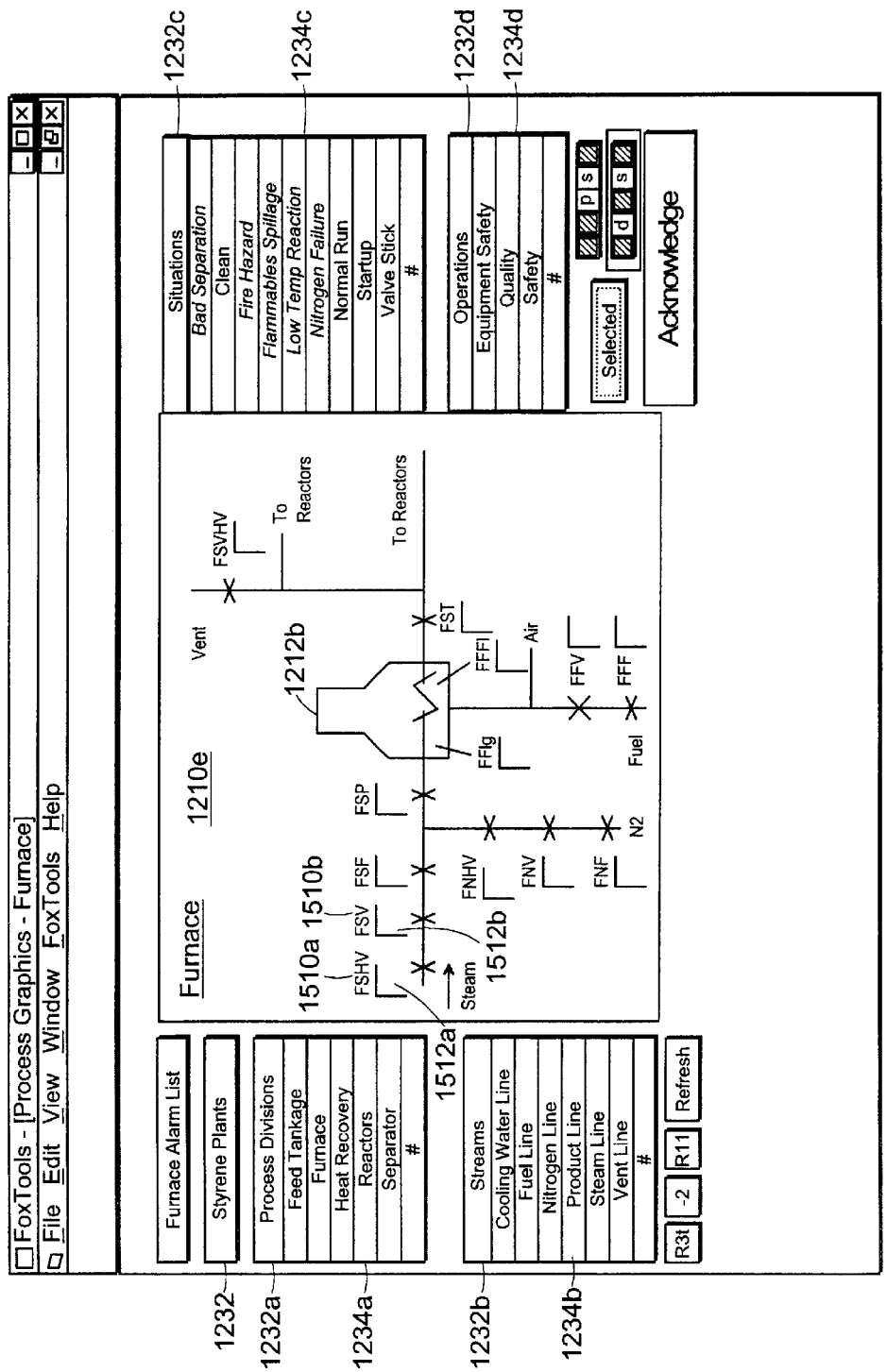

FIG. 26 is a process graphics window of a furnace category. Included in the displayed window are operator interface buttons, in the form of independent categorization buttons 1233a . . . d and category buttons 1231a . . . d. The display further includes a main display area 1210e having a process graphic 1212b for the furnace category.

The furnace process graphic 1212b in the main display area 1210e includes an alarm indication listing in the graphic; two alarm indications are FSHV 1510a and FSHV 1510b, where each example alarm indication has an associated alarm information box 1512a, 1512b, respectively. Every alarm indication within the furnace category is displayed in the process graphic display 1210e. The process graphic 1212b provides an operator with a "road map" of the process steps in a furnace being monitored.

Figure 27:
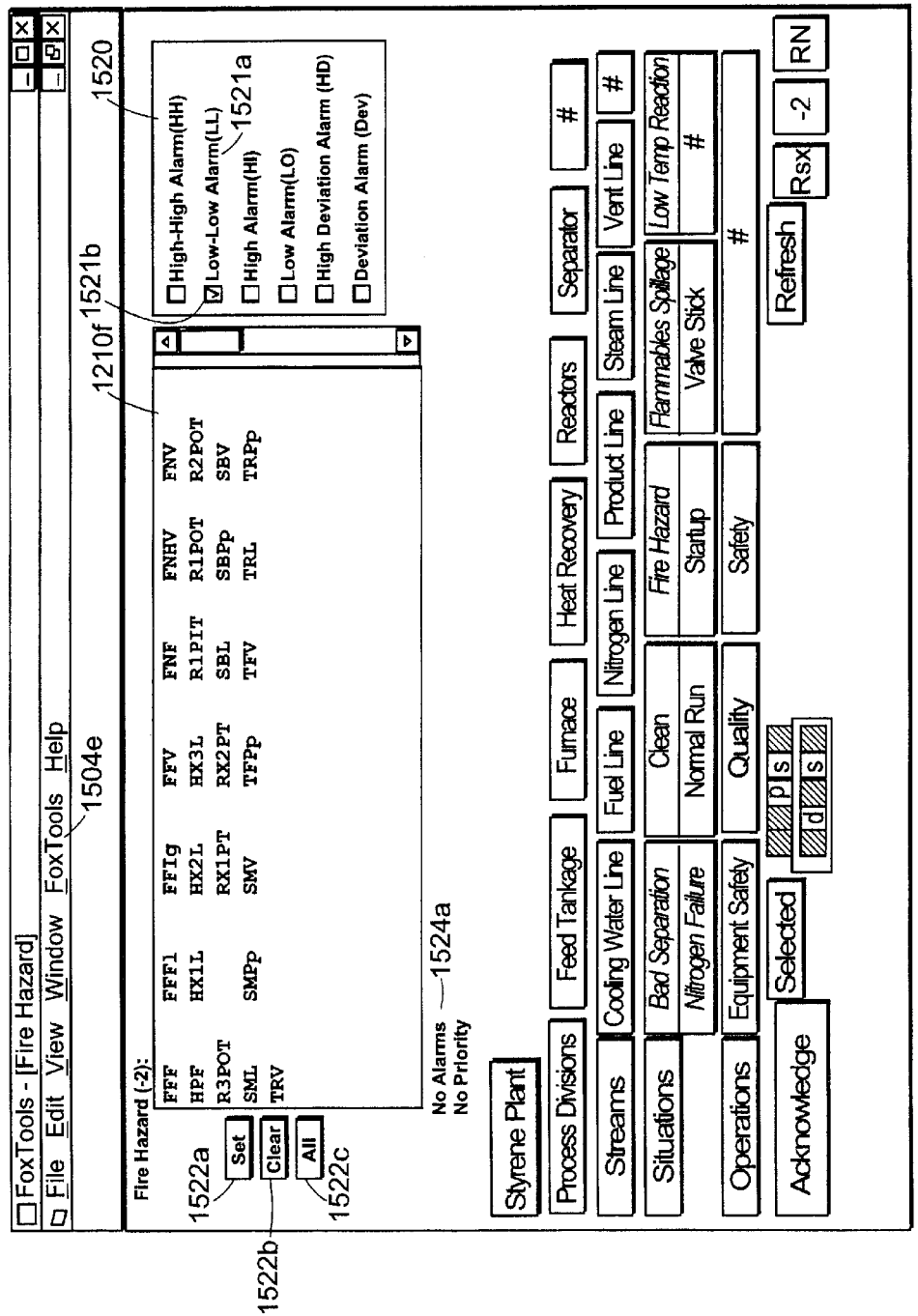

FIG. 27 is a window of a fire hazard pattern category. This window is displayed upon a user selecting this window from the FoxTools™ menu item 1504e, or selecting the fire hazard category button from within the situations 1232c category list 1234c in the access map graphic 1502c.

The fire pattern hazard pattern window has category main display area 1210f having an alarm indication listing, a set of control buttons 1502a . . . c, and an alarm status listing 1520.

The fire hazard main display area 1210e lists alarm indications in an organized manner, preferably alphabetical, giving an operator information as to what alarm is included in the fire hazard pattern. In the embodiment shown, an operator inputs a selection via an I/O device, such as a computer mouse or touch screen, and selects (i) a set button 1502a, to set an alarm associated with a selected alarm indication, (ii) the clear button 1502b, to clear an alarm associated with a selected alarm indication, or (iii) the all button 1502c, to select all alarm indications in the main window 1210e. In once aspect of an embodiment of the present invention, the control buttons 1502a, 1502b, 1502c are used in both simulation and operation.

The status box 1520 lists a set of alarm status conditions in which an alarm in an alarm system is within. For example, a low-low alarm (LL) 1512a status condition is the condition in which an associated alarm is extremely below a normal operating condition (i.e., below a predetermined threshold). A check-off box 1512b having a check mark therein indicates a selected alarm indication from within the main display area 1210e is determined to have a low-low alarm (LL) 1512a condition.

An overall fire hazard status indication is shown in a status condition list 1504a. Presently displayed is a "No alarms" and "No priority" condition status. The condition status list 1504a is determined by the fire hazard category, as determined by a fire hazard category metric (as discussed previously), which is based on the alarms associated with the fire hazard pattern category.

FIG. 23 is a history log display window. The history log display window is opened by selecting the history log button 1231a from within the access map window 1502c (FIG. 24), or from within the FoxTools™ item 1504e selection pull down menu.

In a history log main display area 1210e, alarm indications representing captured alarms are displayed according to a line number list 1530, a sample time list 1532, a main descriptor list 1504a, an alarm status list 1536, and a full text alarm description list 1538. Further, a set of control buttons are shown, where a sample advancing button 1525 increases a sample time from 0 to the end of a plurality of sample times, a reset button 1526 resets the sample time to 0, a GOTO number button 1527 to allow skipping to an nth sample, and a refresh button 1528 that clears alarm settings without resetting the sample time.

In the history log main display area 1210e, shown are the first 33 samples captured list 1532. The sample advancing button 1525 is selected to increase the sample count 1532. The next sample to be shown is sample 34, as indicated by a number shown in the sample advancing button icon 1525. The log entries descriptions 1538 show that an alarm flood occurs up to sample time 30 (line 22 in line number list 1530) and starts to back off at sample time 33, as seen in the samples captured list 1532.

An operator selects a categorization or category by "single clicking" an independent categorization button 1232a, 1232b, 1232c, 1232d or category button 1231a . . . d through the use of an I/O device coupled to the GUI window, then operates the "select" button 1542a.

Figure 28:
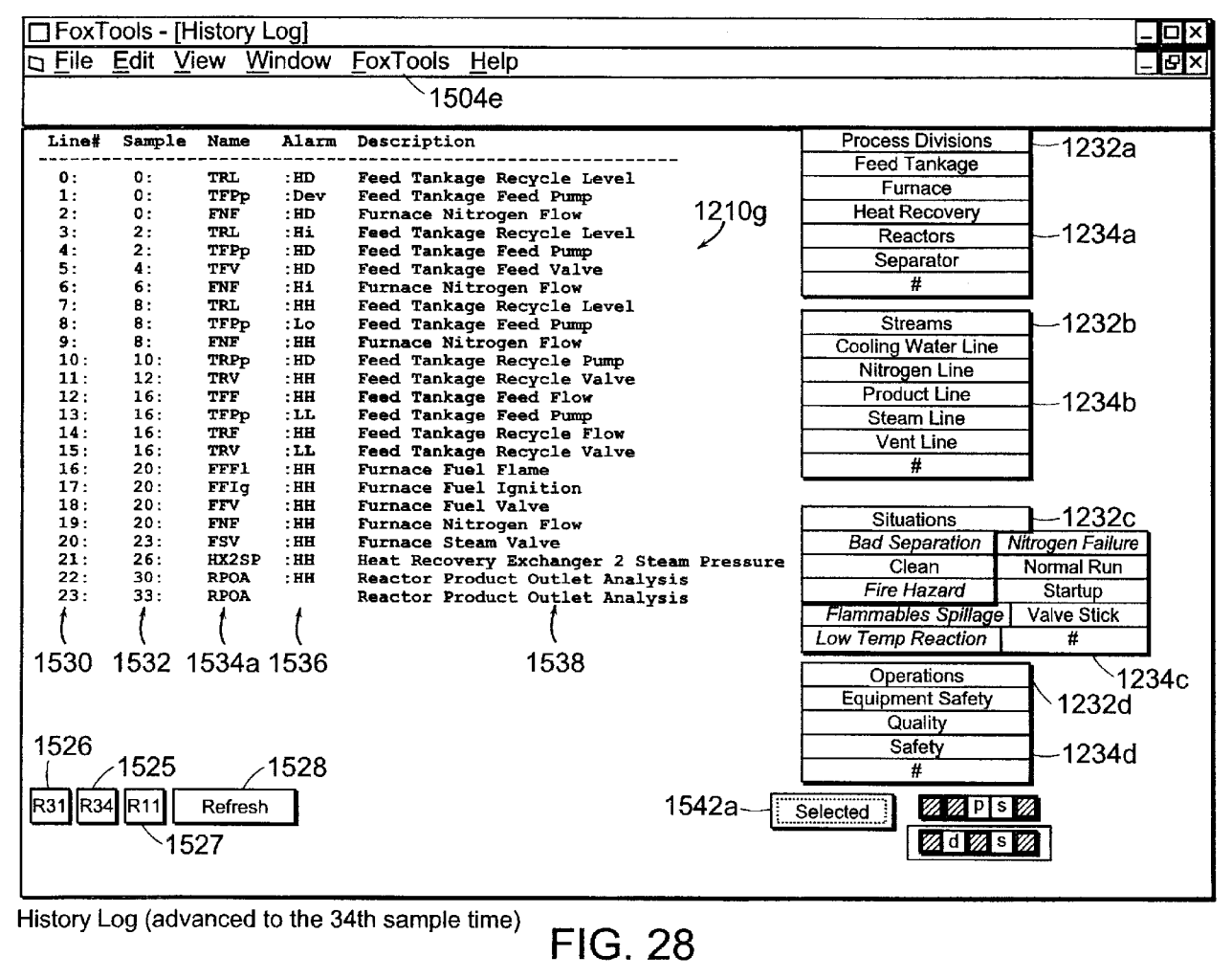
Figure 29:
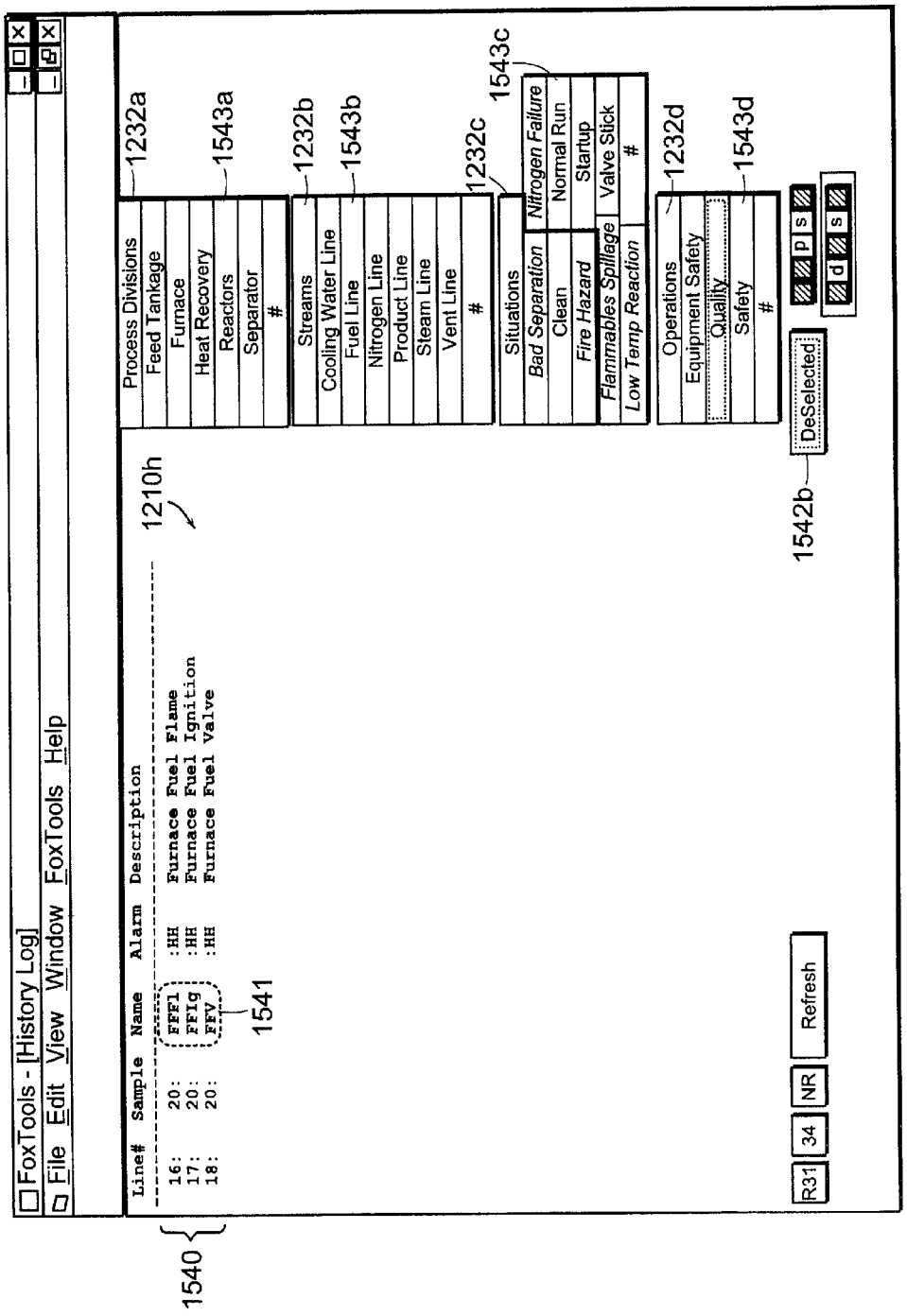

FIG. 29 is the same history log as FIG. 28, but having an active mask/filter, wherein the furnace 1543a, fuel line 1543b, normal run 1543c, and safety categories 1543d are selected. The intersection of those selected categories results in a main display area 1210h having a display list including lines 16–18 1540. The alarm names shown in the list are FF1, FFIg, FFV 1541. Note that the select button 1542a of FIG. 28 becomes a de-select button 1542b. Also, the independent categorization buttons 1233a . . . d, labeled as process divisions, streams, situations, and operations respectively, each toggle all of their subcategory selections on or off. This combination makes it easier to approach the filters from a selection and deselection point of view.

Figure 30:
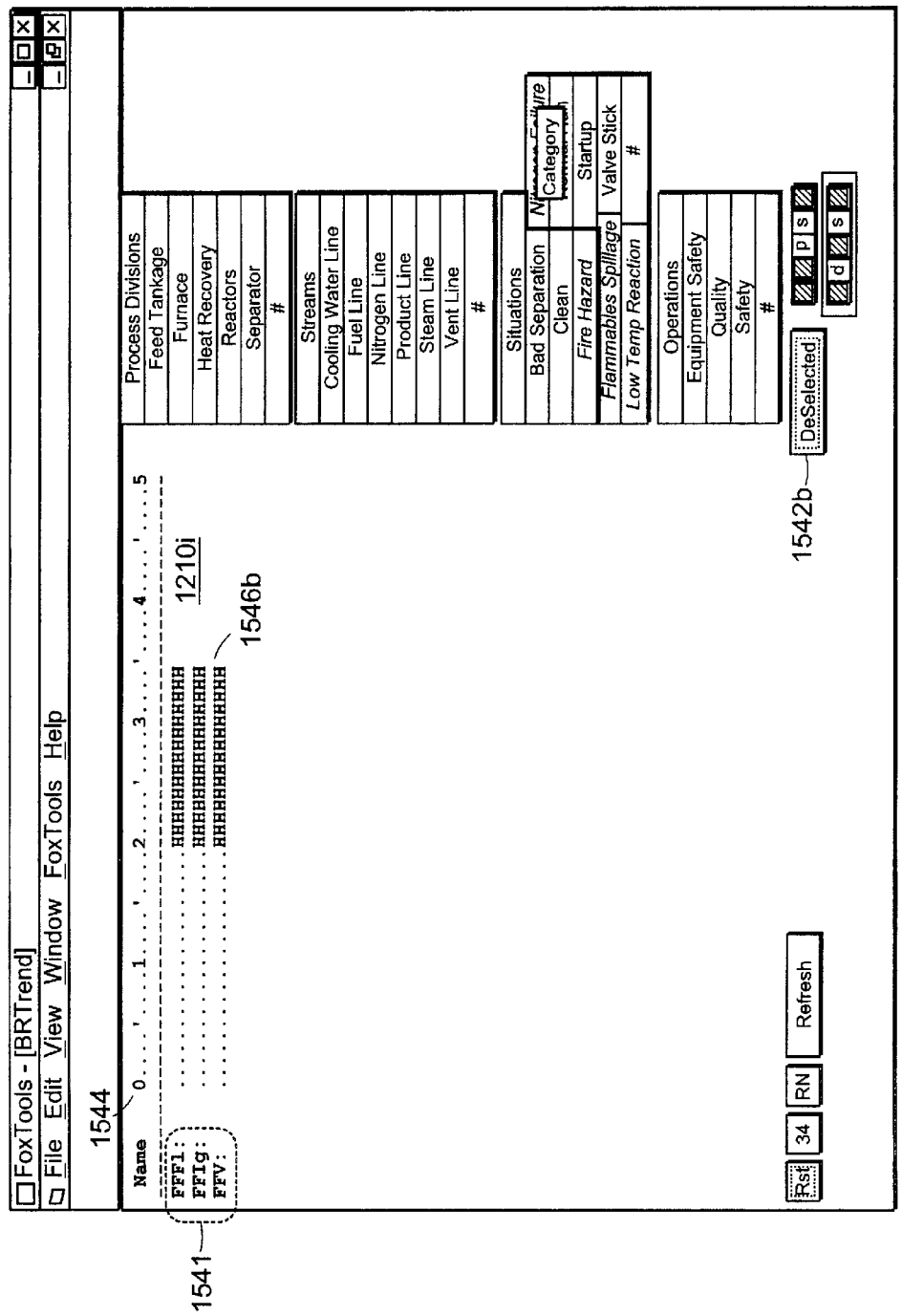

FIG. 30 is a battle ribbon trend display (letter coded instead of color coded) with the same mask/filter carried over from the log in FIG. 29. A main display area 1210e has a time scale 1544, beneath which corresponding alarm indication status letter codes 1543b are displayed. In this case, alarms FF1, FFIg, and FFV 1541, which are not masked out, are displayed horizontally across the battle ribbon trend main display area 1210e. Note, again, the deselected button 1542b mode.

Figure 31:
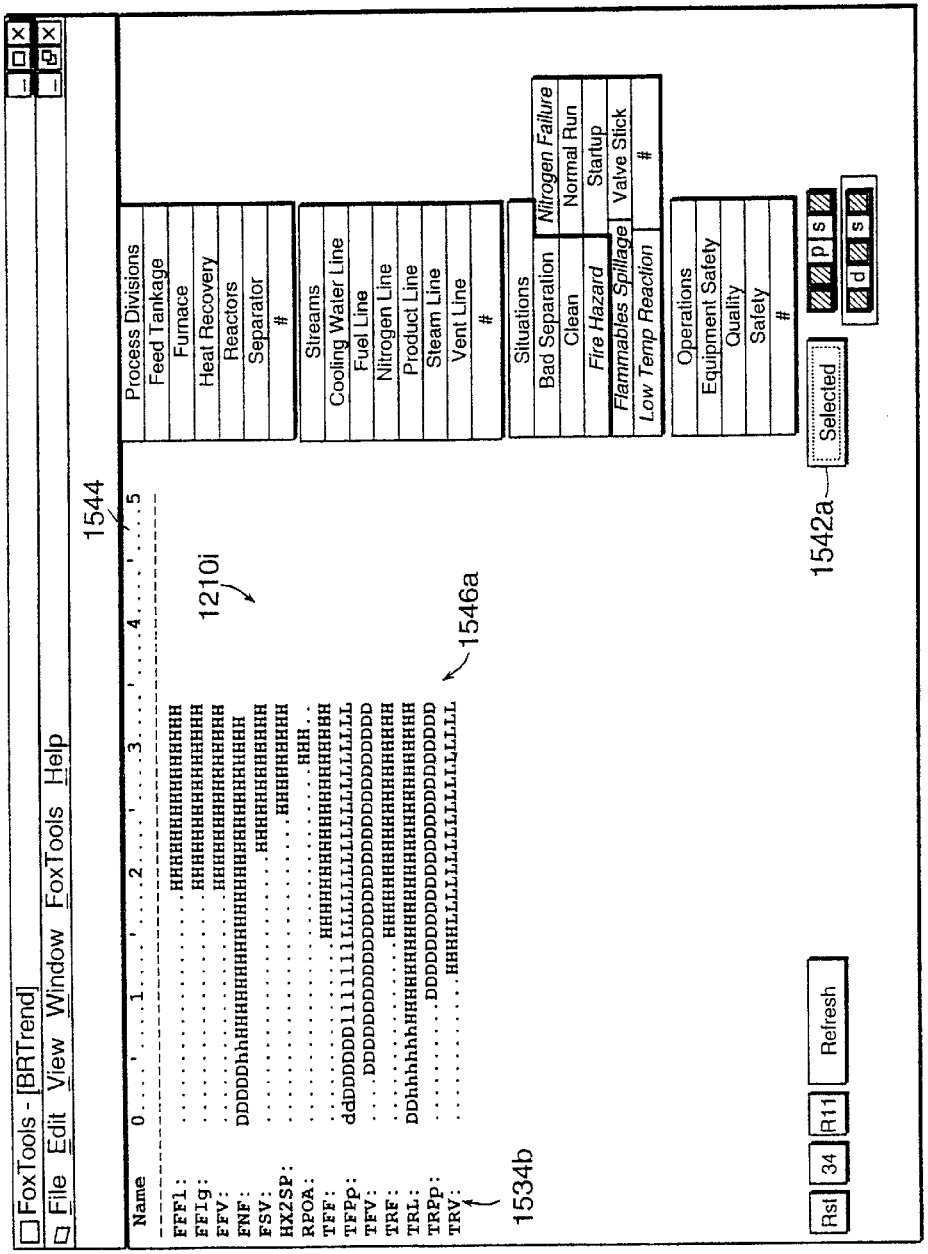

FIG. 31 is the same battle ribbon trend as in FIG. 30, but with the mask/filter removed. The main display area 1210i has a time scale 1544 beneath which an alarm indication list 1534b having a plurality of associated alarm status indication letters is listed. Note, too, the "select" button 1542a mode.

The battle ribbon trend information 1546a is the same as the history log of FIG. 28, but in a different format. The reason for the different format is to allow an operator to view alarm information in an alarm priority format (FIG. 31), rather than a time history format (FIG. 28), thereby enabling a different method of analysis. All alarms in the log show up in the trend format, but in a much clearer form than in the time history format. The mask carries over from the log as well. Because the time scale 1544 defines the time of events, the alarm indications 1534b are ordered alphabetically by name, making them much more easily searchable.

Figure 32:
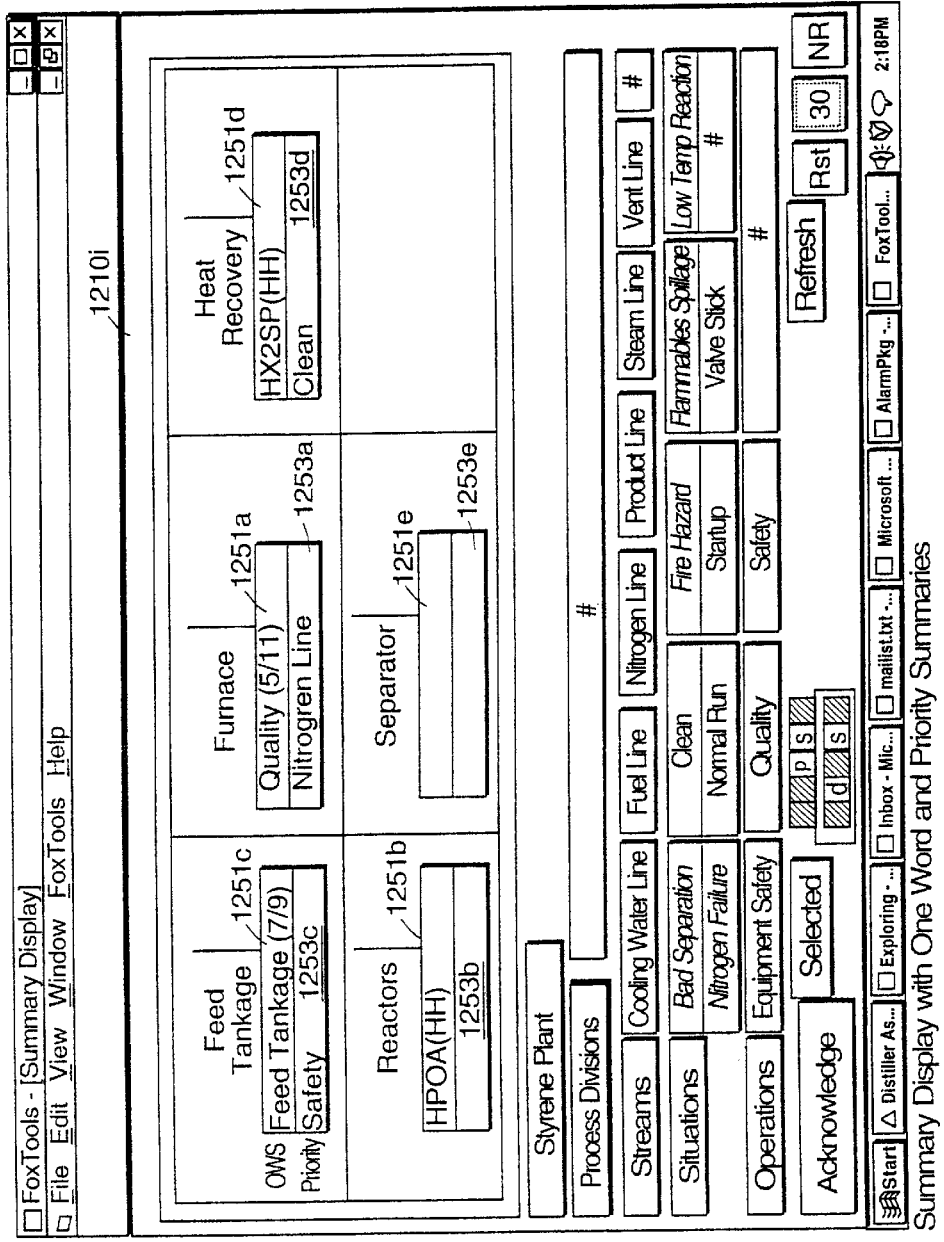

FIG. 32 is a summary (alarm panel) display providing one word and priority summaries information ((iconic) summary display). This display is available from the FoxToolsS™ 1504e pull down menu. A one word summary 1251a . . . e allows a single alarm to percolate to a top level of a hierarchical if there is only one alarm active. A priority summary 1253a . . . e is based on priority ordered categories and is a better strategy than assigning priorities to individual alarms based on a neutral set of numbers, such as 1, 2, 3, 4, 5, which makes it tempting to prioritize everything at 1. A mask/filter affects the summaries in the text boxes 1251a . . . e, 1253a . . . e for a subset of categories, depending on the mask/filter.

Figure 33:
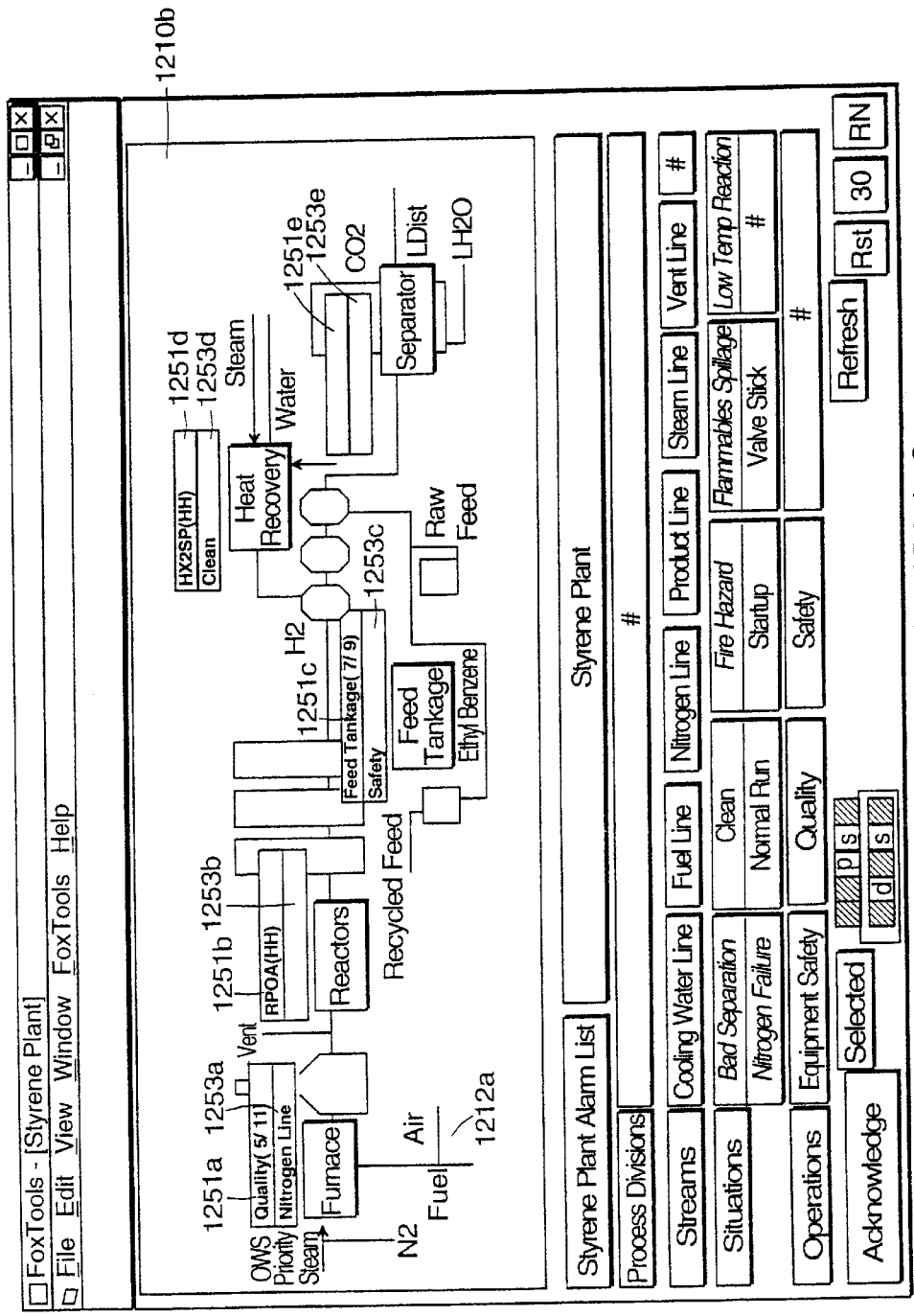

FIG. 33 is the styrene plant graphic shown in FIG. 25. The styrene plant window having a main display area 1210b has the same one word summary and priority summary data and display selection data as in FIG. 32, as expected. The various formats, again, provide various levels of meaningful information to an operator, particularly because an operator has freedom to choose a display based on an abnormal situation and a desired level of analysis.

Figure 34:
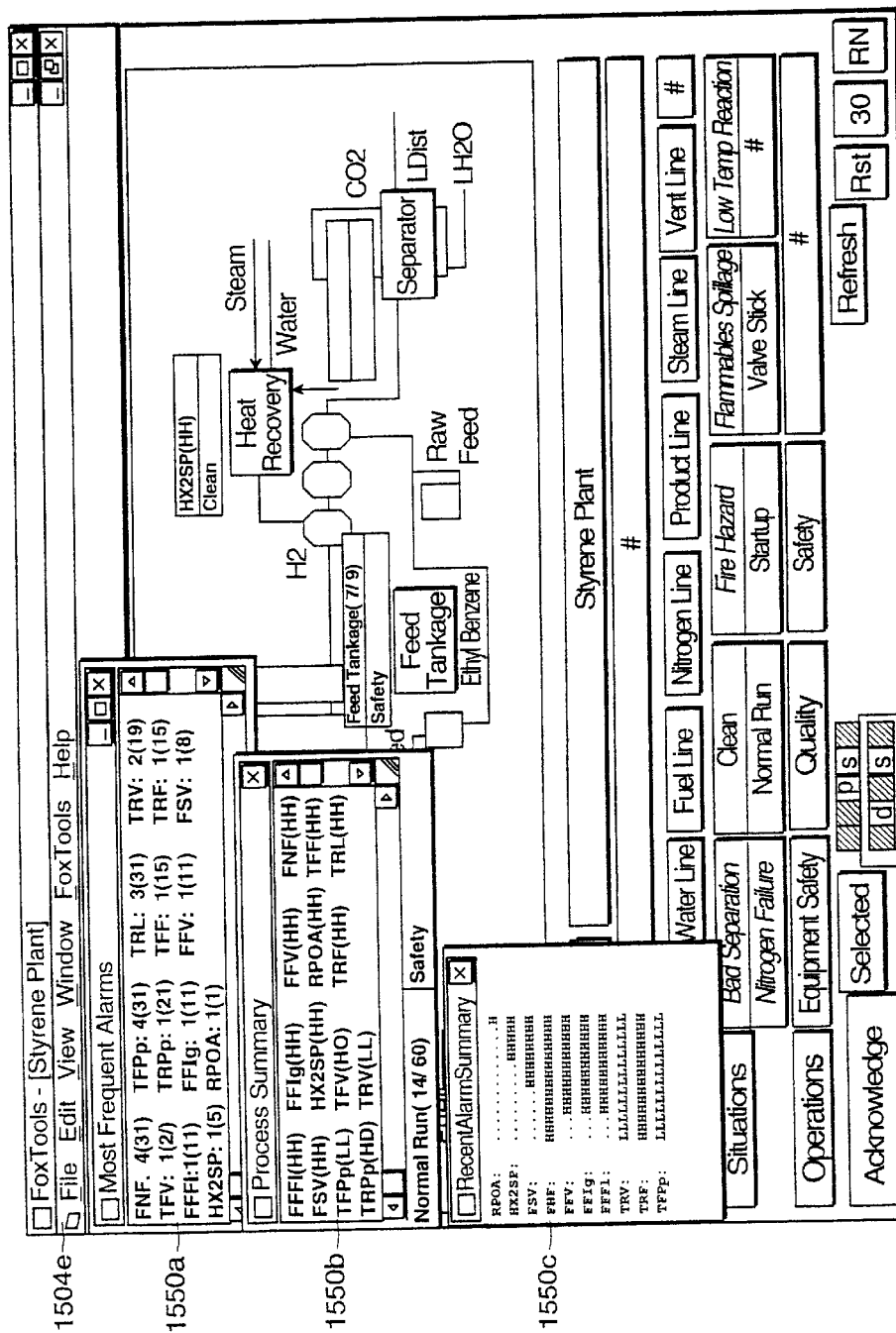

FIG. 34 highlights optional inlay displays (menu item from the FoxTools™ 1504e pull down menu), which includes a most frequent alarms display (pareto) 1550a, process summary display 1550b, and most recent alarms summary displays 1550c. The most frequent alarms display 1550a is intended to encourage an enforcement of corrective engineering and operation of persistent problems.

Figure 35:
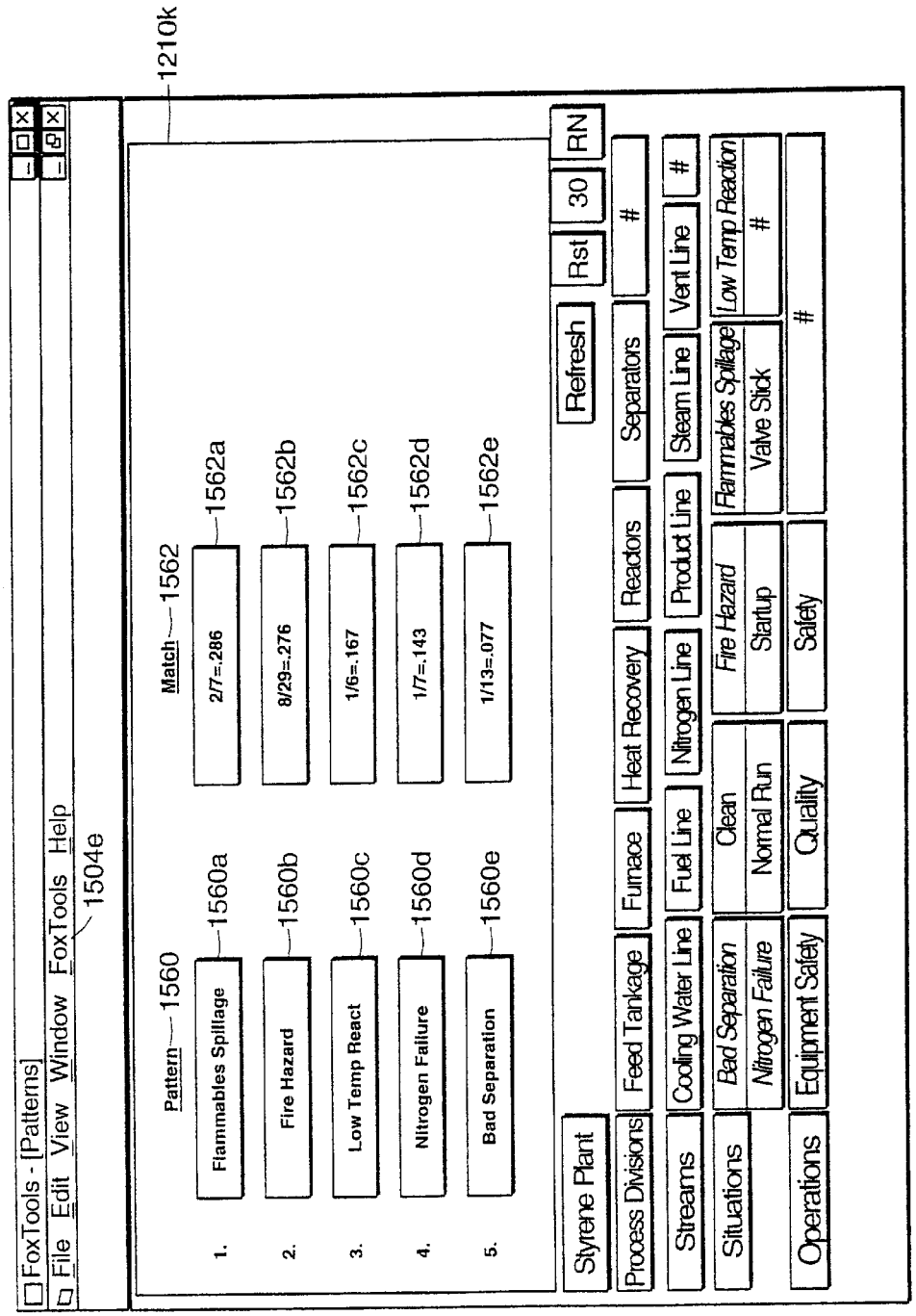

FIG. 35 is a patterns summary display, opened from a menu item in the FoxTools™ 1504e pull down menu. In the embodiment shown, the pattern summary display 1210k has alarm sample cycle-through capability, as do other displays. Note from the detailed description section that a pattern alarm analysis is not affected by a mask/filter.

The main display area 1210k has a pattern category column 1560 and match ratio column 1562. In the preferred embodiment, the pattern category column 1560 shows the top five best-matched pattern categories 1560a . . . b. For each, a corresponding metric is listed in the match ratio column 1562, where each metric ratio corresponds to its horizontal counterpart in the pattern column 1560. The metric ratio 1562a . . . e presents (i) a number of alarms recognized as being in a proper pattern order, and (ii) a total number of pattern alarms. Together, the two values compute the metric ratio as the first number divided (normalized) by the second, and shown as a percentage. From this display 1210k, a set of individual pattern displays are accessible, corresponding to the pattern category indications listed in the pattern column 1560.

Figure 36:
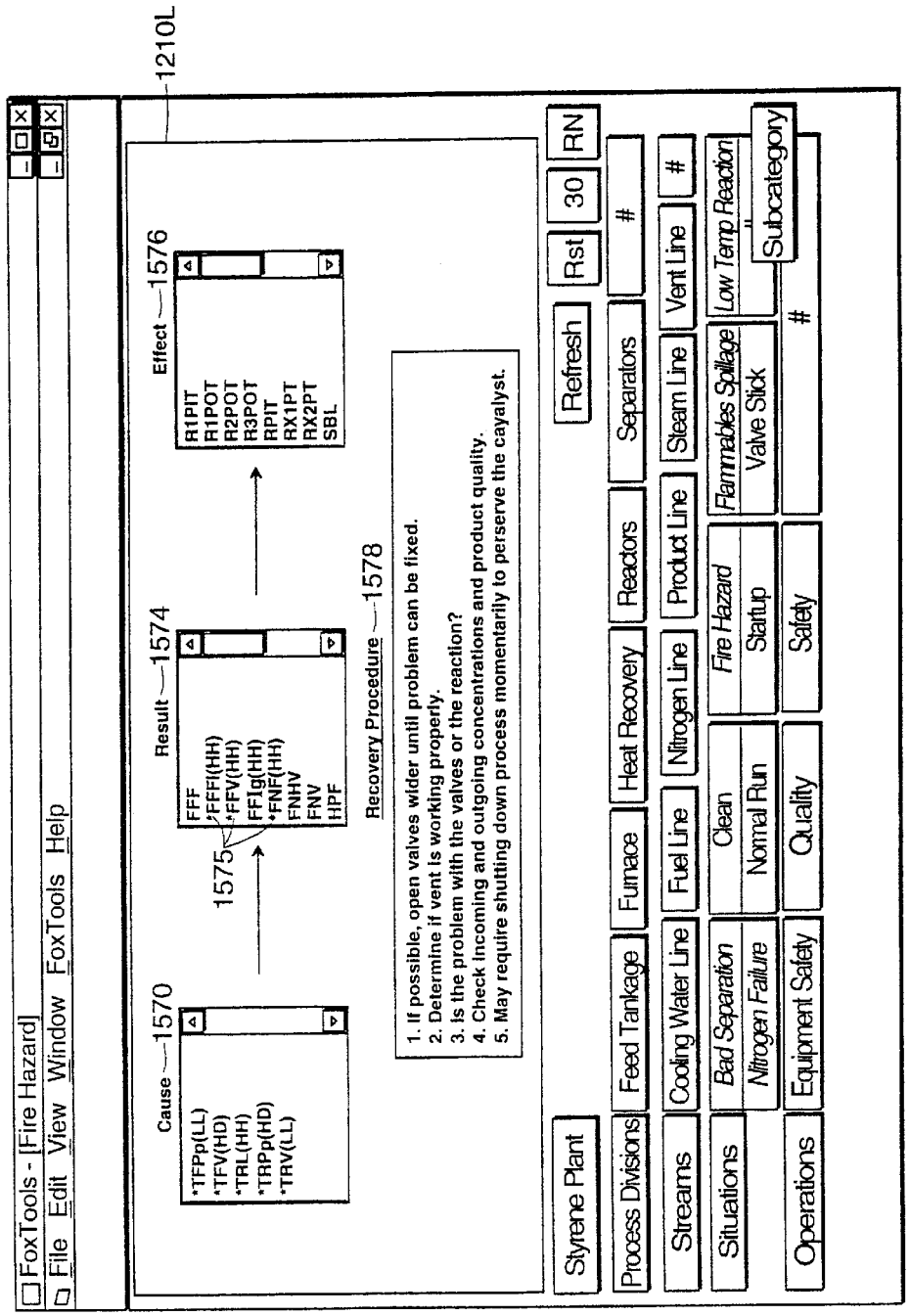

FIG. 36 has a main display area 1210L having a cause alarm list 1570, a result alarm list 1574, and an effect alarm list 1576. Further, the main alarm display 1210L has a recovery procedure list 1578.

FIG. 36 is a fire hazard alarm pattern list display, called from the access map in FIG. 24. In this display type, a pattern is set up to predict its result and effect alarms. Prediction occurs if a causal alarm's quantity meets a pre-specified prediction threshold. In the example shown, the fire hazard pattern, the prediction threshold is one less then the total number (5) of causal alarms. To see the prediction action, an operator steps through the samples up to sample 9. The fire hazard pattern main display area 1210m shows three causal alarms set out of a total of five, which are indicated in the causal alarm list 1570 in FIG. 31. In the fire hazard alarm list of FIG. 32, the alarmed variables are colored.

Upon the next (tenth) sample, the remaining results and effect alarms are immediately shaded darker pink (expressing the prediction of alarms here; the alarm state is not given). In an alternate embodiment, alarmed variables are displayed in a different type face as non-alarmed variables to express the same meaning as the shading. In another embodiment, a sound accompanies a change in alarm state. The furnace nitrogen flow (FNF) variable is a result variable whose higher importance measured alarm state overrides the prediction and is displayed normally. At the tenth sample, the pattern display shows all but one causal alarm as being active, causing a prediction in accordance with the pre-specified prediction threshold.

In following the teachings of the present invention, the alarm predictions show up on any of the graphics of lists that show alarm states. Alarms contained within a pattern category arriving in a correct sequential order, as defined by a pattern category predefined list, are shown with an asterisk to the left of the alarm indication in the cause column 1570, and the result list 1574. The cause column 1570 has five alarm indications with asterisks, meaning the alarms arrived in the predefined sequential order. In the result list 1574, three of the eight alarm indications have asterisk markings 1575, meaning their associated alarms arrived in sequence as predefined in a pattern category. Intermediate alarms, such as FFIg are allowable in the pattern category definition.

Figure 37:
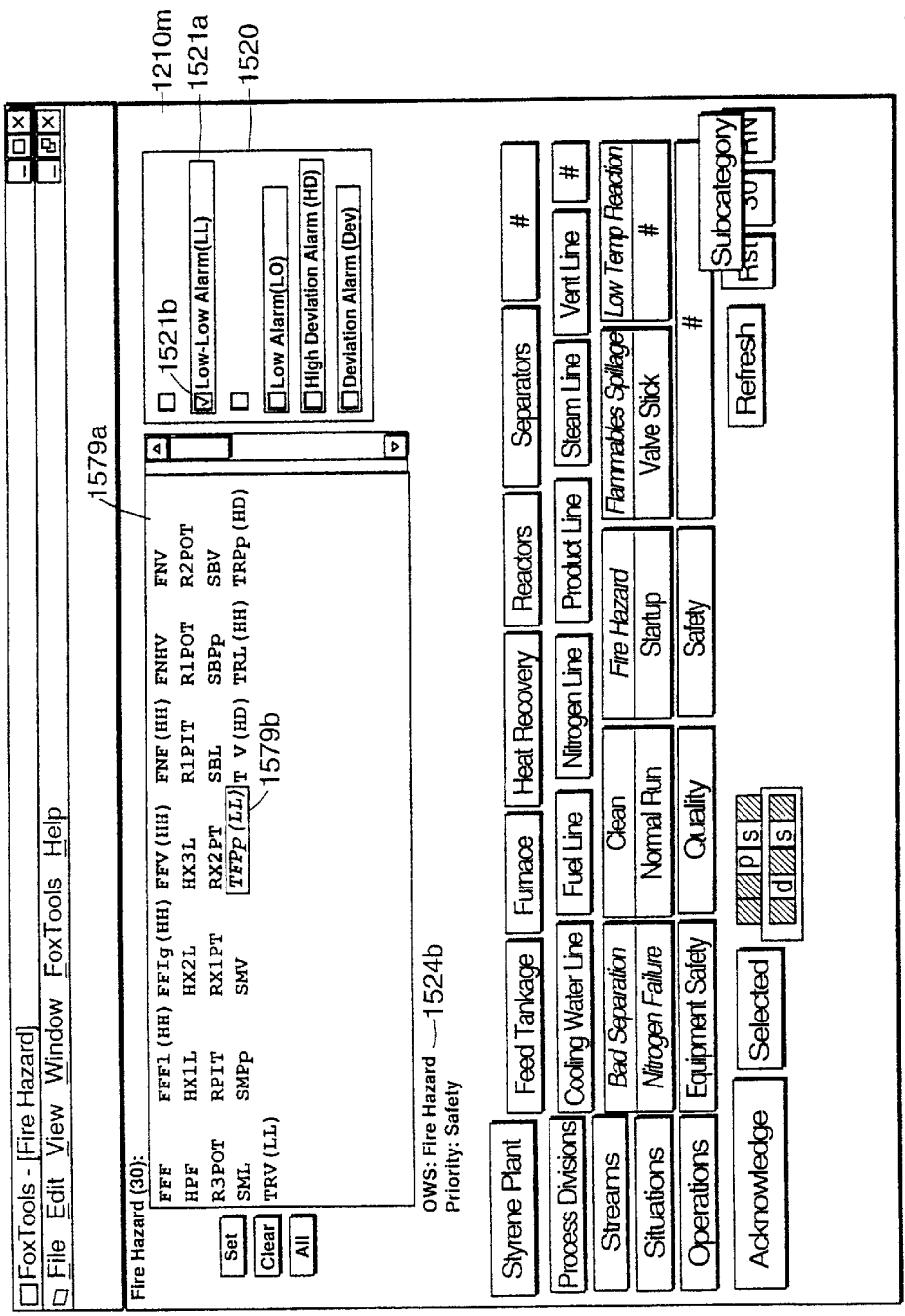

FIG. 37 is a fire hazard alarm list display. The main display area 1210m shows a list of alarm indications included in the fire hazard pattern category, with alarmed variables having a shaded background 1579a. Note that the time sample is at time sample 30.

A special check box display 1520 is designed to display the detailed alarm state as input or as user selected (for WHAT IF exercises). The alarm state value displayed with an alarm indication only indicates the most significant of the alarm states, not all of the states. For example, the alarm indication FFV(HHN) would not also show FFV(HH,Hi), because HH is a more significant alarm state. The six check boxes in the special check box display 1520 are associated with the HH, HiLL, Lo, HD, and Dev alarm states.

A check in an associated check box 1521b means that the state is selected for WHAT IF Selections. (Alarms selected by double clicking the alarm state 1521a, for example, have that state set and are indicated by a check in the check box 1521b, for example. The check is allowed to be set or reset by picking it (via a computer mouse selection "double click"). The remaining display modes react when a main alarm display 1210m is "single clicked". Single or double clicking selection methods are a physical description of what an operator does with a computer mouse button.

Text modes and color modes are used to provide additional information to an operator. For example, black lettering of an alarm type tag, as opposed to an inverse lettering of an alarm type tag 1521a, indicates one of the WHAT IF selected types of the selected alarm variable. A full red background of the type tag indicates one of the active alarm types for the selected alarm variable. A darker red background of the type tag indicates one of the predicted alarm types for a selected alarm variable. An active display background overrides the predicted display. In the example shown, the special check box display 1520 is highlighted in accordance with a selected alarm indication TFPp(LL) 1579*b*.

A one word summary and priority summary list 1524*b* show a "fire hazard" one word summary and "safety" as a priority summary. These summary words are determined in accordance with the fire hazard pattern category definition, set up by a process engineer or operator. Note that although a mask/filter has no affect on a pattern, such as the fire hazard pattern, a mask/filter does have an affect on a one word summary and priority summary in the pattern display.

Figure 38:
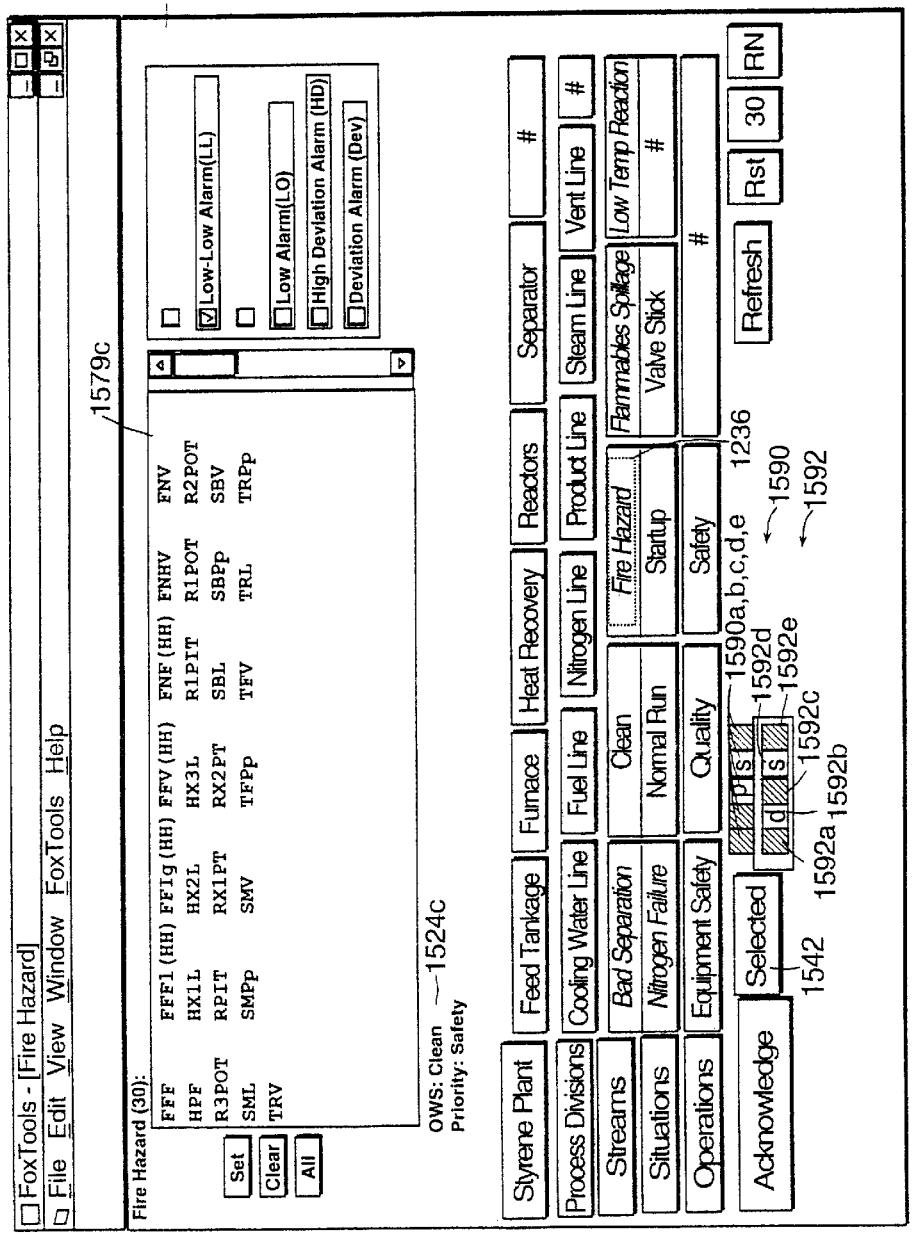

FIG. 38 is the same fire hazard pattern display as FIG. 37, but with the fire hazard pattern mask; the effects are observable in the main display area 1210*n*. Note, the shaded alarm indications 1579*c* are fewer than those in FIG. 37, due to the mask suppression. Further seen is a one word summary and priority summary list 1524*c* now showing "clean" and "safety" respectively, rather than "fire hazard" and "safety", as in 1524*b* (FIG. 37). The fire hazard category button 1236 has a dotted outline, which indicates the mask suppression.

Toggle control of categories and categorizations is facilitated through the use of a set of toggle control buttons, 1590, 1592, respectively. A set of toggle control buttons 1590*a* . . . *e* in the top row of toggle control buttons 1590 toggle categories into and out of states inherent in each button 1590*a* . . . *e*. A set of toggle control buttons 1592*a* . . . *e* in the bottom row of toggle control buttons 1592 allows toggling categorizations into and out of various mask conditions. The bottom row of toggle control buttons 1592 affects the overall selected/deselected button 1542 affected categorizations. Also, the bottom row of toggle control buttons 1592 only affects masked states from a state value enabled in the controls.

Toggle buttons 1590*a*, 1592*a* are defined as "no display" buttons, which causes the affected category alarms to be suppressed, no matter what. Toggle buttons 1590*b*, 1592*b* are defined as "deselected" buttons. Toggle buttons 1590*c* and 1592*c* are defined as "pattern deselect" buttons. Toggle buttons 1590*d*, 1592*d* are defined as "select" buttons. Toggle control buttons 1590*e*, 1592*e* are defined as "full display" buttons, which causes a display of so-tagged category alarms, no matter what other categories and categorizations are suppressed.

Toggle control allows an operator to select a range of suppression actions he or she wants and to minimize the toggling action to his choice. The upper set of toggle control buttons 1590, affect a selection of individual category maskings. The lower set of toggle control buttons 1592 affect the behavior of the overall selected/deselected button 1542, or of the process divisions/streams/situations/operations buttons. These overall buttons only change a mask state from a state value that is enabled in the controls. Thus, individual states are set differently from the overall controls. Furthermore, color indications in each toggle control button 1590*a* . . . *e*, 1592*a* . . . *e* corresponds to a background shading in each category or categorization button.

Figure 39:
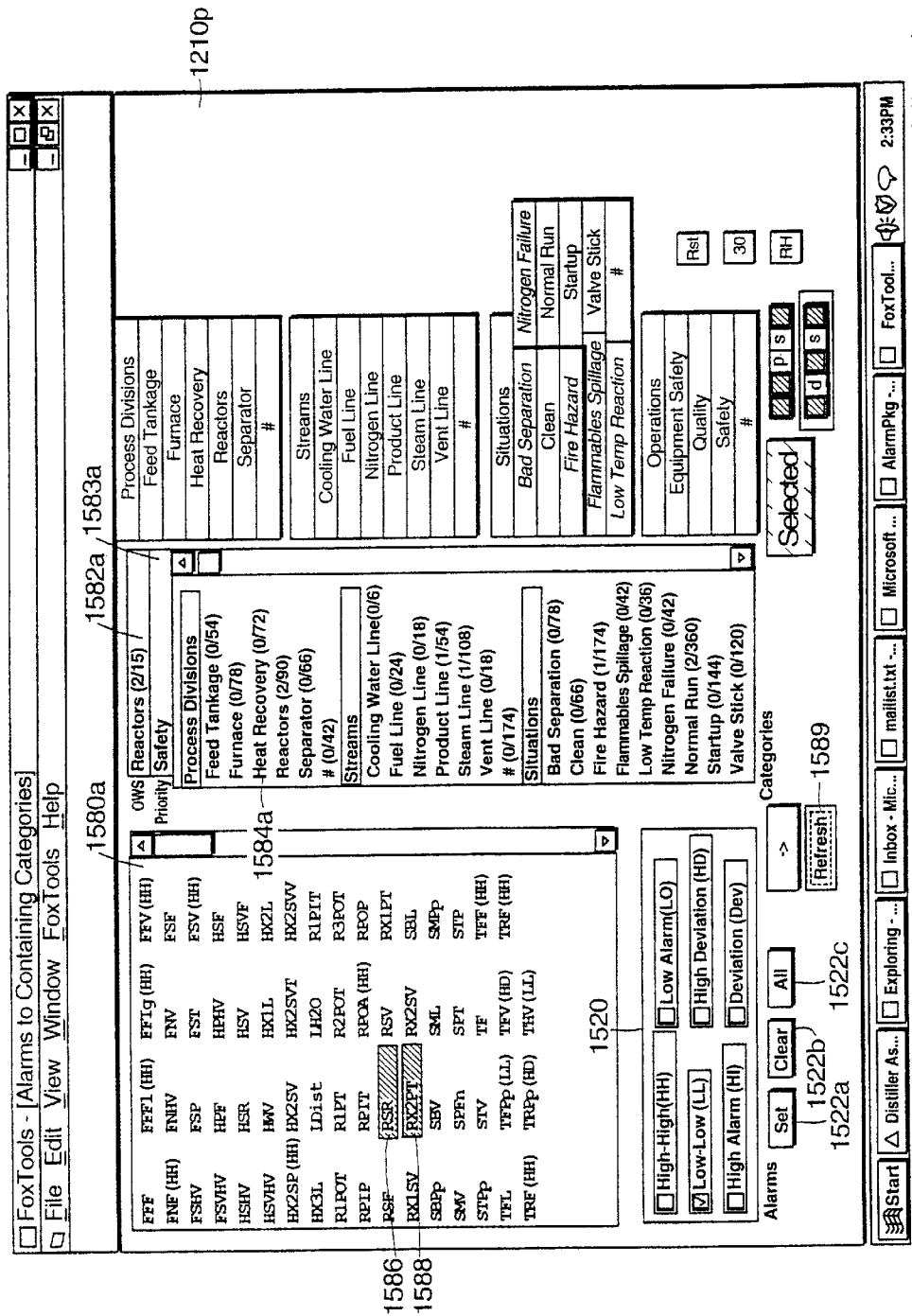

FIG. 39 is a WHAT IF display. Alarm indications RSR 1586 and RX2SV 1588, which are selected in low-low state (RX2SV 1588) also shows prediction in the special check box display 1520.

This alarms-to-category display provides an operator with an ability to see categories into which a given set of alarms fall. In the main display area 1210*p*, a left list 1580*a* lists all of the alarm indications; a middle list 1584*a* lists all of the categories.

Any reddened alarm indication defines (with the check boxes) an alarm that is tested for category membership. After alarm indication selection, the refresh button 1589 selection causes all alarm categories containing all selected alarms to be fully yellowed and all categories containing some of the alarms to be lightly yellowed. The set button 1522*a* selects all active alarm states, and the clear button 1522*b* clears all selections. The all button 1522*c* selects all alarm variables, additionally setting them all to their checked states (so that large selection lists can be made by deselecting individuals rather than the other way around).

All alarm lists, for example, list 1580*a*, also include a list of alarm type labeled check boxes 1520. When an alarm indication is "single click" selected, the alarm type labels corresponding to its detailed alarm state are reddened. The checks are used to control alarm type selection for the given alarm.

The one word summary 1582*a* shows a reactors category having two of fifteen alarms set, where thirteen alarms have been filtered. The priority summary 1583*a* shows a safety priority.

Figure 40:
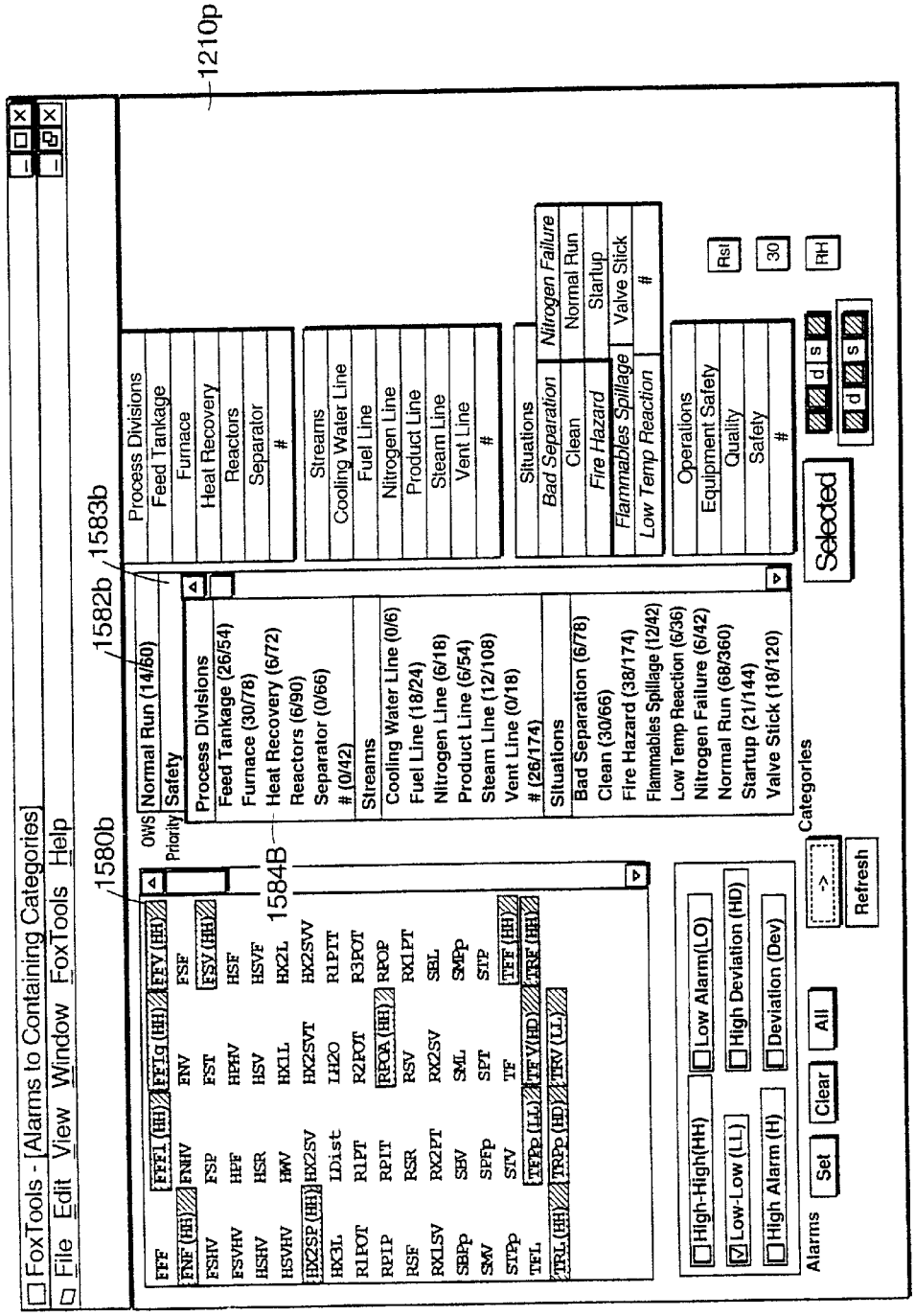

FIG. 40 is the same WHAT IF display with the actual alarm states selected. The alarm indications list 1580*b* has different alarm selections, and, as expected, the categories listing 1584*b* shows a different one word summary 1582*b* (normal run) and different priority one word summary 1583*b* (safety). Again, the main display area 1210*p* allows for multiple colors and multiple font types to provide graphically meaningful information to an operator.

What is claimed is:

1. In a computer system, an apparatus for selecting alarms for an alarm monitor system, comprising:

an application window, displaying a main alarm list having a set of alarm indications, and displaying a set of operation indications;

a selector coupled to said application window, capable of defining a set of selected alarm indications from the main alarm list, and defining a selected operation indication from the set of operation indications; and an operation unit, (i) receiving the set of selected alarm indications and the selected operation indication from said application window as defined by said selector, (ii) affecting the set of alarm indications associated with the set of selected alarm indications in accordance with the received, defined, operation indication, and (iii) transmitting an alarm list subset having characteristics of the selected alarm indications.

2. The apparatus according to claim 1 wherein said application window comprises a first subwindow, a second subwindow, and a third subwindow, said selector coupled to each said subwindow.

3. The apparatus according to claim 2 wherein said first subwindow displays the main alarm list, said second subwindow receives a temporary subset of the main alarm list from said first subwindow as defined by said selector, and said third subwindow receives a final subset of the main alarm list from said second subwindow as defined by said selector.

4. The apparatus according to claim 3 wherein said subwindows are vertical columns in said application window, wherein said first subwindow is the leftmost column and said third subwindow is the rightmost column.

5. The apparatus according to claim 2 further comprising an input file having the main alarm list.

6. The apparatus according to claim 5 further comprising an output file into which the alarm list subset is stored.

7. The apparatus according to claim 6 wherein said first subwindow displays the main alarm list of said input file, said second subwindow receives a temporary alarm list subset of the main alarm list from said first subwindow as defined by said selector, and said third subwindow receives a final alarm list subset of the main alarm list from said second subwindow as defined by said selector, wherein the final alarm list subset is written to said output file.

8. The apparatus according to claim 7 wherein said main alarm list includes alarm code acronyms.

9. The apparatus according to claim 8 wherein said main alarm list further includes alarm icons.

10. The apparatus according to claim 9 wherein in each of said first, second, and third subwindows, respective alarm lists are displayed in a sensibly grouped order.

11. The apparatus according to claim 10 wherein said sensibly grouped order includes alarm indications listed in alphabetical order.

12. The apparatus according to claim 7 wherein said first subwindow includes a selection portion that lists the selector defined set of selected alarm indications.

13. The apparatus according to claim 12 wherein said selector is capable of defining portions of alarm indications in the main alarm list and the temporary alarm list subset.

14. The apparatus according to claim 13 wherein said selector further highlights the defined portions of alarm indications in a graphical user interface manner.

15. The apparatus according to claim 12 wherein the selection portion includes one or more selection combinations of selector defined portions of alarm indications and a wildcard indicator, wherein the selection combinations represent the portions of selector defined alarm indications in combination with an unspecified portion of alarm indications.

16. The apparatus according to claim 1 wherein the operation unit performs boolean logic operations on the list of alarm indications associated with the set of selected alarm indications with respect to the selected operation.

17. The apparatus according to claim 16 wherein the set of operation indications include move, load, delete, keep clear, and save alarm list operations.

18. The apparatus according to claim 17 wherein each said subwindow has a set of operation indications associated therewith, wherein each operation indication has a graphical area in said application window.

19. The apparatus according to claim 18 wherein:
the main alarm list has a set of alarm indication names; and
the selector defines a set of a full, a beginning, an intermediate, or an ending list of alarm indication name characters.

20. The apparatus according to claim 19 wherein each said alarm list operation indication performs its respective operation on the entire alarm list in said subwindow with which it is associated, said operations having boolean logic functionality for operating on said subwindow alarm list in reference to the selected alarm list text portions.

21. The apparatus according to claim 20 wherein said second subwindow and said third subwindow aggregate alarm indications in response to multiple move operations on the alarm list from said first subwindow and said second subwindow, respectively.

22. An alarm monitor configuration selection method operating on a computer, the method comprising the steps of:

displaying an alarm list of possible alarm indications for selection in an application window, said list being a main alarm list;

receiving an input selection criteria;

operating on the alarm list in response to the input selection criteria; and producing an alarm list subset having characteristics of the input selection criteria resulting from said operating on the alarm list.

23. The method in claim 22 wherein the step of displaying the alarm list in the application window comprises the step of configuring a first subwindow, a second subwindow, and a third subwindow inside the application window, wherein the first subwindow displays the main alarm list, the second subwindow displays a temporary subset of the main alarm list, and the third subwindow displays a final subset of the alarm list.

24. The method in claim 23 further comprising the steps of:

loading the alarm list from an input file; and displaying the alarm list in said first subwindow.

25. The method in claim 24 further comprising the step of storing the final alarm list subset to an output file.

26. An alarm monitor configuration selection method operating on a computer, the method comprising the steps of:

providing an application window comprising a first subwindow, a second subwindow, and a third subwindow;

loading an alarm list containing alarm indications from an input file, said alarm list being a main alarm list;

displaying the main alarm list in said first subwindow;

receiving a first input selection criteria referencing the main alarm list in said first subwindow;

operating on the main alarm list in response to the first input selection criteria, wherein a temporary subset of the main alarm list subset is transferred to and displayed in said second subwindow;

receiving a second input selection criteria referencing the temporary subset in said second subwindow;

operating on the temporary subset in said second subwindow in response to the second input selection criteria, wherein a final subset of the main alarm list is transferred to and displayed in said third subwindow; and storing the final alarm list subset to a file.

27. The method of claim 26 wherein displaying an alarm list in said first, second, and third subwindows includes the step of arranging the alarm indications in a sensibly grouped order.

28. The method of claim 27 wherein the step of arranging results in an alphabetical alarm list.

29. The method of claim 26 further comprising the step of displaying a first input selection criteria in a selection portion of said first subwindow.

30. The method of claim 29 further comprising the step of sweeping alarm indications with a selector to define said first and second input selection criteria.

31. The method of claim 30 wherein the step of sweeping alarm list indications portions includes highlighting a set of alarm list indication portions in a graphical user interface manner.

32. The method of claim 26 wherein the step of operating on the main alarm list in said first subwindow, the temporary alarm list subset in said second subwindow, and the final alarm list subset in said third subwindow is controlled by alarm list operations, each operation having a graphical area indication, each subwindow having at least one associated alarm list operation.

33. The method of claim 32 wherein the step of operating on the alarm list includes boolean logic operations.

34. The method of claim 33 wherein the step of operating on the alarm list is selected from the group consisting of moving, loading, deleting, keeping, clearing, and saving alarm list operations.

35. The method of claim 31 wherein the step of highlighting defines a set of a full, a beginning, an intermediate, or an ending list of alarm indication characters.

36. The method of claim 34 wherein multiple move operations result in said second subwindow and said third subwindow aggregating alarm indications.

37. In a computer linked to an alarm system having electronic alarm messages, a method for providing alarm information, the method comprising the steps of:

for each alarm in a plurality of alarms in a subject alarm system, associating a respective alarm indication with each alarm, each alarm indication being a representation of an alarm message;

providing a set of alarm categories having a hierarchy of subcategories, wherein each category includes logically related alarm indications;

for the set of alarm categories, providing a set of categorizations, wherein each categorization includes logically related alarm categories;

receiving alarm messages from the subject alarm system;

mapping each received alarm message to the alarm indication that represents the alarm message;

updating the categories and categorizations by a metric, as a function of the received alarm messages and the alarm indications to which the received alarm messages are mapped; and displaying a subset of the related categorizations and categories in an organized and meaningful manner, thereby providing alarm information to an operator.

38. The method according to claim 37 wherein a subset of the alarm categories include patterns of alarms, each pattern defining a sequence of alarm indications.

39. The method according to claim 38 wherein the alarm categories include corresponding policies, wherein the steps of updating and displaying the categorizations and categories are performed as a function of said policies.

40. The method according to claim 39 further comprising a step of prioritizing alarm categories and categorizations with respect to one another; and wherein the step of displaying the updated categorizations reflects a priority metric of the prioritizing step.

41. The method according to claim 39 wherein the step of updating the categories and categorizations by a metric includes the steps of:

for each alarm indication, providing an alarm criteria;

providing each alarm category and categorization with an alarm counter; and adjusting each alarm counter in response to a comparison between an associated alarm indication of a received alarm message with the alarm indication's respective alarm criteria, wherein a subcategory directly including an alarm indication adjusts its alarm counter for each associated alarm message comparison, and a hierarchically superior alarm category adjusts its alarm counter on a per subcategory and per immediately subordinate alarm indication basis.

42. The method according to claim 41 further comprising the step of determining a set of one word summaries comprising the steps of:

determining a list of indicator categories, an indicator category being a hierarchically highest level alarm category in a display;

scanning all subcategories of the determined indicator categories;

for each scanned subcategory of each determined indicator category, (i) determining which subcategory alarm counter equals the count of the indicator category and whose overall counts has the smallest number of alarm indications, and (ii) using the determined subcategory, forming one word summaries from a subcategory descriptor or alarm indication descriptor of the determined subcategory; and displaying together the determined indicator category and the respective formed one word summary.

43. The method according to claim 42 further comprising the step of displaying a one word summary of a highest level priority for a subset of the indicator categories.

44. The method according to claim 43 wherein the step of updating comprises the steps of:

providing an alarm message discriminator referencing a subset of alarm indications;

screening the received alarm messages according to the alarm message discriminator, said screening resulting in a working set of alarm messages; and applying the working set of alarm messages to the steps of determining a one word summary and displaying a subset of the updated categorizations.

45. The method according to claim 44 wherein the step of screening the received alarm message further includes automatically imposing selections of alarm categories to be displayed as a function of the policies.

46. The method according to claim 45 wherein the step of automatically imposing selections includes employing a dynamic alarm limit table, thereby dynamically adjusting a set of ranges for a subset of alarms as a function of the policies.

47. The method according to claim 37 wherein the step of receiving alarm messages includes parsing a frame of alarm messages into individual alarm messages for mapping to alarm indications.

48. The method according to claim 38 wherein for each category having patterns of alarms, an included alarm indication is classified from a group consisting of a causal, an acute, or a consequential alarm type.

49. The method according to claim 38 wherein the step of displaying in an organized manner includes alphabetizing the alarm indications included in the alarm categorizations and categories.

50. The method according to claim 43 wherein the step of displaying a subset of related categories in a meaningful manner includes indicating, for each alarm categorization and category in a subset of alarm categorizations and categories, an alarm activity reference unit indicates a total number of associated received alarm messages and a total number of filtered alarm messages.

51. The method according to claim 50 wherein categorization, category, and alarm indications are displayed having a visual effect including at least one of shading, color, font, and type style.

52. The method according to claim 43 wherein the step of forming a set of one word summaries further includes extending the one word summaries to include indications of additional alarm criteria.

53. The method according to claim 37 wherein the step of displaying in an organized and meaningful manner includes the steps of:
- receiving a selection input from an operator; and
- displaying a subset of alarm information in response thereto.

54. The method according to claim 37 wherein the step of displaying and hence providing alarm information is selected from a group consisting of logs, battle ribbon alarm/event trends, alarm summary indicator matrices, and prediction/diagnostic displays.

55. The method according to claim 54 wherein the step of displaying further includes displaying specific alarm information in a set of side log displays.

56. The method according to claim 44 wherein the step of screening according to an alarm message discriminator comprises the step of, for a plurality of alarm display consoles, screening the alarm messages according to a console specific alarm message discriminator for each console.

57. The method according to claim 56 wherein the step of screening according to a console specific alarm message discriminator includes alarm message discriminator sharing among consoles, thereby allowing an operator to transfer alarm monitoring duties.

58. The method according to claim 56 wherein the step of screening according to a console specific alarm message discriminator includes transmitting a console specific alarm message discriminator to the alarm system to inhibit alarm messages, thereby sharing the console specific alarm message discriminator with the plurality of alarm display consoles.

59. The method according to claim 37 further including the step of loading an external configuration file, thereby initializing a plurality of variables used to provide the alarm information to an operator.

60. In a computer linked to an alarm system having electronic alarm messages, an apparatus for providing alarm information, the apparatus comprising:
- an interface receiving a plurality of alarm messages corresponding to a plurality of alarms from a subject alarm system;
- a plurality of alarm indications coupled to said interface, each alarm indication representative of an alarm message for the alarm, different subsets of alarm indications forming different alarm categories and different subsets of categories forming different alarm categorizations;
- a processor routine, coupled to the interface and responsive to the received alarm message, the processor routine mapping the alarm messages into alarm indications and updating the categories and categorizations by a metric as a function of the received alarm messages; and
- display supported by the processor routine, wherein a subset of the categorizations and categories are displayed in an organized and meaningful manner, thereby providing alarm information to an operator.

61. The apparatus according to claim 60 wherein a subset of alarm categories include patterns of alarms, each pattern defining a sequence of alarm indications.

62. The apparatus according to claim 61 wherein the alarm categories include corresponding policies, wherein the processor routine updates and displays the categorizations and categories as a function of said policies.

63. The apparatus according to claim 62 wherein the processor routine includes a priority generator, wherein alarm categories and categorizations are prioritized with respect to one another, wherein the updated categorizations reflect a priority metric.

64. The apparatus according to claim 62 wherein each alarm categorization and category includes an accumulator, wherein an alarm category directly including an alarm indication adjusts its accumulator in response to the processor routine indicating an active alarm, and a hierarchically superior category adjusts its alarm accumulator on a per subcategory and per directly included alarm indication basis.

65. The apparatus according to claim 64 wherein the display includes a plurality of one word summary subdisplays, a subdisplay being co-located with alarm category and categorization indications, wherein a one word summary is displayed in the one word summary subdisplays, the one word summary being a subcategory descriptor or an alarm indication descriptor for which a subcategory alarm accumulator count equals a count associated with the co-located alarm category or categorization indication, and whose overall count has a smallest number of alarm indications.

66. The apparatus according to claim 65 wherein the display further includes a set of one word summary priority subdisplays co-located with the alarm categories, wherein a one word summary of a highest level priority is displayed.

67. The apparatus according to claim 61 wherein the processor routine comprises an alarm message discriminator, wherein a subset of alarm messages are filtered from a subset of alarm category metric calculations, thereby inhibiting alarm category and categorization accumulator updates as a result of the filtered alarm messages and affecting the display of including alarm categories and categorizations.

68. The apparatus according to claim 67 wherein the processor routine further comprises a dynamic alarm message discriminator having relevant association with said alarm message discriminator, wherein the processor routine dynamically filters alarm messages in response to the dynamic alarm message discriminator, the dynamic alarm message discriminator operating as a function of active alarms.

69. The apparatus according to claim 68 wherein the dynamic alarm message discriminator includes a dynamic alarm limit table, the comparison processor routine employing the dynamic alarm limit table and responsively adjusting a set of ranges for a subset of alarms, thereby dynamically adjusting alarm category and categorization accumulators.

70. The apparatus according to claim 60 wherein said interface receives a plurality of alarm messages in an alarm message frame, said interface parsing the alarm messages out of the alarm message frame, wherein the alarm messages are transferred to the processor routine for updating the alarm categories and categorizations.

71. The apparatus according to claim 65 wherein the alarm categories including patterns of alarms classify alarm indications as being casual, acute, or consequential, said processor routine using the classified alarm indications to dynamically filter alarm messages and predict future alarm events.

72. The apparatus according to claim 61 wherein the processor routine includes an alphabetizer coupled to alarm category indications, the alphabetizer transmitting the alphabetized alarm indications to the processor routine to display the alarm indications in an organized and meaningful manner to the operator.

73. The apparatus according to claim 67 wherein, for a subset of alarm categorization and category indications, an alarm activity reference unit indicates a total number of received alarm messages and a total number of filtered alarm messages.

74. The apparatus according to claim 61 wherein the categorization, category, and alarm indications are displayed having a visual effect including at least one of shading, color, font, and type style.

75. The apparatus according to claim 65 wherein the processor routine calculates an extended one word summary having multiple alarm categorization, category, or alarm indications, the calculated extended one word summaries being transferred to the one word summary subdisplays for presentation to an operator.

76. The apparatus according to claim 61 further including a computer input/output device coupled to the display, thereby allowing an operator to interact with the alarm information.

77. The apparatus according to claim 61 wherein the display includes display formats selected from a group consisting of logs, battle ribbon alarm/event trends, alarm summary indicator matrices, and prediction/diagnostic displays.

78. The apparatus according to claim 77 wherein the display further includes side log displays, wherein specific alarm information is presented by the processor routine in an organized and meaningful manner.

79. The apparatus according to claim 68 further comprising a set of operator consoles, wherein each console has a unique alarm message discriminator.

80. The apparatus according to claim 79 wherein each operator console has a communication interface allowing alarm message discriminator sharing among the set of consoles.

81. The apparatus according to claim 80 wherein a console interface communicates in a bidirectional manner to the subject alarm system, thereby allowing a console to transmit a console specific alarm message discriminator to the alarm system to inhibit alarm messages specified to be filtered from being broadcast, thereby sharing the console specific alarm message discriminator with the plurality of operator consoles.

82. The apparatus according to claim 62 further including an external configuration file, wherein the external configuration file is loaded into the processor routine, the external configuration file having a plurality of initialization values for initializing a plurality of alarm processor variables used by the processor routine.

* * * * *